(12) United States Patent
Thabit

(10) Patent No.: US 11,354,093 B1
(45) Date of Patent: Jun. 7, 2022

(54) INTEGER AND CHARACTERS PREFIX BASED METHODOLOGIES COMBINED WITH PARALLEL DATA SORT METHODOLOGY ENHANCE THE EXECUTION PERFORMANCE OF ANY STRING SORTING ALGORITHM

(71) Applicant: Khalid Omar Thabit, Jeddah (SA)

(72) Inventor: Khalid Omar Thabit, Jeddah (SA)

(73) Assignee: Khalid Omar Thabit, Riyadh (SA)

( * ) Notice: Subject to any disclaimer, the term of this patent is extended or adjusted under 35 U.S.C. 154(b) by 0 days.

(21) Appl. No.: 17/074,122

(22) Filed: Oct. 19, 2020

(51) Int. Cl.
```
G06F 7/08      (2006.01)
G06F 7/16      (2006.01)
G06F 7/505     (2006.01)
G06F 9/30      (2018.01)
G06F 9/38      (2018.01)
```

(52) U.S. Cl.
CPC .......... *G06F 7/08* (2013.01); *G06F 7/16* (2013.01); *G06F 7/5057* (2013.01); *G06F 9/30036* (2013.01); *G06F 9/3836* (2013.01)

(58) Field of Classification Search
CPC ............. G06F 7/06; G06F 7/08; G06F 7/36
See application file for complete search history.

(56) References Cited

U.S. PATENT DOCUMENTS

| | | | | |
|---|---|---|---|---|
| 6,424,969 | B1* | 7/2002 | Gruenwald | G06F 16/2365 707/802 |
| 6,496,830 | B1* | 12/2002 | Jenkins, Jr. | G06F 16/30 |
| 2006/0235846 | A1* | 10/2006 | Murray | G06F 16/90344 |
| 2008/0306948 | A1* | 12/2008 | Uppala | G06F 16/90344 |
| 2016/0335294 | A1* | 11/2016 | Gruenwald | G06F 16/22 |

* cited by examiner

*Primary Examiner* — Chuong D Ngo
(74) *Attorney, Agent, or Firm* — Geeta Kadambi; Riddhi IP LLC

(57) ABSTRACT

Methodology to reduce the running time of any string sorting algorithm is described. In one methodology, a prefix of each string from the input unsorted string array is converted to an integer and placed in an array. The array of integers is sorted using the given sorting algorithm. In subsequent methodology, the characters of the string prefix are placed in a record structure and stored in an array of character records. The array of character records is sorted using the given sorting algorithm. The input unsorted array of strings is then sorted using either the sorted array of integers or character records as a reference. Both methodologies showed performance improvements when running in sequential mode only. Therefore, parallel data sort methodology (PDS) was introduced allowing sorting algorithms to sort data in parallel, and its implementation made the two methodologies execute much faster in parallel mode.

4 Claims, 53 Drawing Sheets

Flowchart for the Five Stages of the First Methodology

Flowchart for the Five Stages of the First Methodology

Stage 3 of the first methodology

| Sequential Execution of First Methodology Stages With Quick Sort and the Effect of Integer Types (in seconds) | | | | |
|---|---|---|---|---|
|  | int64 | int16 | int32 | decimal |
| Phase 1 | 6.10 | 2.11 | 2.57 | 31.62 |
| Phase 2 | 14.71 | 8.04 | 9.69 | 68.15 |
| Phase 3 | 0.23 | 0.10 | 0.11 | 1.48 |
| Phase 4 | 6.73 | 6.10 | 6.73 | 6.78 |
| Phase 5 | 6.05 | 243.58 | 118.46 | 1.15 |
| Total | 33.83 | 259.93 | 137.56 | 109.17 |
| Speed Factor | 12.56x | 1.63x | 3.09x | 3.89x |

Figure 4C

| Parallel execution of First Methodology Stages With QIM and the Effect of Integer Types (in seconds) | | | | |
|---|---|---|---|---|
|  | int64 | int16 | int32 | decimal |
| Phase 1 | 2.2 | 0.61 | 0.669 | 4.687 |
| Phase 2 | 6.7 | 2.497 | 2.955 | 27.137 |
| Phase 3 | 0.2 | 0.088 | 0.202 | 1.282 |
| Phase 4 | 2.5 | 2.031 | 3.032 | 2.239 |
| Phase 5 | 1.4 | 42.959 | 18.965 | 0.083 |
| Total | 13.083 | 48.191 | 25.829 | 35.506 |
| Speed Factor | 31x | 8x | 16x | 11x |

Figure 4D

Linear Search Method for Prefix Conversion to Numerical Value

| | First Char Table | | Second Char Table | | 12th Char Table | | 13th Char Table | |
|---|---|---|---|---|---|---|---|---|
| C1 | " | 150,094,635,296,999,121 | " | 5,559,060,566,555,523 | " | 27 | " | 1 |
| C2 | A | 300,189,270,593,998,242 | A | 11,118,121,133,111,046 | A | 54 | A | 2 |
| C3 | B | 450,283,905,890,997,363 | B | 16,677,181,699,666,569 | B | 81 | B | 3 |
| C4 | X | 3,752,365,882,424,978,025 | X | 138,976,514,163,888,075 | X | 675 | X | 25 |
| C5 | Y | 3,902,460,517,721,977,146 | Y | 144,535,574,730,443,598 | Y | 702 | Y | 26 |
| C6 | Z | 4,052,555,153,018,976,267 | Z | 150,094,635,296,999,121 | Z | 729 | Z | 27 |

Figure 5

Hash Table Method for Prefix Conversion to Numerical Value
The hash function (f(x)= x MOD 61-3)

| | First Char Table | | Second Char Table | | 12th Char Table | | 13th Char Table | |
|---|---|---|---|---|---|---|---|---|
| f(c) = 1 | " | 150,094,635,296,999,121 | " | 5,559,060,566,555,523 | " | 27 | " | 1 |
| f(c) = 2 | A | 300,189,270,593,998,242 | A | 11,118,121,133,111,046 | A | 54 | A | 2 |
| f(c) = 3 | B | 450,283,905,890,997,363 | B | 16,677,181,699,666,569 | B | 81 | B | 3 |
| f(c) = 24 | X | 3,752,365,882,424,978,025 | X | 138,976,514,163,888,075 | X | 675 | X | 25 |
| f(c) = 25 | Y | 3,902,460,517,721,977,146 | Y | 144,535,574,730,443,598 | Y | 702 | Y | 26 |
| f(c) = 26 | Z | 4,052,555,153,018,976,267 | Z | 150,094,635,296,999,121 | Z | 729 | Z | 27 |

Figure 6

ASCII Table Lookup Method (KOT)
7-Bit ASCII Code Table

| Rightmost Four Bits | 000 | 001 | 010 | 011 | 100 | 101 | 110 | 111 |
|---|---|---|---|---|---|---|---|---|
| 0000 | NUL | DLE | Space | 0 | @ | P | ` | p |
| 0001 | SOH | DC1 | ! | 1 | A | Q | a | q |
| 0010 | STX | DC2 | " | 2 | B | R | b | r |
| 0011 | ETX | DC3 | # | 3 | C | S | c | s |
| 0100 | EOT | DC4 | $ | 4 | D | T | d | t |
| 0101 | ENQ | NAK | % | 5 | E | U | e | u |
| 0110 | ACK | SYN | & | 6 | F | V | f | v |
| 0111 | BEL | ETB | ' | 7 | G | W | g | w |
| 1000 | BS | CAN | ( | 8 | H | X | h | x |
| 1001 | HT | EM | ) | 9 | I | Y | i | y |
| 1010 | LF | SUB | * | : | J | Z | j | z |
| 1011 | VT | ESC | + | ; | K | [ | k | { |
| 1100 | FF | FS | , | < | L | \ | l | | |
| 1101 | CR | GS | - | = | M | ] | m | } |
| 1110 | SO | RS | . | > | N | ^ | n | ~ |
| 1111 | SI | US | / | ? | O | _ | o | DEL |

Figure 7A

7-Bit ASCII Code Table for KOT Method

| Rightmost Four Bits | 000 | 001 | 010 | 011 | 100 | 101 | 110 | 111 |
|---|---|---|---|---|---|---|---|---|
| 0000 | 0 | 0 | 0 | 0 | 0 | 0 | 0 | 0 |
| 0001 | 0 | 0 | 0 | 0 | 0 | 0 | 0 | 0 |
| 0010 | 0 | 0 | 0 | 0 | 0 | 0 | 0 | 0 |
| 0011 | 0 | 0 | 0 | 0 | 0 | 0 | 0 | 0 |
| 0100 | 0 | 0 | 0 | 0 | 0 | 0 | 0 | 0 |
| 0101 | 0 | 0 | 0 | 0 | 0 | 0 | 0 | 0 |
| 0110 | 0 | 0 | 0 | 0 | 0 | 0 | 0 | 0 |
| 0111 | 0 | 0 | 0 | 0 | 0 | 0 | 0 | 0 |
| 1000 | 0 | 0 | 0 | 0 | 0 | 0 | 0 | 0 |
| 1001 | 0 | 0 | 0 | 0 | 0 | 0 | 0 | 0 |
| 1010 | 0 | 0 | 0 | 0 | 0 | 0 | 0 | 0 |
| 1011 | 0 | 0 | 0 | 0 | 0 | 0 | 0 | 0 |
| 1100 | 0 | 0 | 0 | 0 | 0 | 0 | 0 | 0 |
| 1101 | 0 | 0 | 0 | 0 | 0 | 0 | 0 | 0 |
| 1110 | 0 | 0 | 0 | 0 | 0 | 0 | 0 | 0 |
| 1111 | 0 | 0 | 0 | 0 | 0 | 0 | 0 | 0 |

Figure 7B

7-Bit ASCII Code Table for KOT Method

| Rightmost Four Bits | 000 | 001 | 010 | 011 | 100 | 101 | 110 | 111 |
|---|---|---|---|---|---|---|---|---|
| 0000 | 0 | 0 | 0 | 0 | 0 | (16)P | 0 | (16)p |
| 0001 | 0 | 0 | 0 | 0 | (1)A | (17)Q | (1)a | (17)q |
| 0010 | 0 | 0 | 0 | 0 | (2)B | (18)R | (2)b | (18)r |
| 0011 | 0 | 0 | 0 | 0 | (3)C | (19)S | (3)c | (19)s |
| 0100 | 0 | 0 | 0 | 0 | (4)D | (20)T | (4)d | (20)t |
| 0101 | 0 | 0 | 0 | 0 | (5)E | (21)U | (5)e | (21)u |
| 0110 | 0 | 0 | 0 | 0 | (6)F | (22)V | (6)f | (22)v |
| 0111 | 0 | 0 | 0 | 0 | (7)G | (23)W | (7)g | (23)w |
| 1000 | 0 | 0 | 0 | 0 | (8)H | (24)X | (8)h | (24)x |
| 1001 | 0 | 0 | 0 | 0 | (9)I | (25)Y | (9)i | (25)y |
| 1010 | 0 | 0 | 0 | 0 | (10)J | (26)Z | (10)j | (26)z |
| 1011 | 0 | 0 | 0 | 0 | (11)K | 0 | (11)k | 0 |
| 1100 | 0 | 0 | 0 | 0 | (12)L | 0 | (12)l | 0 |
| 1101 | 0 | 0 | 0 | 0 | (13)M | 0 | (13)m | 0 |
| 1110 | 0 | 0 | 0 | 0 | (14)N | 0 | (14)n | 0 |
| 1111 | 0 | 0 | 0 | 0 | (15)O | 0 | (15)o | 0 |

Figure 7C

| Characters | Value Table | Value | Value |
|---|---|---|---|
| A | First CharTable | $2 \times 27^{12}$ | 300189270593998242 |
| C | Second CharTable | $4 \times 27^{11}$ | 22236242266222092 |
| K | 3rd CharTable | $12 \times 27^{10}$ | 2470693585135788 |
| N | 4th CharTable | $15 \times 27^9$ | 114383962274805 |
| O | 5th CharTable | $16 \times 27^8$ | 4518872583696 |
| W | 6th CharTable | $24 \times 27^7$ | 251048476872 |
| L | 7th CharTable | $13 \times 27^6$ | 5036466357 |
| E | 8th CharTable | $6 \times 27^5$ | 86093442 |
| D | 9th CharTable | $5 \times 27^4$ | 2657205 |
| G | 10th CharTable | $8 \times 27^3$ | 157464 |
| M | 11th CharTable | $14 \times 27^2$ | 10206 |
| E | 12th CharTable | $6 \times 27^1$ | 162 |
| N | 13th CharTable | $15 \times 27^0$ | 15 |

Figure 8A

| Word | Prefix | Value |
|---|---|---|
| ACKNOWLEDGMENTS | ACKNOWLEDGMEN | 325,015,365,454,076,346 |

Figure 8B

Effects of the sequential Table Lookup Methods on the Performance of the first stage for the First Methodology

| No. of elements | KOT Table Search | Hash Table Search | Linear Table Search |
|---|---|---|---|
| 100000000 | 5.78 sec | 23.83 sec | 39.12 sec |
| 200000000 | 10.769 sec | 116.730 sec | 57.523 sec |
| 300000000 | 16.317 sec | 181.629 sec | 91.343 sec |
| 400000000 | 22.931 sec | 254.260 sec | 123.828 sec |
| 500000000 | 28.267 sec | 320.027 sec | 154.883 sec |

Figure 9C

Effects of the Parallel Table Lookup Methods on the Performance of the first stage for the First Methodology

| No. of elements | KOT Table Search Parallel | Hash Table Search Parallel | Linear Table Search Parallel |
|---|---|---|---|
| 100000000 | 2.19 sec | 6.5 sec | 7.86 sec |
| 200000000 | 4.01 sec | 8.268 sec | 11.207 sec |
| 300000000 | 5.9 sec | 12.783 sec | 20.864 sec |
| 400000000 | 8.02 sec | 18.173 sec | 23.851 sec |
| 500000000 | 11.9 sec | 24.639 sec | 32.672 sec |

Figure 9D

| Sequential Execution Time for Sorting Alphabetic Strings Using First Methodology ( in Seconds) | | | | | | | | |
|---|---|---|---|---|---|---|---|---|
| Number of Elements | .Net Sort Without Methodology | KOT .Net Sort | Heap Sort Without Methodology | KOT Heap Sort | Merge Sort Without Methodology | KOT Merge Sort | Quick Sort Without Methodology | KOT Quick Sort |
| 1000 | 0.001 | 0.0004 | 0.001 | 0.0004 | 0.001 | 0.0003 | 0.002 | 0.013 |
| 10000 | 0.01 | 0.01 | 0.02 | 0.01 | 0.01 | 0.01 | 0.01 | 0.002 |
| 100000 | 0.14 | 0.04 | 0.23 | 0.05 | 0.13 | 0.05 | 0.16 | 0.02 |
| 1000000 | 1.94 | 0.19 | 3.42 | 0.34 | 1.77 | 0.32 | 2.22 | 0.21 |
| 10000000 | 26.39 | 2.30 | 49.43 | 5.71 | 23.56 | 3.57 | 30.54 | 2.52 |
| 100000000 | 363.04 | 29.77 | 813.25 | 120.01 | 307.92 | 62.20 | 424.89 | 33.77 |

Figure 10C

| Sequential Execution Time for Sorting Alphanumeric Strings Using First Methodology (in Seconds) | | | | | | | | |
|---|---|---|---|---|---|---|---|---|
| Number of Elements | .Net Sort Without Methodology | KOT .Net Sort | Heap Sort Without Methodology | KOT Heap Sort | Merge Sort Without Methodology | KOT Merge Sort | Quick Sort Without Methodology | KOT Quick Sort |
| 1000 | 0.001 | 0.0003 | 0.001 | 0.0004 | 0.001 | 0.0003 | 0.002 | 0.004 |
| 10000 | 0.02 | 0.003 | 0.02 | 0.005 | 0.01 | 0.01 | 0.01 | 0.002 |
| 100000 | 0.14 | 0.04 | 0.22 | 0.04 | 0.57 | 0.08 | 0.16 | 0.02 |
| 1000000 | 1.99 | 0.20 | 3.33 | 0.32 | 1.60 | 0.31 | 2.23 | 0.21 |
| 10000000 | 25.42 | 2.15 | 48.72 | 5.71 | 22.02 | 3.61 | 30.18 | 2.30 |
| 100000000 | 350.68 | 27.33 | 785.32 | 89.18 | 291.65 | 66.22 | 408.54 | 27.30 |

Figure 10D

Parallel Execution of First Methodology Alphabetic (in Seconds)

| Time in Seconds | .Net Sort Sequential Without Methodology | KOT .Net Sort | Heap Sort Sequential Without Methodology | KOT Heap Sort | Merge Sort Sequential Without Methodology | KOT Merge Sort | Quick Sort Sequential Without Methodology | KOT Quick Sort | QIM Sort Sequential Without Methodology Alphabetic | KOT QIM | Merge Sort Parallel Without Methodology | KOT Parallel With Merge Parallel |
|---|---|---|---|---|---|---|---|---|---|---|---|---|
| 10000 | 0.01 | 0.01 | 0.02 | 0.01 | 0.01 | 0.01 | 0.01 | 0.00 | 0.02 | 0.04 | 0.01 | 0.01 |
| 100000 | 0.14 | 0.03 | 0.23 | 0.05 | 0.13 | 0.07 | 0.16 | 0.02 | 0.17 | 0.02 | 0.06 | 0.05 |
| 1000000 | 1.94 | 0.15 | 3.42 | 0.29 | 1.77 | 0.25 | 2.22 | 0.13 | 2.30 | 0.10 | 0.74 | 0.13 |
| 10000000 | 26.39 | 1.28 | 49.43 | 4.81 | 23.56 | 2.63 | 30.54 | 1.42 | 32.01 | 0.90 | 8.48 | 1.39 |
| 100000000 | 363.04 | 15.32 | 813.25 | 90.69 | 307.92 | 48.12 | 424.89 | 16.47 | 401.4 | 13.97 | 115.6 | 24.06 |

Figure 11C

Parallel Execution of First Methodology Alphanumeric (in Seconds)

| Time in Seconds | .Net Sort Sequential Without Methodology | KOT .Net Sort | Heap Sort Sequential Without Methodology | KOT Heap Sort | Merge Sort Sequential Without Methodology | KOT Merge Sort | Quick Sort Sequential Without Methodology | KOT Parallel Quick Sort | QIM Sort Sequential Without Methodology | KOT QIM | Merge Sort Parallel Without Methodology | KOT Parallel With Merge Parallel |
|---|---|---|---|---|---|---|---|---|---|---|---|---|
| 10000 | 0.02 | 0.003 | 0.02 | 0.01 | 0.01 | 0.01 | 0.01 | 0.001 | 0.02 | 0.05 | 0.03 | 0.01 |
| 100000 | 0.14 | 0.02 | 0.22 | 0.09 | 0.57 | 0.06 | 0.16 | 0.01 | 0.16 | 0.01 | 0.06 | 0.02 |
| 1000000 | 1.99 | 0.13 | 3.33 | 0.32 | 1.60 | 0.30 | 2.23 | 0.13 | 2.27 | 0.08 | 0.69 | 0.10 |
| 10000000 | 25.42 | 1.29 | 48.72 | 4.81 | 22.02 | 3.78 | 30.18 | 1.40 | 30.63 | 0.73 | 10.53 | 1.14 |
| 100000000 | 350.68 | 15.16 | 785.32 | 69.54 | 291.65 | 47.13 | 408.54 | 14.98 | 436.6 | 9.97 | 101.8 | 18.66 |

Figure 11D

| Sequential Run Time for Iterative Sorting Algorithms on Alphabetic Strings | | | | | | |
|---|---|---|---|---|---|---|
| SAlg / number of elements | Bubble Sort | KOT Bubble Sort | Selection Sort | KOT Selection Sort | Insertion Sort | KOT Insertion Sort |
| 1000 | 0.0346 | 0.025 | 0.0313 | 0.0047 | 0.0168 | 0.0041 |
| 10000 | 3.5203 | 0.14 | 3.2034 | 0.0738 | 1.6249 | 0.0275 |
| 100000 | 361.0662 | 21.09 | 315.3152 | 7.042 | 163.915 | 2.6145 |
| 1000000 | 57962.12 | 1615.264 | 42294.38 | 781.232 | 34365.73 | 285.0829 |

Figure 12C

| Parallel Run Time for Iterative Sorting Algorithms on Alphabetic Strings | | | | | | |
|---|---|---|---|---|---|---|
| SAlg / number of elements | Bubble Sort | KOT Bubble Merge Sort | Selection Sort | KOT Selection Merge Sort | Insertion Sort | KOT Insertion Merge Sort |
| 1000 | 0.0346 | 0.0395 | 0.0313 | 0.033 | 0.0168 | 0.033 |
| 10000 | 3.5203 | 0.0753 | 3.2034 | 0.0562 | 1.6249 | 0.042 |
| 100000 | 361.0662 | 3.284 | 315.3152 | 2.193 | 163.915 | 0.721 |
| 1000000 | 57962.12 | 320.948 | 42294.38 | 228.668 | 34365.73 | 74.114 |

Figure 12D

Flowchart for the Five Stages of the Second Methodology

Stage 1&2

Stage 3

Stage 4

Stage 5

| Affects of the Number of Characters Per Record on the Performance of Each Stage for the Second Methodology with .Net sort algorithm under Sequential execution (in seconds) | | | | | | | | | |
|---|---|---|---|---|---|---|---|---|---|
| Number of characters | 3 | 6 | 9 | 12 | 15 | 18 | 21 | 24 | 27 | 30 |
| Phase 1 | 1.98 | 8.62 | 13.10 | 14.40 | 6.30 | 7.01 | 6.35 | 6.59 | 16.47 | 14.21 |
| Phase 2 | 15.70 | 21.47 | 29.96 | 34.07 | 35.21 | 34.66 | 32.60 | 33.84 | 40.20 | 33.33 |
| Phase 3 | 0.16 | 0.38 | 0.66 | 0.67 | 0.71 | 0.61 | 0.69 | 0.71 | 0.86 | 0.73 |
| Phase 4 | 5.43 | 6.02 | 8.12 | 8.14 | 8.19 | 6.24 | 6.14 | 6.15 | 8.34 | 6.22 |
| Phase 5 | 188.24 | 93.43 | 44.09 | 9.70 | 2.15 | 1.12 | 1.08 | 1.08 | 1.29 | 1.08 |
| Total | 211.50 | 129.92 | 95.93 | 66.98 | 52.56 | 49.63 | 46.86 | 48.37 | 67.16 | 55.57 |
| Speed Factor | 1.72x | 2.79x | 3.78x | 5.42x | 6.91x | 7.31x | 7.75x | 7.51x | 5.41x | 6.53x |

Figure 16C

| Affects of the Number of Characters Per Record on the Performance of Each Stage for the Second Methodology with QIM sort algorithm under parallel execution (in seconds) | | | | | | | | | |
|---|---|---|---|---|---|---|---|---|---|
| Number of characters | 3 | 6 | 9 | 12 | 15 | 18 | 21 | 24 | 27 | 30 |
| Phase 1 | 0.42 | 0.80 | 0.95 | 2.25 | 2.32 | 1.96 | 2.17 | 4.80 | 2.50 | 2.98 |
| Phase 2 | 5.96 | 8.93 | 8.92 | 11.91 | 14.14 | 12.42 | 13.57 | 15.35 | 16.03 | 24.67 |
| Phase 3 | 0.16 | 0.50 | 0.83 | 0.96 | 1.03 | 1.00 | 7.76 | 1.04 | 1.26 | 1.10 |
| Phase 4 | 2.09 | 2.23 | 2.27 | 2.14 | 2.33 | 2.30 | 2.36 | 2.42 | 2.32 | 2.49 |
| Phase 5 | 41.52 | 19.72 | 8.64 | 2.23 | 0.42 | 0.11 | 0.07 | 0.06 | 0.05 | 0.06 |
| Total | 50.14 | 32.18 | 21.62 | 19.50 | 20.24 | 17.78 | 25.94 | 23.67 | 22.17 | 31.30 |
| Speed Factor | 8x | 12.5x | 18.6x | 20.6x | 19.8x | 22.6x | 15.5x | 16.9x | 18.1x | 12.8x |

Figure 16D

| Sequential Run Time In Seconds For Sorting Fixed Size Alphanumeric Strings using .Net Sort | | | |
|---|---|---|---|
| Number of elements | First Methodology | Second methodology | .Net without methodology |
| 10000 | 0.01 | 0.01 | 0.01 |
| 100000 | 0.04 | 0.03 | 0.15 |
| 1000000 | 0.18 | 0.30 | 1.97 |
| 10000000 | 1.77 | 3.58 | 24.68 |
| 100000000 | 27.92 | 45.03 | 338.63 |

Figure 17C

| Parallel Run Time In Seconds For Sorting Fixed Size Alphanumeric Strings using QIM Sort | | | |
|---|---|---|---|
| Number of elements | First Methodology | Second methodology | .Net without methodology |
| 10000 | 0.07 | 0.04 | 0.01 |
| 100000 | 0.01 | 0.01 | 0.15 |
| 1000000 | 0.05 | 0.09 | 1.97 |
| 10000000 | 0.55 | 1.99 | 24.68 |
| 100000000 | 6.11 | 13.70 | 338.63 |

Figure 17D

Sequential run time in seconds

| Number of elements | .Net Sort Sequential Without Methodology | .Net Sort with 13 Character Record | Merge Sort Sequential Without Methodology | Merge Sort With 13 Character Record | Heap Sort Sequential Without Methodology | Heap Sort With 13 Character Record | Quick Sort Sequential Without Methodology | Quick Sort with 13 Character Record |
|---|---|---|---|---|---|---|---|---|
| 10000 | 0.0113 | 0.0038 | 0.0100 | 0.0038 | 0.0182 | 0.0044 | 0.0136 | 0.0105 |
| 100000 | 0.1398 | 0.0283 | 0.1342 | 0.0363 | 0.2310 | 0.0516 | 0.1616 | 0.0539 |
| 1000000 | 1.9422 | 0.3028 | 1.7721 | 0.4396 | 3.4240 | 0.7139 | 2.2242 | 0.3876 |
| 10000000 | 26.3863 | 3.5357 | 23.5561 | 14.0903 | 49.4270 | 10.6522 | 30.5373 | 5.0761 |
| 100000000 | 363.0390 | 43.1962 | 307.9237 | 146.4745 | 773.6800 | 168.0070 | 424.8873 | 61.9164 |

Figure 18C

Parallel run time in seconds

| Number of elements | .Net Sort Sequential Without Methodology | .Net Sort With 13 Character Record | Merge Sort Sequential Without Methodology | Merge Sort with 13 character Record | Heap Sort Sequential Without Methodology | Heap Sort With 13 Character Record | Quick Sort Sequential Without Methodology | Quick Sort With 13 Character Record | QIM Sort Without Methodology | QIM Sort With 13 Character Record | Merge Sort Parallel Without Methodology | KOT Parallel With 13 Character Record With Merge Parallel |
|---|---|---|---|---|---|---|---|---|---|---|---|---|
| 10000 | 0.0113 | 0.0022 | 0.0100 | 0.0030 | 0.0182 | 0.0043 | 0.0136 | 0.0054 | 0.02 | 0.04 | 0.028 | 0.041 |
| 100000 | 0.1398 | 0.0223 | 0.1342 | 0.0299 | 0.2310 | 0.0951 | 0.1616 | 0.0449 | 0.17 | 0.04 | 0.056 | 0.056 |
| 1000000 | 1.9422 | 0.2314 | 1.7721 | 0.3826 | 3.4240 | 0.6376 | 2.2242 | 0.3350 | 2.30 | 0.17 | 0.691 | 0.178 |
| 10000000 | 26.3863 | 2.7167 | 23.556 | 13.0282 | 49.427 | 9.7513 | 30.537 | 3.7195 | 32.01 | 1.60 | 10.532 | 2.131 |
| 100000000 | 363.039 | 30.9858 | 307.9237 | 145.4477 | 773.68 | 154.3183 | 424.88 | 43.3230 | 401.40 | 21.22 | 101.799 | 31.776 |

Figure 18D

| Sequential execution time of the second methodology for Iterative Algorithms: Bubble, Selection, and Insertion Sorts (in seconds) | | | | | | |
|---|---|---|---|---|---|---|
| Number of elements | Sequential Bubble Sort | Bubble Sort with 13 characters Substring | Selection Sort | Selection Sort with 13 characters Substring | Insertion Sort | Insertion Sort with 13 characters Substring |
| 100 | 0.00034 | 0.00005 | 0.00032 | 0.00003 | 0.00020 | 0.00003 |
| 1000 | 0.035 | 0.004 | 0.031 | 0.001 | 0.017 | 0.001 |
| 10000 | 3.520 | 0.431 | 3.203 | 0.130 | 1.625 | 0.075 |
| 100000 | 361.066 | 48.470 | 315.315 | 12.735 | 163.915 | 7.819 |

Figure 19C

| Parallel execution time of the second methodology for Iterative Algorithms: Bubble, Selection, and insertion Sorts (in seconds) | | | | | | |
|---|---|---|---|---|---|---|
| Number of elements | Sequential Bubble Sort | Sort with 13 characters Bubble Merge Hybrid | Selection Sort | Sort with 13 characters Selection Merge Hybrid | Insertion Sort | Sort with 13 characters Insertion Merge Hybrid |
| 1000 | 0.0346 | 0.04 | 0.0313 | 0.04 | 0.0168 | 0.04 |
| 10000 | 3.5203 | 0.11 | 3.2034 | 0.09 | 1.6249 | 0.03 |
| 100000 | 361.0662 | 6.04 | 315.3152 | 4.84 | 163.915 | 1.52 |
| 1000000 | 57962.12 | 725.91 | 42294.38 | 674.40 | 34365.73 | 254.14 |

Figure 19D

| SAlg Approach | First Methodology | | Second Methodology | |
|---|---|---|---|---|
| Execution type | Sequential (.Net) | Parallel (QIM) | Sequential (.Net) | Parallel (QIM) |
| Stage 1 | 6.08 sec | 2.2 sec | 5.67 sec | 2.8 sec |
| Stage 2 | 13.43 sec | 6.7 sec | 30.46 sec | 18.0 sec |
| Stage 3 | 0.23 sec | 0.2 sec | 0.61 sec | 0.8 sec |
| Stage 4 | 6.92 sec | 2.5 sec | 6.02 sec | 2.6 sec |
| Stage 5 | 3.09 sec | 1.4 sec | 1.29 sec | 1.4 sec |
| Total | 29.75 sec | 13.1 sec | 44.05 sec | 25.6 sec |
| Speed Factor (.Net / Total) .Net = 363 Sec QIMS = 401 Sec | 12.2x | 30.7x | 8.24x | 15.6x |

Figure 20C

Parallel Data Sort Methodology, PDS

Bubble Merge PDS

Selection Merge PDS

Insertion Merge PDS

Merge Sort PDS

Block Merge

| | QIM Sort Sequential | QIM Sort Parallel | Merge Sort Sequential | Merge Sort Parallel |
|---|---|---|---|---|
| Sequential and Parallel Execution Time in Seconds for Sorting Using QIM and Merge | | | | |
| 10000 | 0.02 | 0.03 | 0.01 | 0.01 |
| 100000 | 0.17 | 0.06 | 0.13 | 0.06 |
| 1000000 | 2.30 | 0.69 | 1.77 | 0.74 |
| 10000000 | 32.01 | 9.05 | 23.56 | 8.48 |
| 100000000 | 401.40 | 106.75 | 307.92 | 115.63 |

Figure 32B

| | Insertion Sort Sequential | Insertion Merge PDS | Bubble Sort Sequential | Bubble Merge PDS | Selection Sort Sequential | Selection Merge PDS |
|---|---|---|---|---|---|---|
| 1000 | 0.02 | 0.03 | 0.03 | 0.05 | 0.03 | 0.02 |
| 10000 | 1.62 | 0.01 | 3.52 | 1.32 | 3.20 | 1.29 |
| 100000 | 163.91 | 0.86 | 361.07 | 113.15 | 315.32 | 134.09 |
| 1000000 | 34365.73 | 87.95 | 57962.12 | 18584.68 | 42294.38 | 23562.26 |

Sequential Execution Time and PDS time in Seconds for Sorting Using Bubble, Selection and Insertion

Figure 33D

| Execution time for sequential bubble and insertion sort along with parallel bubble and insertion sort using PDS with block merge methodology ||||| 
|---|---|---|---|---|
| Number of Elements | bubble sort | insertion sort | bubble block merge | insertion block merge |
| 1000 | 0.0346 | 0.02 | 0.02367 | 0.097144 |
| 10000 | 3.5203 | 1.62 | 0.013932 | 0.01207 |
| 100000 | 361.0662 | 163.91 | 0.655688 | 0.469731 |
| 1000000 | 57962.12 | 34365.73 | 70.23229 | 43.93884 |

Figure 34C

| Execution time for sequential bubble and insertion sort along with parallel bubble and insertion sort using the first methodology and PDS with block merge ||||| 
|---|---|---|---|---|
| Number of Elements | bubble sort | insertion sort | KOT bubble block merge | KOT insertion block merge |
| 1000 | 0.0346 | 0.02 | 0.031661 | 0.038868 |
| 10000 | 3.5203 | 1.62 | 0.002996 | 0.00237 |
| 100000 | 361.0662 | 163.91 | 0.058164 | 0.03089 |
| 1000000 | 57962.12 | 34365.73 | 3.785383 | 1.009312 |

Figure 34D

INTEGER AND CHARACTERS PREFIX BASED METHODOLOGIES COMBINED WITH PARALLEL DATA SORT METHODOLOGY ENHANCE THE EXECUTION PERFORMANCE OF ANY STRING SORTING ALGORITHM

FIELD OF TECHNOLOGY

This embodiment describes methods of improving the performance of string based sorting algorithms by using a prefix of each string from the input of unsorted string list and convert it to either an integer or a record of characters before running the sorting algorithm.

BACKGROUND

In today's information age, most data are stored as strings. Sorting these huge data helps in easing the accessing and processing of the information within the data. Moreover, whenever there is a need to reset a computer system from a backup data, sorting might be needed and must be done as fast as possible. Thus, fast sorting is needed to expedite the start of the search process in normal mode and after a system crash. Today, there are about 30 generic sorting algorithms and another 30 extensions to these generic sorting algorithms for a total of more than 60 sorting algorithms. One of them is Quicksort (sometimes called partition-exchange sort) is an efficient sorting algorithm.

Most sorting algorithms work on both data types' integers and strings and only a few algorithms work on strings only. With so much of data being produced and hardware available to support it, there is a need for a faster sorting technique to help ease the searching process.

SUMMARY

The instant methodologies gave great performance while sorting in sequential mode. The introduction and implementation of a parallel data sort (PDS) methodology, provides further improvements in sorting.

In one embodiment, a prefix of each string from the input unsorted string list is converted to an integer and placed in a list. The list of integers is sorted using the given sorting algorithm. The input unsorted list is then sorted using the sorted integer list as a reference. Given an unsorted string array (USTA) and a sorting algorithm (SAlg) to sort USTA, where SAlg represents one of the sixty sorting algorithms.

The first methodology is performed in five stages (FIG. 1): Prefix extraction from strings in unsorted string array (UNSA) and converting the prefix to an unsigned long integer (ulong) and storing the result in an array with records of integers (ARI). Each record in the ARI holds two integers: the ulong (eight byte) and an integer (four bytes). The ulong integer will hold the converted value of the prefix and the integer will hold location of the string in UNSA of the prefix.

Sorting ARI using the SAlg and on the ulong integers in the ARI. After sorting, there may exist some equal values ulongs in the array ARI. Finding the lists of equals in the ARI and placing their starting location and the location of the last equal values in an array with record of integers (EVARI), where each record holds two integers each holding the location values of the starting and the last, respectively.

Transferring the unsorted array to an array called sorted string array (SSTA), using the integer value in the sorted ARI as a reference. Sorting the list of equals, if they exist in the ARI, using SAlg with EVARI that indicates which list needs sorting. The sorting will be done on the string of the SSTA.

First Methodology Design Options: The first stage of this methodology requires the conversion of string prefix to numeric value. A decision need to be made on the conversion method and on the size of the integer type that would hold the converted string prefix. The choice will be made on the best conversion method and the size of integer data type that would lead to the best performance of this stage.

There is several integer data type with different sizes that could hold the converted prefix integer values. A benchmark evaluation will be made to find the best size integer for the first stage of this methodology. There are four integer types: short integer, integer, long integer, and the integer part of a decimal data type. Short integer are two bytes long or 16 bits and generally referred to as Int16. The Int16 could hold a converted string prefix of three characters long. Integers are four bytes long or 32 bits and generally referred to as Int32. The Int32 could hold a converted string prefix of six characters long. Long integers are eight bytes long or 64 bits and generally referred to as Int64. The Int64 could hold up to thirteen characters of a converted string prefix. On the other hand, the integer part of a decimal data type has 96 bits to hold its integer value which allows it to hold up to 20 characters of string prefix.

A benchmark test was made to evaluate the performance of the integer size on the first methodology. FIG. 4A and FIG. 4B show the results of running all integer sizes. Int64 performed best for both sequential and parallel mode for the first methodology. Thus, Int64 or ulong will be adapted for the first methodology. Detailed discussion of these results will be made in this document.

Once the integer data type is chosen, the choice of the best table lookup for the conversion of the characters in the string prefix to numerical value comes. Here, we tested three methods: the linear search method, the hash table search, and the ASCII table lookup method (we called it here the KOT method). Description of each method is discussed in details when presenting the detailed description of this methodology. However, short benchmark results showed that the KOT method was much faster than the other methods (FIGS. 9A and 9B).

After choosing the integer type and the numeric conversion method, the benchmarking test to find the algorithm that would have best performance with this methodology comes. At first, we found that .Net sort, developed by Microsoft, gave a better performance in the sequential mode of the methodology. For that purpose .Net sorting was chosen as the default SAlg when evaluating and benchmarking stages of both methodologies in sequential mode.

The .Net sorting is a hybrid algorithm made up from three sorting algorithms: quicksort, heapsort, and insertion sort. However, there is no parallel version of .Net algorithm. For testing an algorithm that have a parallel version, we have developed a new hybrid adaptive algorithm that uses quicksort, insertion sort, and merge sort and called it QIM algorithm. When executing QIM while using the PDS methodology had great performance results for the parallel mode. When testing for parallel execution of the methodologies, we used QIM as default. When discussing the details of the first methodology we shall expand on the performance of various sort algorithm including QIM.

In summary, the design choices would be to use Int64, KOT method, and .Net sort as the default standard for evaluating and comparing the first methodology. Int64 will be used in the unsigned mode which will be called ulong.

The sort algorithm .Net is chosen because it is a standard for the Windows environment. However, for parallel sort QIM, under PDS, is used as the standard.

Choosing the Int64 for numeric process means that the maximum prefix size is thirteen characters for alphabetic string and twelve characters for alphanumeric strings.

The question now is what to do when the string length is shorter than the assigned prefix length? Would the prefix be padded or not (where padding means adding extra characters to the short string to make it the size of the prefix)? Not padding the prefix would result in wrong sorting results, where the prefix with characters "ANT" will have higher numerical value than the prefix "TO". To solve this problem, a padding character is chosen. A number of the chosen padding characters would be appended to the string to achieve the prefix size.

There are two types of padding, right padding and left padding. By adding an extra character to the left of the string and up to the assigned prefix size, we have a left padding like: (""""""""""ANT and """"""""""TO), whereas right padding is adding a character to the right of the string like: (ANT"""""""""" and TO""""""""""). Left padding will make the prefix "TO" smaller than "ANT" while right padding will make "TO' larger than "ANT". Based on these results, we used right padding. Therefore, with right padding each prefix will be thirteen characters long regardless of the string size.

Finally, we would like to present our evaluation metrics for both methodologies. Generally, when a system is slightly faster than another system, we give the percentage of performance gain. However, if the new system is more than twice faster than the common method, then we use the term speed factor, which is the number of times the new system is faster. If the new system is twice as fast, then the speed factor is two, three times faster the speed factor is three and so on.

If there is a speed factor evaluation comparison, then comparison will be made with the SAlg as the .Net sorting algorithm running in sequential mode without the methodology. On the other hand, the default data size would be a hundred million alphabetic strings with variable size stings. This ensures that the methodology does not modify the algorithm being used in sequential mode. On the other hand, parallel QIM with PDS will be used as default when both methodologies are running in parallel mode. Sorting Data in Parallel Mode is done. Our performance enhancing methodologies would have great results if it runs in parallel along with a parallel sorting algorithm SAlg.

Most of today's computer systems have multiple processors. In order to fully utilize these multiple processer, the data need to be processed in parallel. Most sorting algorithms were designed and written to run in sequential mode. Having a parallel version of the algorithm may require redesigning and rewriting. Such steps may be hard because some algorithms are inherently sequential in nature. To solve this riddle, we are suggesting a methodology that we call it Parallel Data Sort, or PDS, which allows many sequential sorting algorithm SAlg to run in parallel The parallel sorting methodology (PDS) has the objective of sorting the data in parallel using any sorting algorithm SAlg, rather than redesign SAlg to sort the data in parallel. The methodology uses the following steps:
a. Divide the data to be sorted into blocks.
b. Sort the data in the blocks in parallel using SAlg. Each processor or threads sorts a data block.
c. Group every two sorted blocks and sort them together into one larger sorted block using SAlg again.
d. Repeat the previous step until the whole data is sorted.

Here, SAlg is used twice, first to sort unsorted blocks then secondly SAlg is used to sort two fused independently sorted blocks. If the SAlgs in both are different then we have a hybrid algorithm; otherwise, we have SAlg with merging capability. Details of this methodology will be discussed later in this document.

BRIEF DESCRIPTION OF FIGURES

This embodiment is illustrated by way of example with no limitation in the tables and in the accompanying figures, and in which:

FIGS. 4C and 4D show the tables of the running time in seconds of the methodology for different size integers that hold the numerical value of the prefix.

FIG. 5 shows the tables used for the linear search method of prefix computation conversion to numerical values.

FIG. 6 shows the hash tables used for the hash search method of prefix conversion to numerical values.

FIGS. 7A, 7B, and 7C show sample ASCII tables for lookup (KOT method) for prefix conversion to numerical value for stage one of the first methodology.

FIGS. 8A and 8B show how the thirteen-character prefix "ACKNOWLEDGMEN" for the word "ACKNOWLEDG-MENTS" and how the extracted characters get their value from the lookup search tables. Then, the numerical value for the prefix is computed.

FIGS. 9C and 9D show the tables with the running time in seconds along with the speed factor gained for the sequential and parallel execution of the first methodology for alphabetic strings using the three-table lookup methods and SAlg is .Net Sort (QS).

FIGS. 10C and 10D show the tables with the running time in seconds of each algorithm, then the computation of the speed factor gained for the sequential execution of the first methodology for alphabetic and alphanumeric character strings, where SAlg is .Net, Merge, Quick and Heap Sort; all compared to their sequential running time alone, respectively, for the speed factor evaluation, which clearly shows the effect of the first methodology.

FIGS. 11C and 11D show the tables with the running time in seconds of each algorithm, then the computation of the speed factor gained for the parallel execution of the first methodology for alphabetic and alphanumeric character strings, where SAlg is .Net, Merge, Quick, Heap, and QIM Sort; all compared to sequential running time alone, respectively, for the speed factor evaluation. Here, the PDS methodology is used with QIM and Merge algorithm.

FIGS. 12C and 12D show the tables with the values of the running time in seconds of the iterative algorithms using the first methodology, then the speed factor gained for the sequential and parallel execution of the first methodology is computed. Here, SAlg is either Bubble, Selection, or Insertion Sort and the comparison for the speed factor is done in comparison with the same algorithm running in the sequential mode without the first methodology. Here, the PDS methodology is used in Bubble, Selection, and Insertion algorithms.

FIGS. 16C and 16D show the tables with the running time in seconds of .Net algorithm for three or more characters records. Note that the speed factor is a comparison of the running time for .Net sort in sequential mode, which took 363 seconds to sort 100,000,000 elements, to the running time of the same .Net algorithm running using the second methodology.

FIGS. 17A, 17B, 17C and 17D show the speed factor for sorting arrays with fixed size strings. For example, the fixed size alphanumeric string of six character used by airlines to represent passenger name record (PNR). PNR is used for flight booking, reservation, and checking in. The graph representing the speed factor for the execution of both the first and the second methodologies. The first methodology uses Int32, KOT, and .Net sort in sequential run and QIM under PDS in parallel run. The second methodology uses character records with six characters while .Net sort in sequential run and QIM under PDS in parallel run as shown in FIGS. 17C and 17D.

FIGS. 18C and 18D show the tables with the running time in seconds of each algorithm under different load of elements to be sorted. The speed factor is computed in comparison to the corresponding SAlg running without the methodology. Here, the PDS methodology is used with QIM and Merge algorithms.

FIGS. 19C and 19D show the tables with the running time in seconds of each iterative algorithm under different load of elements to be sorted. The speed factor is computed in comparison to the corresponding SAlg running without the methodology. Here, the PDS methodology is used with Bubble, Selection, and Insertion algorithms.

FIG. 20C show the tables of the actual running times in seconds for the sequential and parallel executions, as well as the speed factor gains.

FIGS. 32A and 32B show the speed factor gained between parallel and sequential execution for QIM and merge sort under PDS using a processor with six-core processors and 12 threads. The speed gain for QIM was more than 3 times faster, while merge sort was more than two times faster than the sequential run, respectively.

FIG. 33D shows the table for sequential execution time and PDS time in seconds for sorting using bubble, selection, and insertion.

FIG. 34C shows the execution time for sequential bubble and insertion sorts along with parallel bubble and insertion sorts using PDS with block merge methodology.

FIG. 34D shows the execution time for sequential bubble and insertion sorts along with parallel bubble and insertion sorts using the first methodology and PDS with block merge.

DETAILED DESCRIPTION

Figure 1:
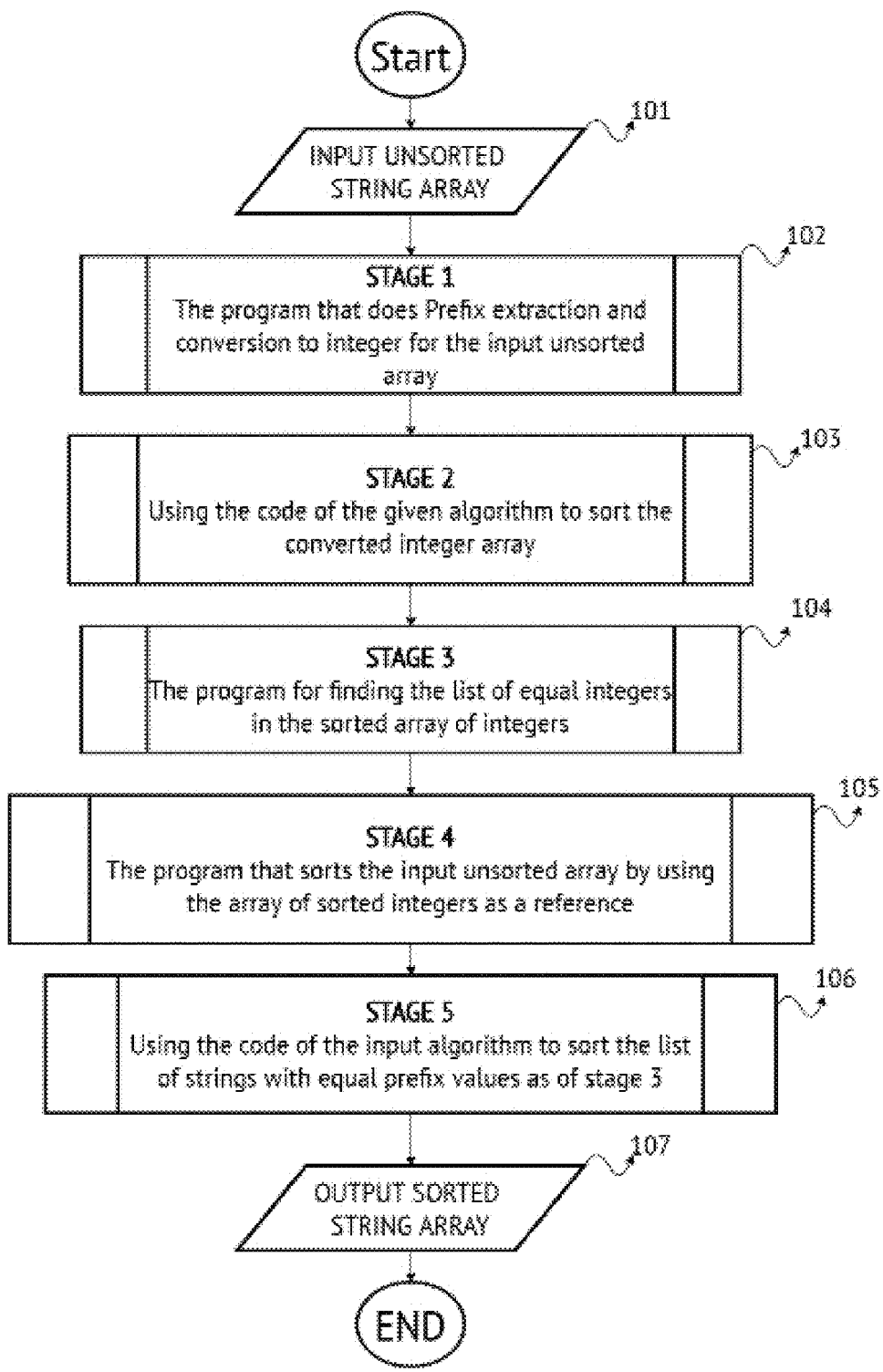
FIG. 1 shows a flowchart for the five stages of the first methodology: the integer prefix-based sorting method.

For this embodiment and in the following discussion, a detailed description will be given that explain the five stages of the first methodology. Detailed explanation on the decisions of the choice of Int64 and KOT as default while the default SAlg is .Net for sequential execution and QIM for parallel execution.

Integers are mutable data types that are stored by value, have fixed size and have strong hardware support. Similarly, character data type are stored by value, have fixed size and hardware support. On the other hand, strings are immutable data types that are stored by reference and may be declared with variable or fixed size. Storing by value means that the data are stored at the memory location indicated by the address of the variable. However, storing by reference means that at the address of the variable there be a pointer (another address) to a memory location, called memory heap, where the value of the variable resides. The central processing unit, CPU, of the computer accesses data from the cache memory, a fast access memory. Data need to be moved from main memory to the cache, this is accomplished by a cache line a 64-byte memory bus. If the data requested by the CPU is in the cache, then we have a cache hit and if not, then we have a cache miss. If data is requested from an array in a sequential order, then the data are likely to be in the cache. This is called spatial locality. Thus, spatial locality increases the cache hits. When loading the cache line with integers from an array, the cache line will hold multiple integers that are stored by value. Having a sequence of integers from one array in the cache will exhibit spatial locality and thus, more cache hits. The same properties hold for character data type or record of characters. On the other hand, an array of strings will hold pointers. When this array is accessed, the cache line will have pointers. When accessing the strings, the CPU has to use the address in the pointer to access the string. This will likely cause a cache miss. These facts make sorting integers or a record of characters to be much faster than sorting strings. To this end, two methodologies were designed to take advantage of the integer properties or record of characters when sorting strings.

The five stages of the first methodology: Assumption is given an UNSA and a sorting algorithm (SAlg) to sort UNSA: Prefix extraction from strings in UNSA and converting the prefix to an unsigned long integer (ulong) and storing the result in an array with record of integers (ARI). Each record in the array holds two integers: the ulong (eight byte) and an integer (four bytes). The ulong integer will hold the converted value of the prefix and the integer will hold location of the string in UNSA of the prefix.

Sorting ARI using the SAlg and on the ulong integers in the ARI. Finding lists of equals in ARI and placing their starting location and the location of the last equal values in an array with record of integers (EVARI), where each record holds two integers each holding a location value, an index of ARI. Then, continue looking in the ARI array for other lists of equals and record their location first and last.

Figure 2:
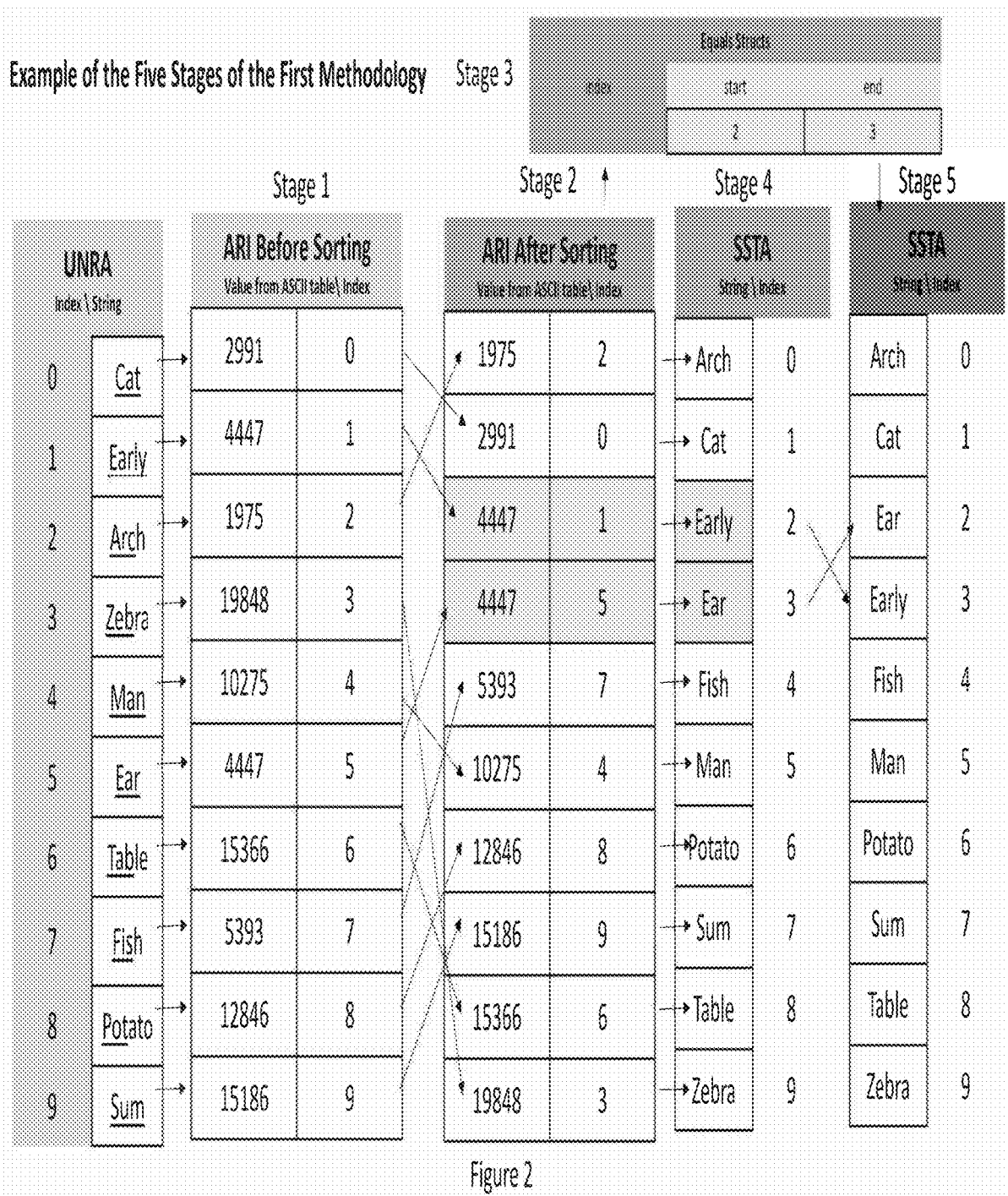
FIG. 2 shows a simple example of the first methodology taking the value of the string (first 3 characters) as a Prefix from the input strings and converting this prefix to an Integer Value for the sorting process shown.

Transferring the unsorted array UNSA to an array called sorted string array (SSTA), using the integer value in the sorted ARI as a reference as in FIG. 2.

Sorting the list of equals, if they exist in the ARI, using SAlg with EVARI that indicates which list needs sorting. The sorting will be done on parts of the SSTA, the lists with equal prefixes, done in the fourth stage. Since the list of strings to be sorted have equal prefixes, the comparison starts at the fourteenth character (or after the prefixes).

Details of all the stages of the first methodology are explained in the flowchart in FIGS. 3A, 3B, 3C, and 3D. Detailed discussions are in the following paragraphs.

Stage one: converting the prefix to unsigned long integer: First, the properties of integers are explained, then the conversion process is discussed. Integer data types come in three sizes: short-integer, integer, and long-integer with sizes of two bytes, four bytes, and eight bytes, respectively while decimal data type has an integer part of twelve bytes or 96 bits. Integers are of base ten. The long integers (eight bytes with 64 bits) may hold an unsigned integer (called ulong) that can hold a number up to 18 digits base ten (ten possible digits 0-9). Alphabets are of base 27 (26 alphabetic characters and one padding character). Alphabets may represent an integer's value. And an integer may also represent an alphabetical value. Unsigned integer (base ten) may represent up to 13 characters of alphabetical value (base 27) $27^{13}$ and up to 12 alphanumeric characters (base 37) or $37^{12}$ all represented by integers whose values are in the range of: $27^{13} < 10^{18} < 2^{64}$. On the other hand, the integer part of a decimal type may represent 20 characters of alphabetical value and up to 18 alphanumeric characters. All represented by integers whose values are in the range: $27^{20} < 10^{28} < 2^{96}$.

Methods of converting the string prefix to numerical value: Converting a prefix string of 13 characters to numerical value has been accomplished using three-table conversion methods. The three methods works on table lookup. Linear search, hash table search, and KOT lookup search. Linear search prefix conversion: The simplest to understand is linear search method. Here, an array of records is created where each record holds a character and an integer. The character and its value. The set of characters that constitute the strings to be sorted are placed in this record array. Each character is given a unique value, while a value one assigned to the padding character. Both the character and its value are placed in the array of records. For prefix conversion, we shall create 13-record arrays with the same characters, but their values are different from one array and the other. In the thirteenth array, the values will be from 1 to 27. In the twelfth array, the values would be 27, 54, 81, or $27^1$ multiplied by the values in the thirteenth array and so on. The first array will have $27^{12}$ multiplied by the values in the thirteenth array. Starting with the left most character in the 13-character prefix and search for it in the first array and placing its value in an accumulator. Then, search for the second character in the second array and adding its value to the accumulator. This process continues on the third and fourth up to the thirteenth character and in every step adds the values to the accumulator. The resulting sum in the accumulator would be the numerical equivalence of the prefix of the string (FIG. 5 and FIGS. 8A and 8B).

Hash table prefix conversion: Here, again 13 hash tables are created holding the same values as those in the linear search. In FIG. 6, a simple hash function is presented to simplify the hashing process. The characters in the prefix are processed one character at a time starting with the leftmost. The chosen character is hashed, where its binary value becomes an input to a hash function and the resulting integer is used as an index to the designated hash table. This is similar to linear search and uses an accumulator to add all the results from the 13 hash tables and get the required numerical value of the prefix (FIG. 6 and FIGS. 8A and 8C).

Using KOT method for prefix conversion: In this method we use an idea first introduced in patent claim (U.S. Pat. No. 9,009,200). In the hash table method, the binary value of each character is used by the hash function to get the table index, where the value of the character is stored. In other words, there is a need to compute the address of the character (hash function). In the KOT method, the actual binary value of the character is itself the index, where the value of the character is stored. To accomplish this property, a table with the size of the ASCII table is built and only the location of each character in the ASCII table is filled with the designated value of the character while the other cells in the table are set to zero (FIGS. 7A, 7B, and 7C). Thirteen of these ASCII table sizes are built. Each table holds the character value multiplied by $27^i$, where i ranges from 0 to 12. The direct access for the characters values, no hash function computation, makes this method very fast. This is similar to linear search and uses an accumulator to add all the results from the 13 ASCII tables and get the required numerical value of the prefix (FIGS. 8A and 8B).

Figure 9A:
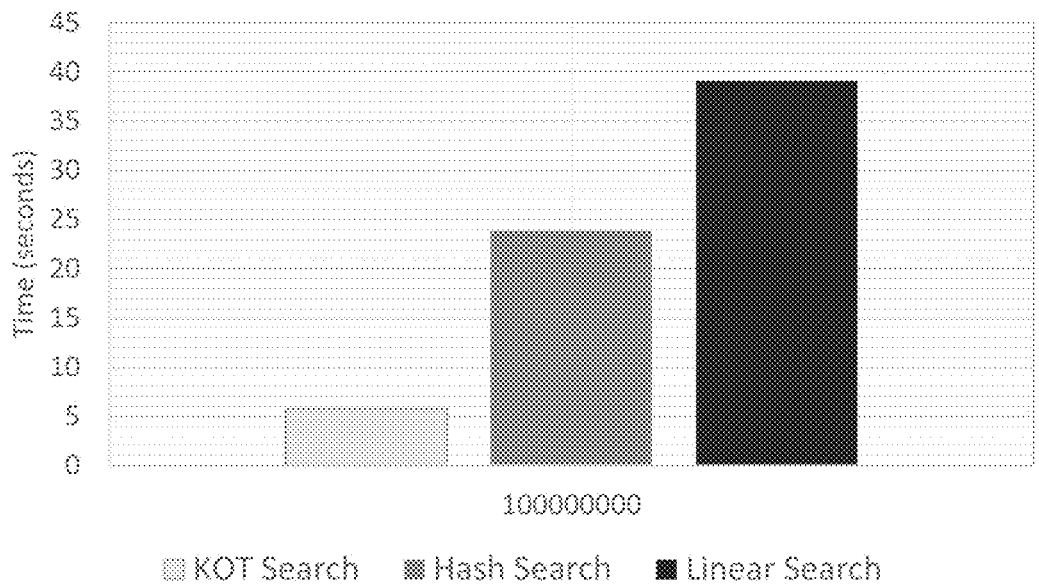
FIGS. 9A and 9B show the graphical comparisons for the speed factor gained for the sequential and parallel execution of the first methodology for alphabetic strings, using the three-table lookup methods: KOT, linear, and hash table search methods. The .Net Sort is SAlg used here, and one hundred million, variable size string, data elements. On the other hand.
Figure 9B:
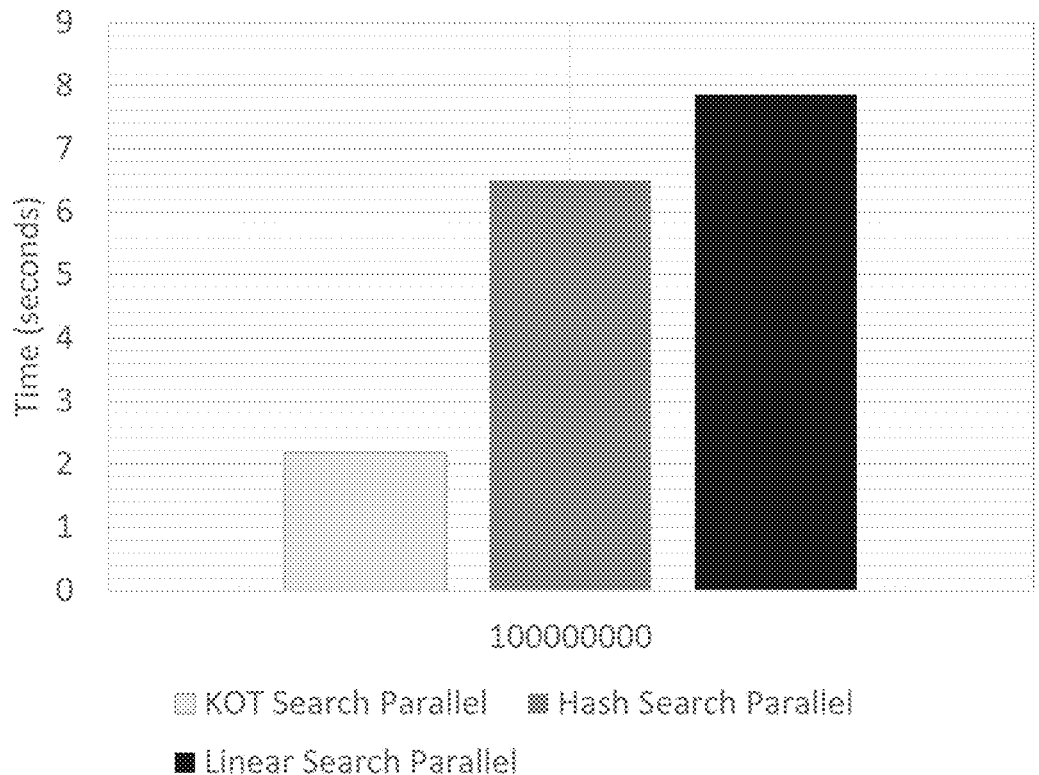

Testing the three-prefix conversion methods: Testing these prefix conversion methods on 100 million prefixes and the result is shown in FIGS. 9A and 9B. These figures exhibits the comparison of the running time in seconds of the three-table lookup methods in sequential and parallel modes. The figures show the KOT lookup method was superior. The parallel mode was with six processors only. With more processors, the parallel mode will likely have shorter time.

The sorting process: Once the array ARI is filled then the sorting starts using the code of algorithm SAlg. As mentioned earlier, the algorithm SAlg is used twice, once for sorting the ulong integers in the ARI and again on the strings with equal ulongs integers. The code of algorithm SAlg is not modified in this methodology. In the second sort, SAlg will sort the strings that have equal ulongs and are specified by the values in the record of integers of the EVARI. String comparison will start at the thirteenth character; thus saving comparison time. Since there are multiple lists of prefix strings that have equal ulongs, the process of sorting these lists could be done in parallel for faster process.

Experimental results on the first methodology: A prefix of 13 alphabetic characters are taken from the strings to be sorted and converted to a numerical value and assigned to an unsigned long integer variable (ulong). An array of records with two integers is created that would be parallel to the array of strings to be sorted. In the record, one ulong integer would hold the value of the converted prefix integer (CPI), while the second unsigned integer (4 bytes) would hold the location of the string in the array of strings to be sorted (UNSA). This array of records is sorted based on the ulong for the converted prefix integer CPI. After sorting, some CPI may have equal values. A note is taken for all CPI of equal values and their location, where they start and where they end; first and last location are stored in a new record array called equal values array integer record (EVARI). Once sorting is complete, a new array, sorted string array (SSTA), is created and copy of the strings of the original array (UNSA) are moved to new array (SSTA) using the second integer in the array of records ARI as a reference. An example is demonstrated in FIG. 2.

Sorting strings having equal value prefixes: The newly sorted array SSTA may not be completely sorted because some strings may have prefixes of equal values. Now the EVARI is accessed and the sorting algorithm SAlg is applied to sort every group of strings with equal value prefixes. Each record in the EVARI array holds two integers, one pointing at the beginning and the second integer pointing at the end of the list of strings that have equal value prefixes and require sorting. The sorting will be accomplished by SAlg. Note that the sorting will be comparing the strings not from the start of each string but rather from the location in the string after the prefix, at the fourteenth character, which will result in faster comparison. Thus, SAlg will be used twice, once on the integer array for sorting the CPI and later on strings of SSTA array and using the EVARI as a reference guide. The first SAlg was used for integer sorting and in the later SAlg was used for string sorting. The number of strings sorted in later stage is much smaller in size than the original unsorted array UNSA, and done in parallel, resulting in much faster sorting time. This is true for Int64, but did not apply for Int16 and Int32, where the list of equals was very large (FIGS. 4C and 4D).

Figure 20A:
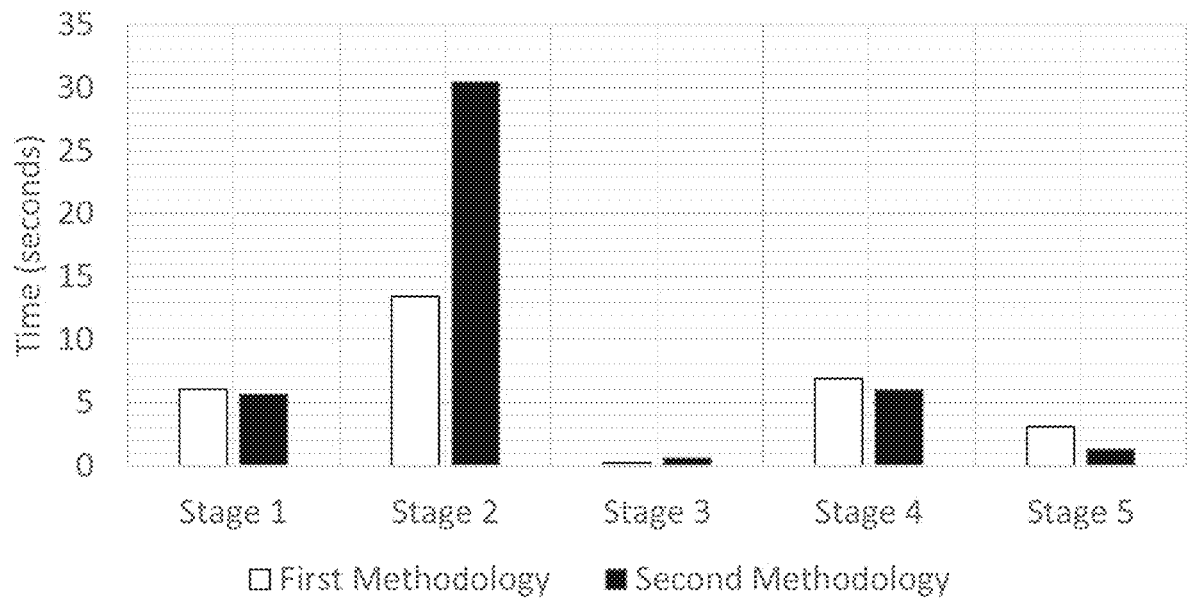
FIGS. 20A and 20B show graphical comparisons of the sequential and parallel running time of the five stages for both the first and the second methodologies.
Figure 20B:
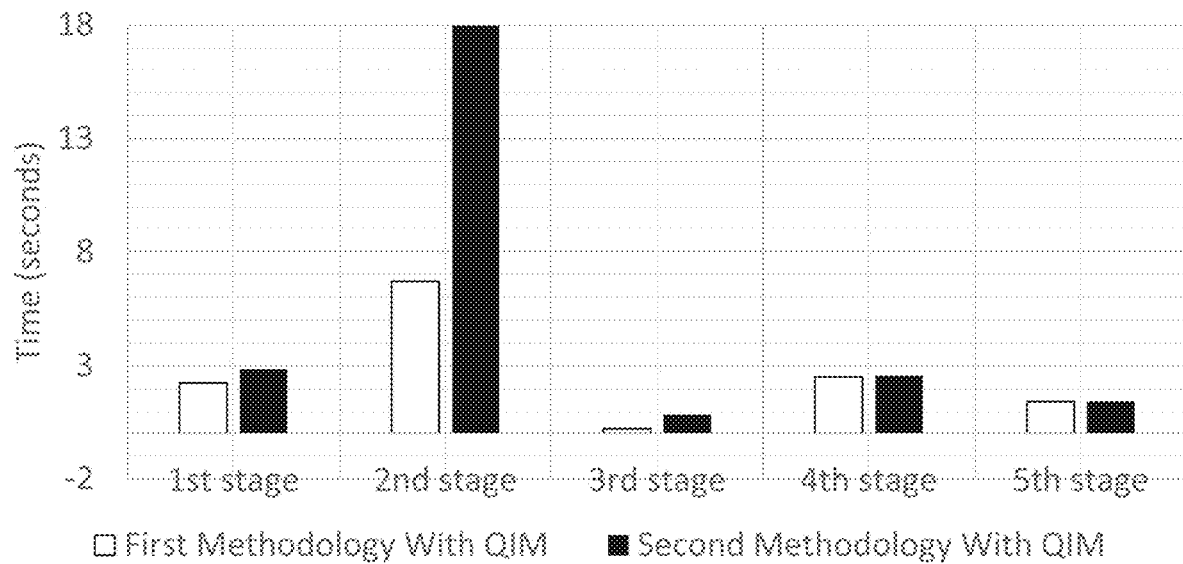

Running the first methodology in parallel: The first methodology could run in parallel, where stages one, three, four and five could run in parallel. Stage two could run in parallel by running SAlg algorithm run in parallel internally, which is not part of the methodology. The methodology uses the SAlg without coding it. FIG. 20 A, 20B, 20C shows the result of running the methodology in parallel while the SAlg running sequentially (.Net sort). However, if the user using the methodology and could write a parallel code for SAlg, then the result is called fully parallel as in FIG. 20B. On the other hand, we introduced a new methodology called Parallel Data Sort, PDS, for sorting data in parallel. PDS was implemented in QIM code, parallel merge, bubble, selection, and insertion sorts where they gave superior results in performing parallel execution for the second stage of the parallel first methodology.

Conclusion and results of the first methodology: This embodiment does not present an algorithm but rather a methodology that improves the performance of almost any string sorting algorithms. This methodology was tested on quick, heap, and merge sorts (algorithms with complexity O (N log N)). The results for sequential execution showed an average speedup factor gain of eleven, eight, and four, respectively, on variable length strings of alphabets only. For parallel execution and using the parallel methodology, the speed factor increased to over forty for QIM. Furthermore, after testing this methodology on slow, iterative algorithms with complexity O ($N^2$): bubble sort, selection sort, and insertion sort, the results showed an average speedup factor of 25, 45, and 70, respectively, on variable length strings of alphabets only. For parallel execution and using the parallel methodology PDS the speed factor increased to over four hundred for parallel Insertion and merge insertion. However, the speed factor using QIM, in parallel mode, on fixed size alphanumeric strings, of six characters, was about 60 (FIG. 10).

Summary of the Second Methodology: The details of the second methodology will be discussed in details in the following paragraphs.

The second methodology has also five stages like the first methodology. The five stages are very similar in functionality of the first methodology except for stage one. Moreover, the second methodology uses different data structure than that of the first methodology.

Given an UNSA and a sorting algorithm (SAlg) to sort UNSA, the five stages of the second methodology are:

Prefix extraction from strings in UNSA and converting the prefix to a list of characters making up the prefix and storing the result in an array of character records ACHR. Where each record holds the characters making up the prefix and an integer to store the location of the string in UNSA.

Sorting the ACHR array using the SAlg. Finding lists of character records having the same characters or equals in ACHR and placing their starting location and the location of the last equal in an array of integer record is called EVARI, equal value array with record integers. Each record in EVARI holds two integers, each holds a location value one for the appearance of the records with the same characters or equals and the other of last appearance of the equals in the list found. Then, continuing to look in the array for other lists of equals and record their location first and last. Transferring the unsorted array to an array, sorted string array (SSTA), using the location integer in the sorted ACHR as a reference. Sorting the list of equals if they exist in the ACHR using SAlg with EVARI that indicates which lists with the same characters in the extracted prefix that need sorting. The sorting will be done on the SSTA using SAlg by running real string sorting. Since these lists are short and the number of lists is also small, this makes the operation fast for this stage when done in parallel (FIGS. 16A, 16B, 16C, 16D).

Details of the second methodology: In the following paragraphs, the second methodology will be presented in more details with its advantages over the first methodology and its drawbacks.

Stage one: Converting the prefix to record of characters: First, the properties of character data type are explained, then the conversion process is discussed. Character data type come in two sizes: ASCII or UNICODE, with sizes of one bytes or two bytes, respectively. ASCII represents English language characters while Unicode represents all languages, including the English language. Most of today's computers use Unicode. The cache line of 64 bytes may hold a character record with a maximum of thirty Unicode characters plus an integer that holds the location of the string from which the prefix was taken. On the other hand, the cache line may also hold six records, each has four elements: three Unicode characters, six bytes, and the integers (four bytes) that hold the location of the string from which the prefix was taken; a total of ten bytes. The string prefix is built getting a copy of characters from the string and assigning them to their proper location in the record of characters. Then, the index of the string in UNSA is assigned to the integer part in the record of character. The process continues until all copies of prefixes are assigned to the ACHR.

Testing the effect of the number of characters in a record or the string prefix size: FIGS. 16A, 16B, 16C, and 16D show the speed factor for quicksort sorting hundred million elements in sequential and parallel modes using the second methodology and for three to thirty in character record. As seen in the figure, the speed factor was low for small number of characters, then increases as the number of characters increase, but then almost stabilizes from twelve to thirty characters per record.

Stage two: The sorting process. Once the array ACHR is filled, the sorting starts using the code of algorithm SAlg sorting character records rather than strings. Since characters and record of characters are stored by value, the sorting process was very fast compared to sorting strings, which are stored by reference (FIGS. 16C and 16D).

Figure 14:
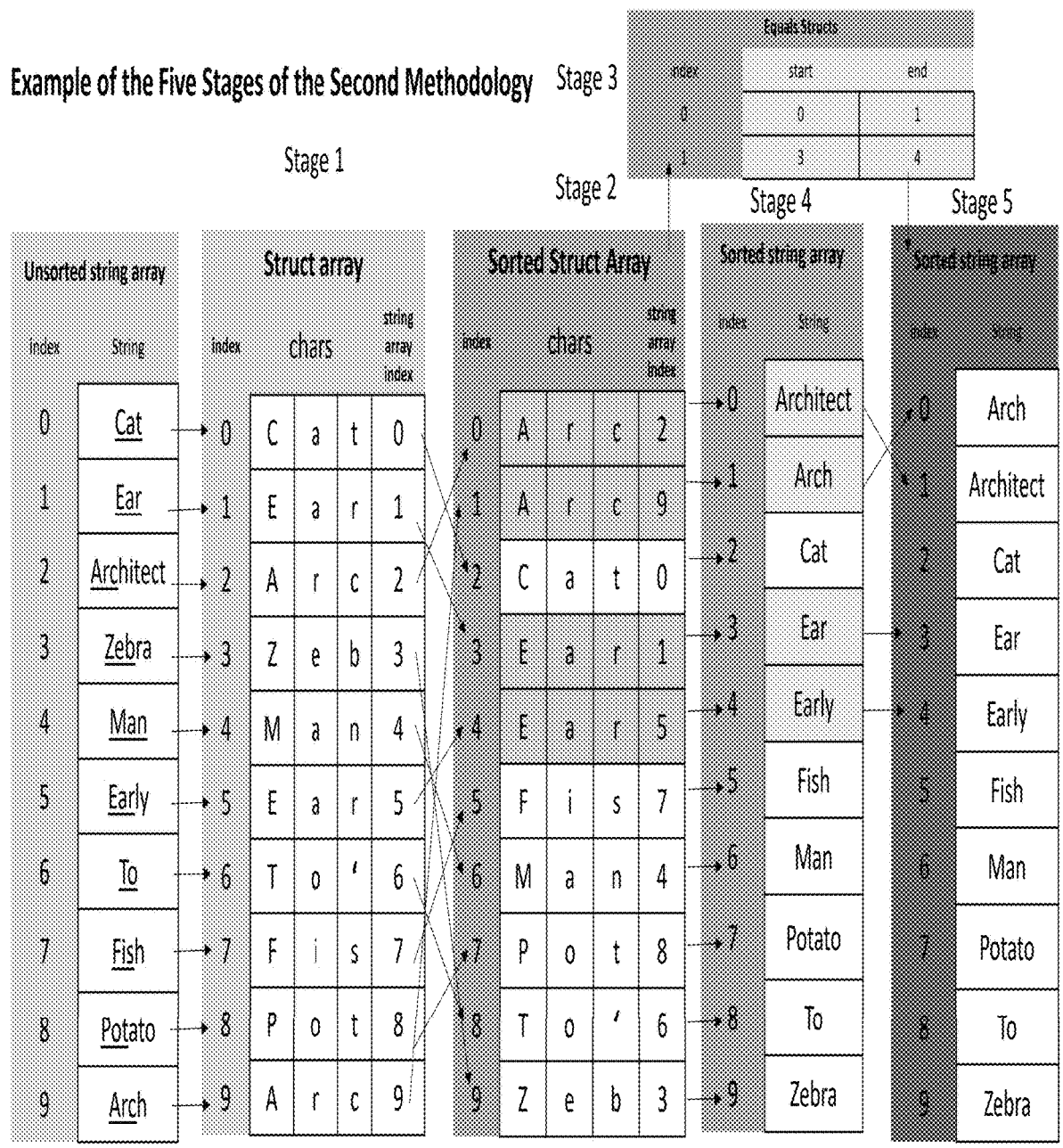
FIG. 14 shows a sorting example of the second methodology using a record structure of 3 characters and an integer.
Figure 15A:
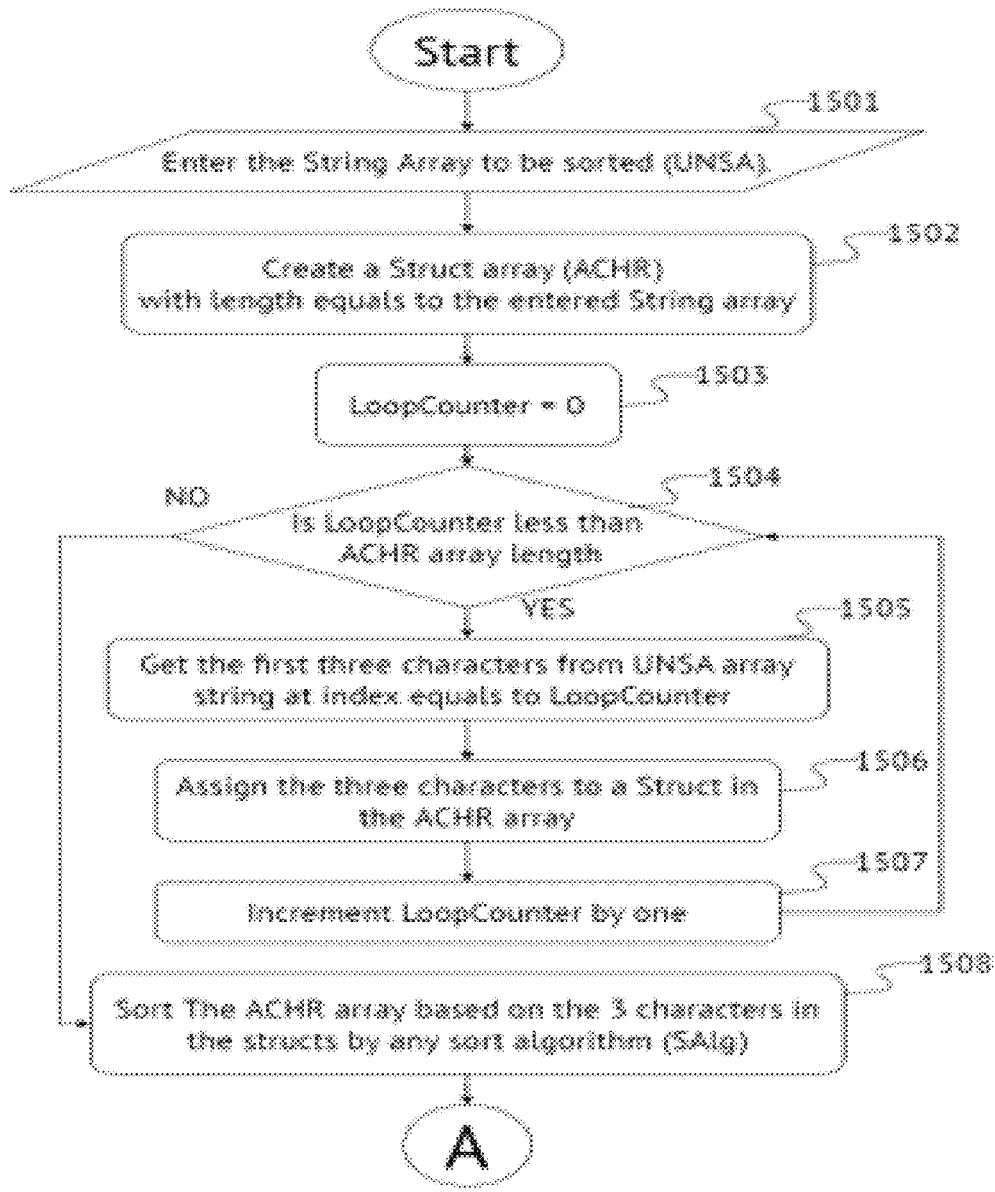
FIGS. 15A, 15B, 15C, and 15D show the detailed flowcharts for the five stages of the second methodology.
Figure 15B:
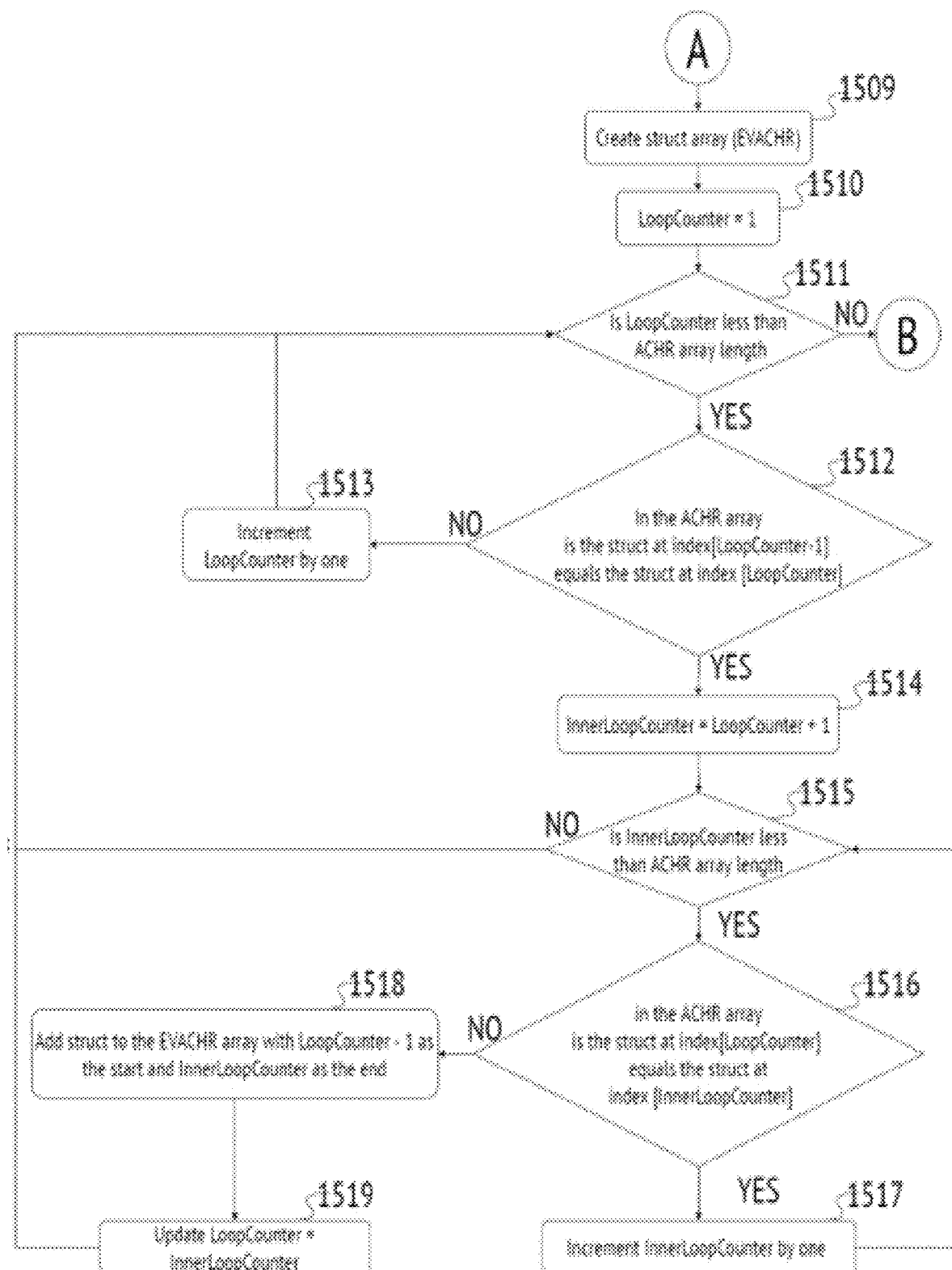
Figure 15C:
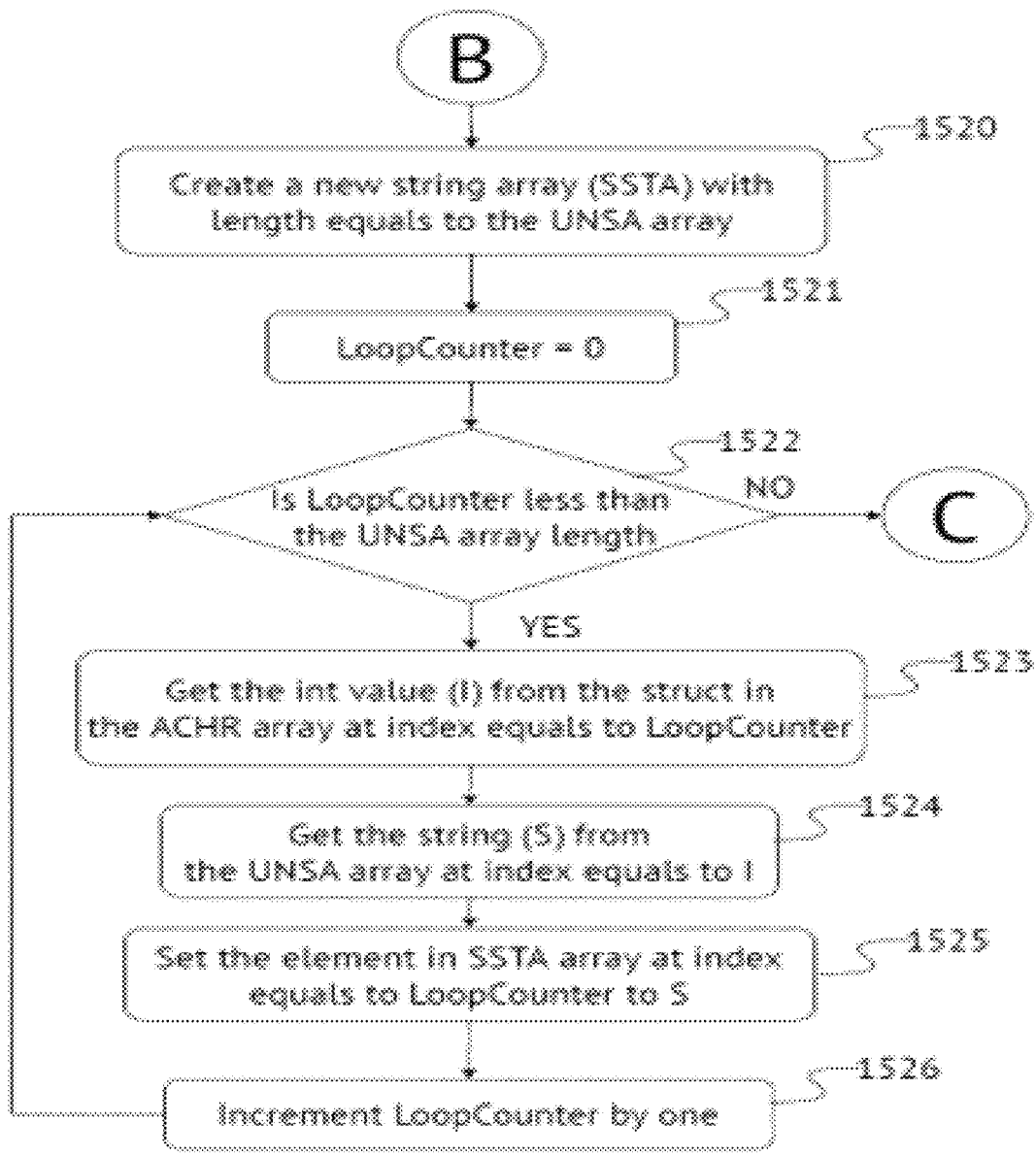
Figure 15D:
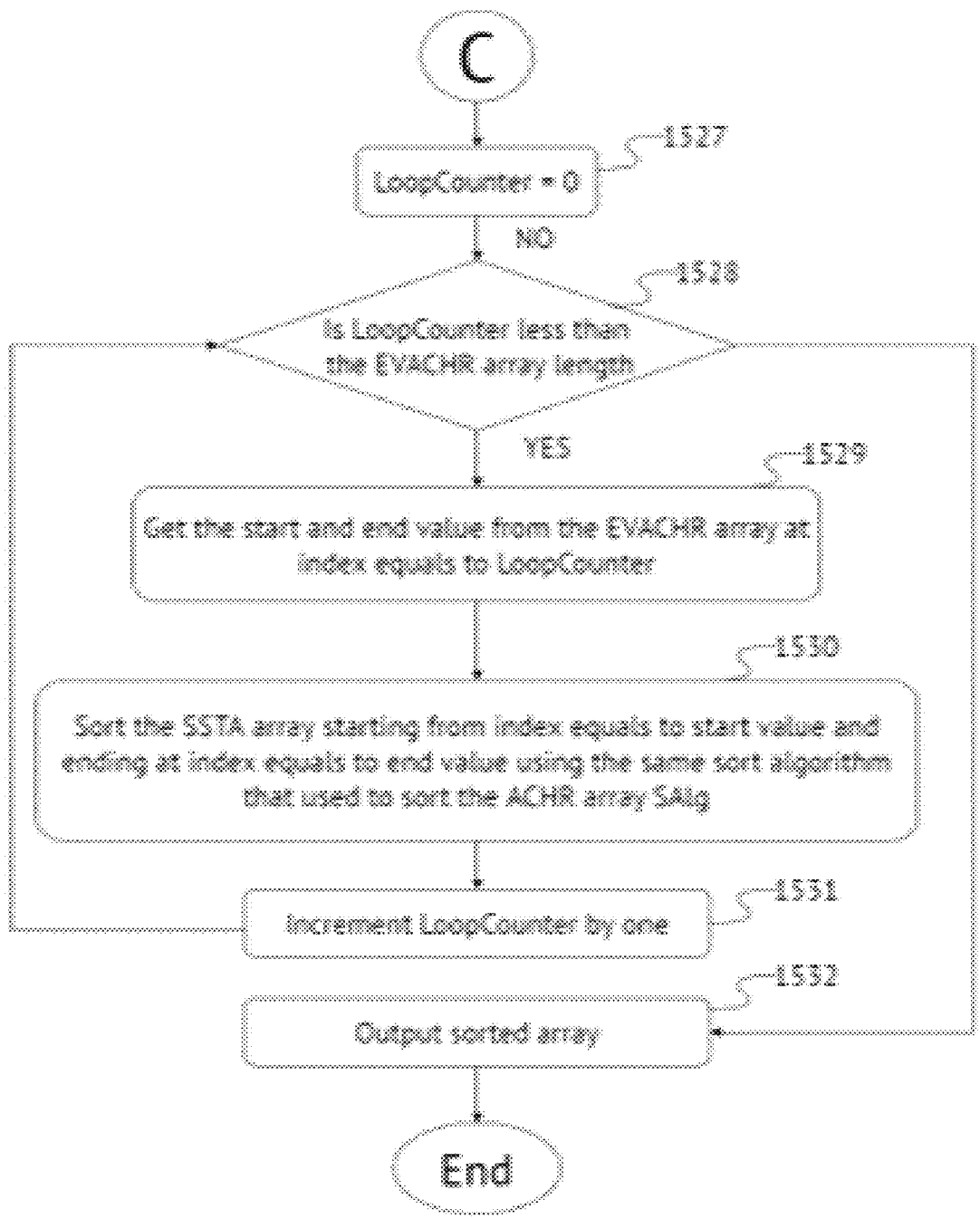

Stage three: Finding lists of equals. The sorted ACHR is scanned to look for character records with the same characters. An array of integer records is created for these character records with same characters, which we call it equal values array of character record (EVACHR). Each record structure in EVACHR has two integers, the first holds the location of the first character record and the second holds the last character record with the same characters. This is followed by continuing to scan the whole ACHR and recording the locations, all record of characters with same characters, in EVACHR (FIG. 14).

Stage four: Sorting strings having equal value prefixes. The newly sorted array SSTA may not be completely sorted because some strings may have prefixes of equal values. Now the EVACHR is accessed and the sorting algorithm SAlg is applied to sort every group of equal values. Each record in the EVACHR array holds the beginning and end of the strings that require sorting and the sorting will be accomplished by SAlg on the stings in SSTA. As mentioned earlier, the algorithm SAlg is used twice, once for sorting the character record in the ACHR and again on the strings with equal prefixes with character records having the same characters. In the second sort, SAlg will sort the strings that have prefixes with same characters or character records with the same characters. The sorting here will be in the string starting at the character after the prefix, and not at the beginning of the string; hence, reducing the number of characters for comparison. Since there are multiple lists of prefix strings that have equal character records, the process of sorting these lists could be done in parallel for faster processing (FIG. 14).

Figure 18A:
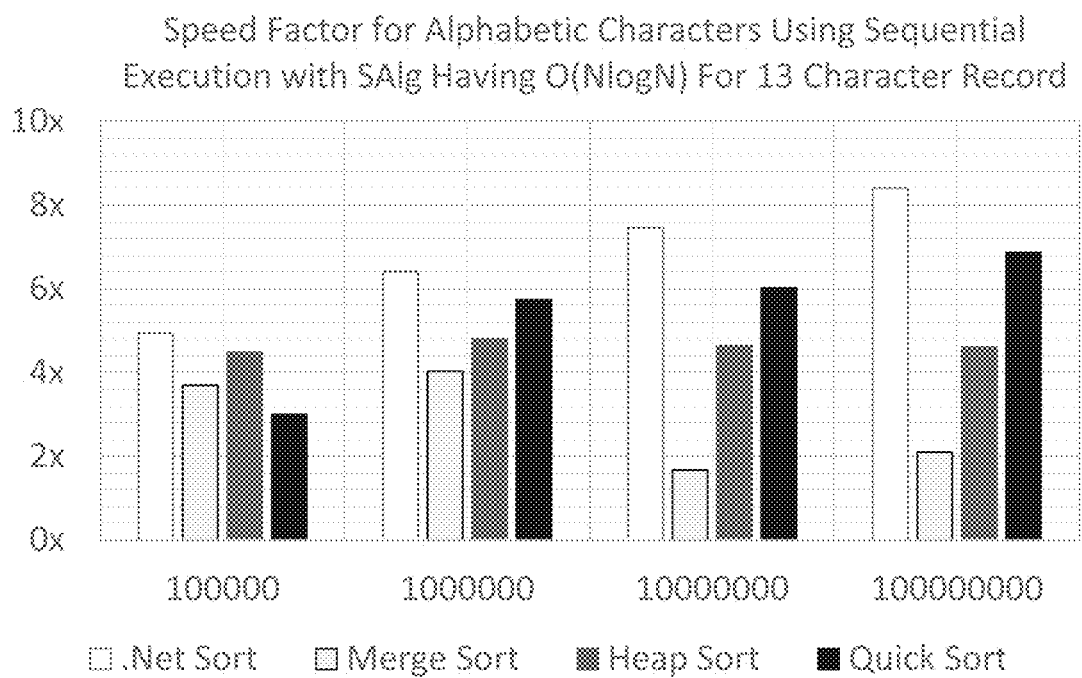
FIGS. 18A and 18B show the speed factor gained for the sequential and parallel execution of the second methodology for alphabetic character strings, where SAlg is .Net, Merge, Quick and Heap Sort. On the other hand.
Figure 18B:
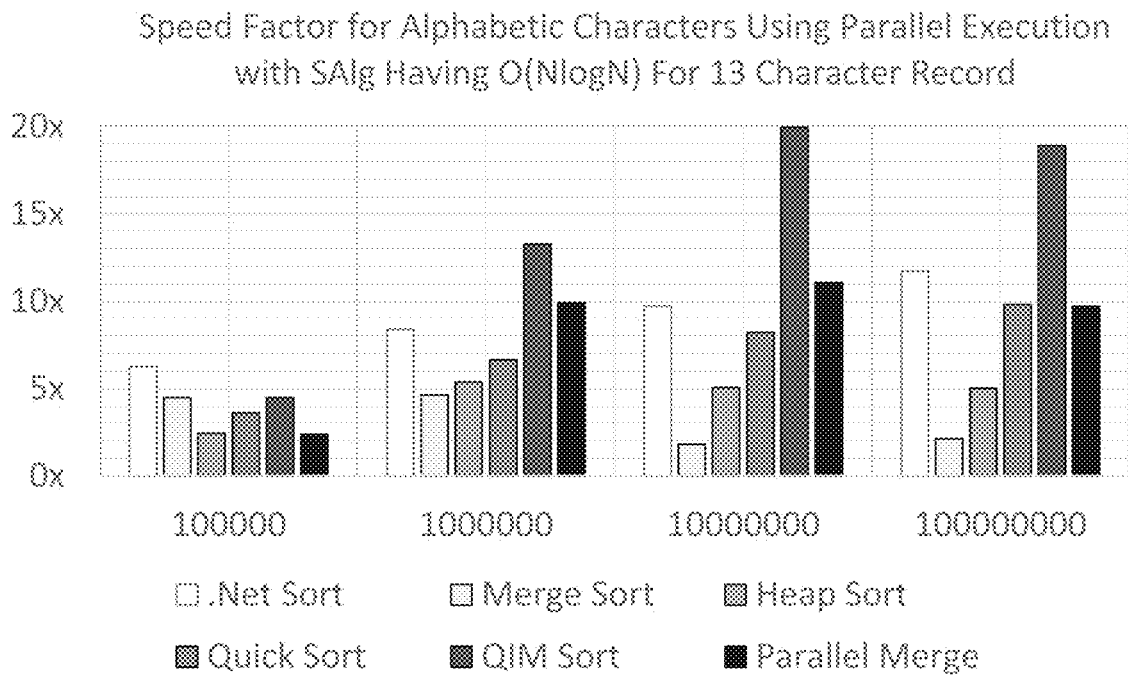
Figure 19A:
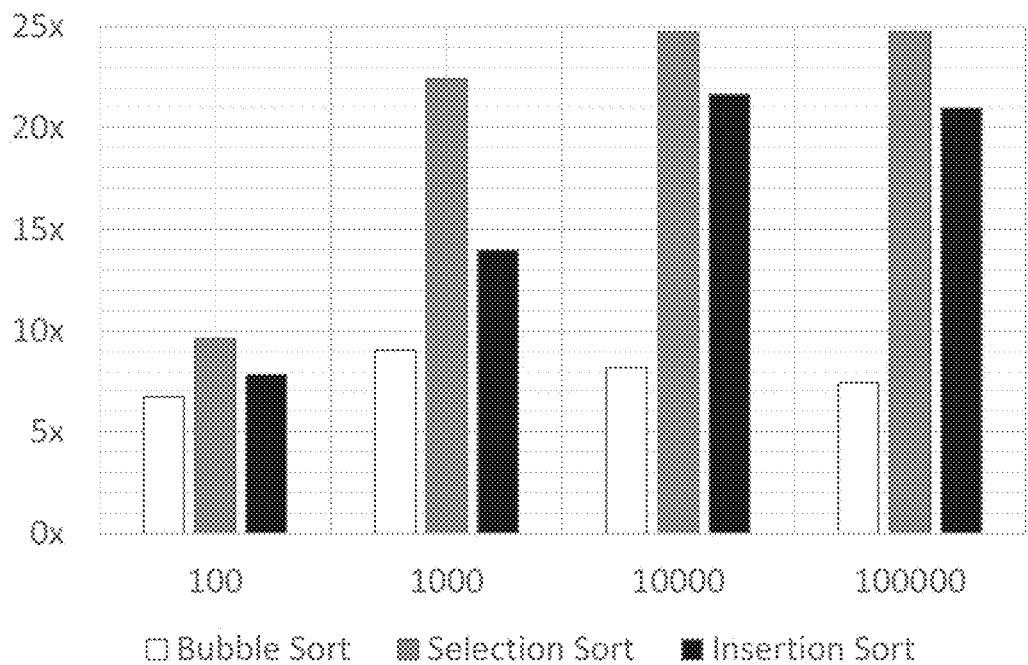
FIGS. 19A and 19B show the speed factor gained for the sequential and parallel execution of the second methodology for alphabetic character strings, using iterative algorithms. Where SAlg is Bubble, Selection and Insertion Sort. On the other hand.
Figure 19B:
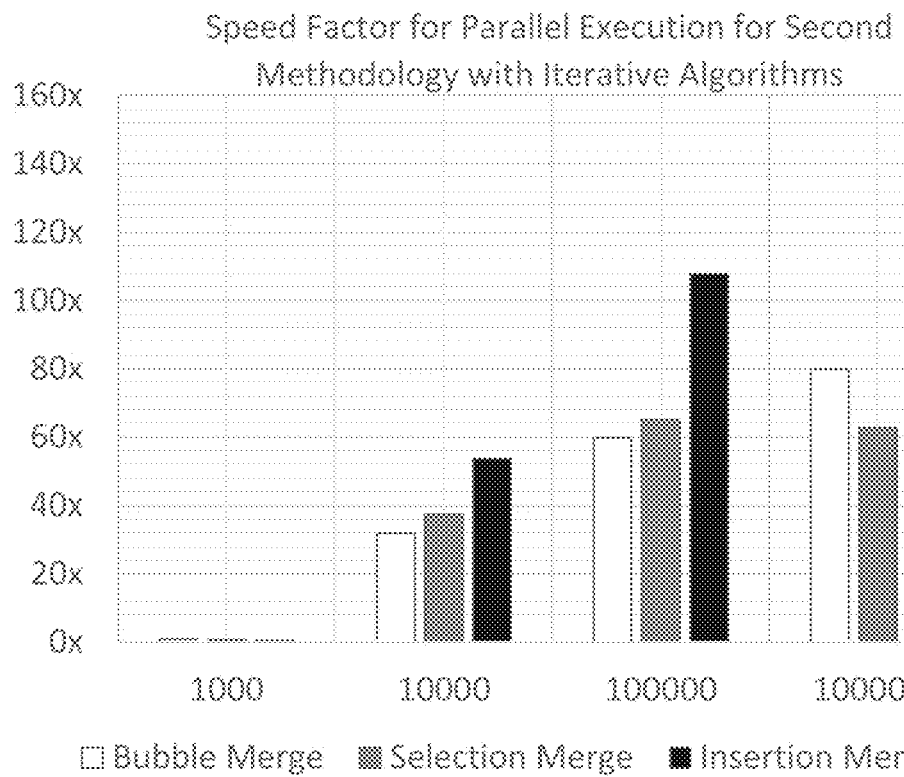

Experimental results on the second methodology: In the first methodology an ulong integer could hold 13 characters of alphabetic prefix or 12 characters of alphanumeric prefix. In the second methodology, the character record could hold from one to thirty characters of alphabetical or alphanumeric characters. For comparison purposes with the first methodology, the record was made to hold 13 characters. FIGS. 18A and 18B show the graphical results of the speed factor gained for the sequential and parallel execution of the second methodology for alphabetic character strings and a prefix of thirteen characters using algorithms: .Net, quick, merge, and heap sort. .Net sort had the best speed gain from the second methodology. On the other hand, FIGS. 19A and 19B show the graphical results of the speed factor gained for the sequential and parallel execution of the second methodology for alphabetic character strings and a prefix of thirteen characters using algorithms: bubble, selection, and insertion sorts. Selection and insertion sort showed better performance than bubble sort in the second methodology.

Running the second methodology in parallel: Parts of the second methodology could run in parallel where stages one, three, four, and five could run in parallel. Stage two, the executing of the algorithm, will run in sequential mode. Making stage two run in parallel requires changes within the algorithm, which are not part of the methodology.

Figure 21:
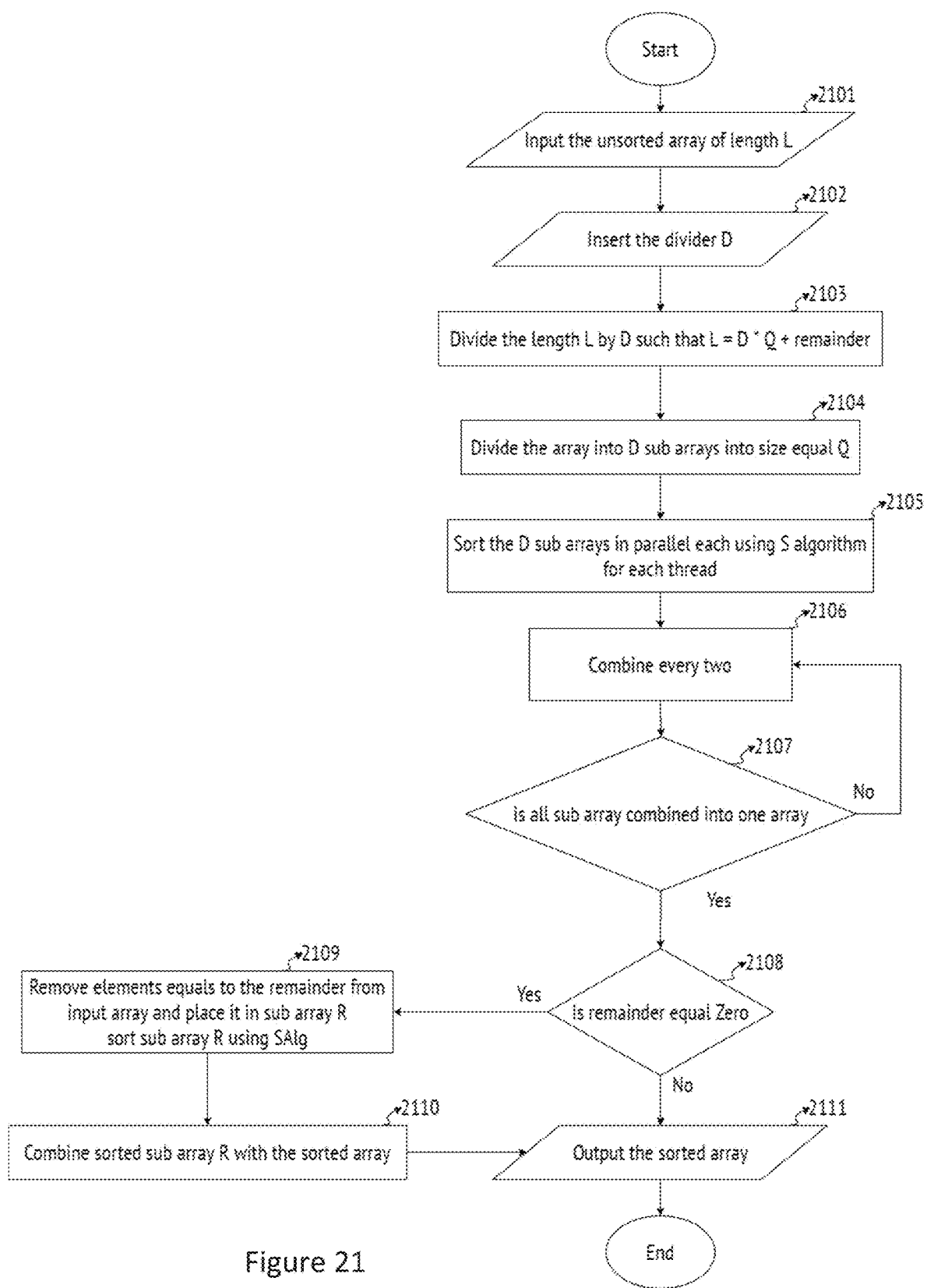
FIG. 21 shows the flowchart of the PDS, the methodology that allows many sequential sorting algorithms to run in parallel.

Having a parallel version of the algorithm may require redesigning and rewriting, such steps may be hard because some algorithms are inherently sequential in nature. To solve this riddle, we have suggested the methodology we call PDS, Parallel Data Sort, which allows many sequential sorting algorithm SAlg to run in parallel (FIG. 21).

The basic embodiment of PDS is to divide the data into blocks then allow multiple copies of SAlg to sort the data blocks in parallel. Once the blocks are sorted, every two sorted blocks are grouped together and the SAlg is used again to resort the joined blocks. The way SAlg is used in the second stage is considered a part of PDS methodology.

Merging two sorted array into one sorted array is generally done by merge sort algorithm. However, in this document we shall show and discuss how SAlg could be used for merging two sorted arrays in addition to merge sort. For example if SAlg was bubble sort or insertion sort, then can we merge two sorted blocks using bubble or insertion sort.

Merging two sorted blocks using bubble sort is done as follows:

a. Name the two sorted blocks A and B b. Compare the last element of block A with the first element of block B, then if the last element of block A is smaller than the first element of block B then merge block A with block B into one large block M with block A first followed by block B and exist.

c. Otherwise, swap the last element in A with the first element in B then bubble upward the newly swapped element at end of A, and bubble downward the newly swapped element at beginning of B. Run the two processes in parallel. Stop when there is no swapping and go to the previous step.

The Bubble merge as part of PDS resulted in a speed factor of three for processors with six cores. Merging two sorted blocks using insertion sort is done as follows: Name the two sorted blocks A and B and combine them into array M with indexes pointing to beginning of A and B. The index of A call it start insertion index (ASII) and of B call it start index (BSI).

Figure 27:
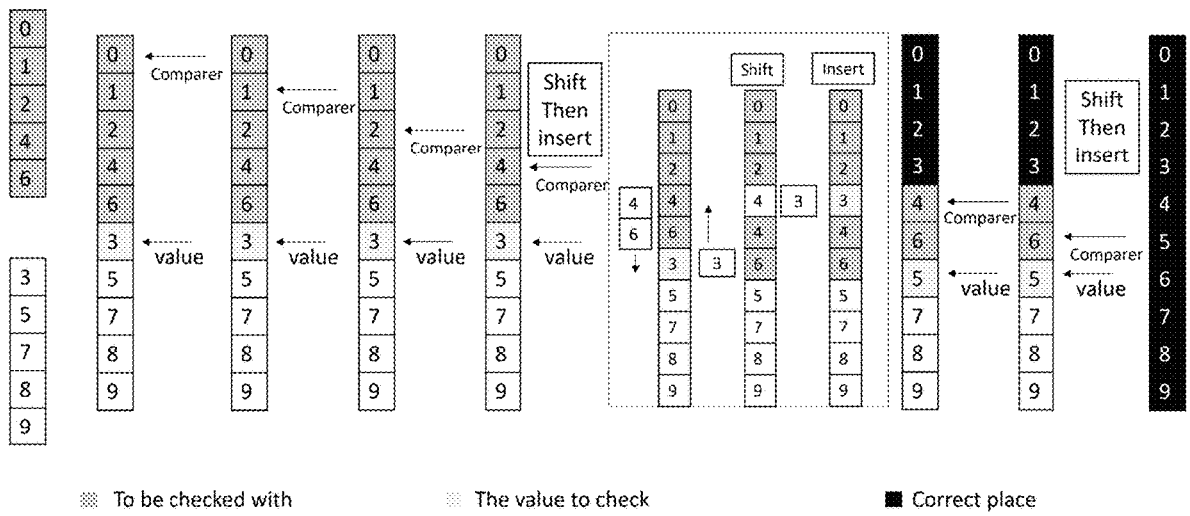
FIG. 27 shows an example for Insertion sort execution in the second stage of PDS.

Compare the first element of B with the last element of A. If larger then stop and M is sorted and merging is complete and exist. Otherwise continue. Remove the first element in block B insert it in block A starting at the ASII. Once insertion location found update ASII shift to overwrite BSI location and to place the element from B. Update BSI and repeat the previous step (FIG. 27).

The previous examples present the way of using of any SAlg for both stages of PDS. In both merging the last element of A is getting smaller and the first element in B is getting larger. This process continues until the first element in B becomes larger than the last element in A. Examples and flowcharts for the second stage of PDS along with the specific SAlg used are presented in this document. FIGS. 20A, 20B, 20C show the results of running the five stages of both methodologies in parallel and in sequential modes. Using PDS methodology to run the parallel mode resulted in high value speed factor.

Conclusion and results of the second methodology: This embodiment does not present an algorithm but rather a methodology that improves the performance of almost any string sorting algorithms. This methodology was tested on quick, heap, and merge sorts (algorithms with complexity O (N log N)). The results showed an average speedup factor of eleven, eight, and four, respectively, on variable length strings of alphabets only. On the other hand, after testing this methodology on slow, iterative algorithms with complexity O ($N^2$): bubble sort, selection sort, and insertion sort, the results showed an average speedup factor of 25, 45, and 70, respectively, on variable length strings of alphabets only. However, the speedup using QIM on alphanumeric strings was 10 and 16 for fixed-size strings, respectively (FIGS. 18A and 18B).

In the following paragraphs, the figures accompanying this document are explained in three divided parts. The first twelve figures are about the first methodology. The following eight figures are for the second methodology. FIG. 20A, 20B, 20C compares the two methodologies. The remaining figures explain the PDS and its implementation.

In FIG. 1, the flowchart of the first methodology is summarized in seven steps.

a. Step 101: The unsorted array is inputted to the first methodology for processing.
b. Step 102: Here, the first stage of the first methodology is done. A prefix is extracted from each string of the input unsorted array. Each string prefix is converted to an integer value and placed in an array of integer records. The conversion process has been fully discussed in this document.
c. Step 103: This represents the second stage where the given algorithm to be utilized for the methodology is used to sort the array of integer record by sorting the integer values of the converted prefix.
d. Step 104: Here is the third stage, where the sorting algorithm ends and some elements in the array may have equal integer values. A program would scan the array of integer records and register the first element and last element in every group of equal integer values in the array. These location values are saved in another array of integer record. Details of these operations are discussed in this document.
e. Step 105: This is the fourth stage, where the unsorted array is copied to another array by the sorted array of integer records as a reference. The result is a sorted array with some strings having equal prefix values.
f. Step 106: The array of integer records created in step 104 (stage 3) is used as a reference to sort the string elements with equal value prefixes in the new sorted array. Details of this operations are discussed in this document.
g. Step 107: The sorted array is ready for output.

In FIG. 2, a simple example of the first methodology is presented where a prefix of three characters are converted to integer value. The figure shows five tables, each table represents one of the five stages of the methodology. A three-character prefix was chosen to simplify the operations. The characters chosen for prefix have been underlined:

As shown in FIG. 2 in table of stage 1, extract the string prefix (three characters) from the input string array and convert the prefix to a numerical value then assign it to unsigned integer (Ulong 8 bytes), then record it to an element in the array with record of integers (ARI). The stage 2 shows the sorted array (ARI) using a sort algorithm (SAlg) based on that numerical value (ulong). The objective here is to sort numerical elements rather than sorting string elements. Stage 3 shows after copying elements in the UNSA to the SSTA based on the sorted results of the ARI. Stage 4 is shows where the list equal elements in SSTA are stored. Stage five shows SSTA fully sorted as of stage five and after sorting the list of equals.

Figure 3A:
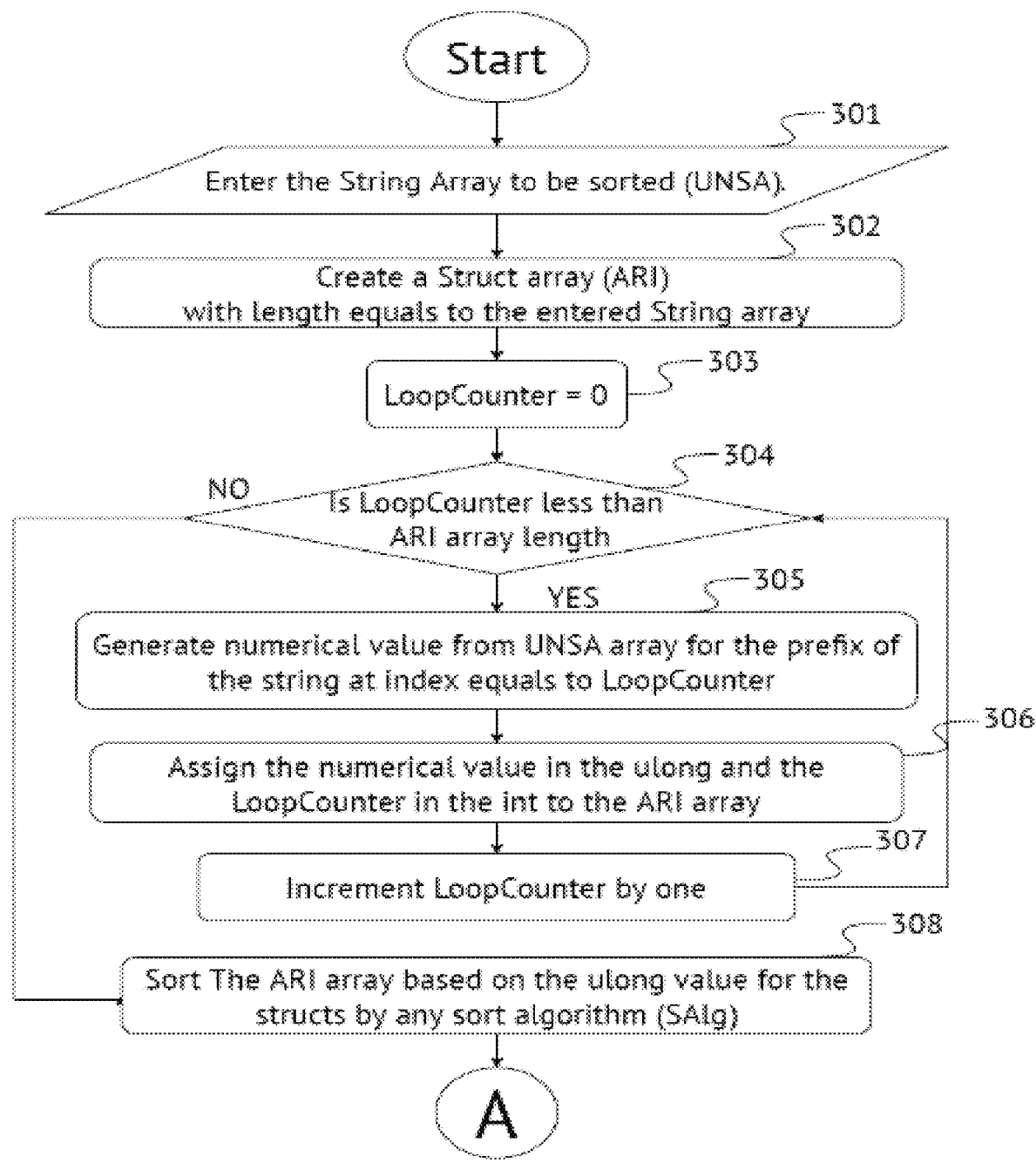
FIGS. 3A, 3B, 3C and 3D show the different stages of the flowchart of the first methodology.
Figure 3B:
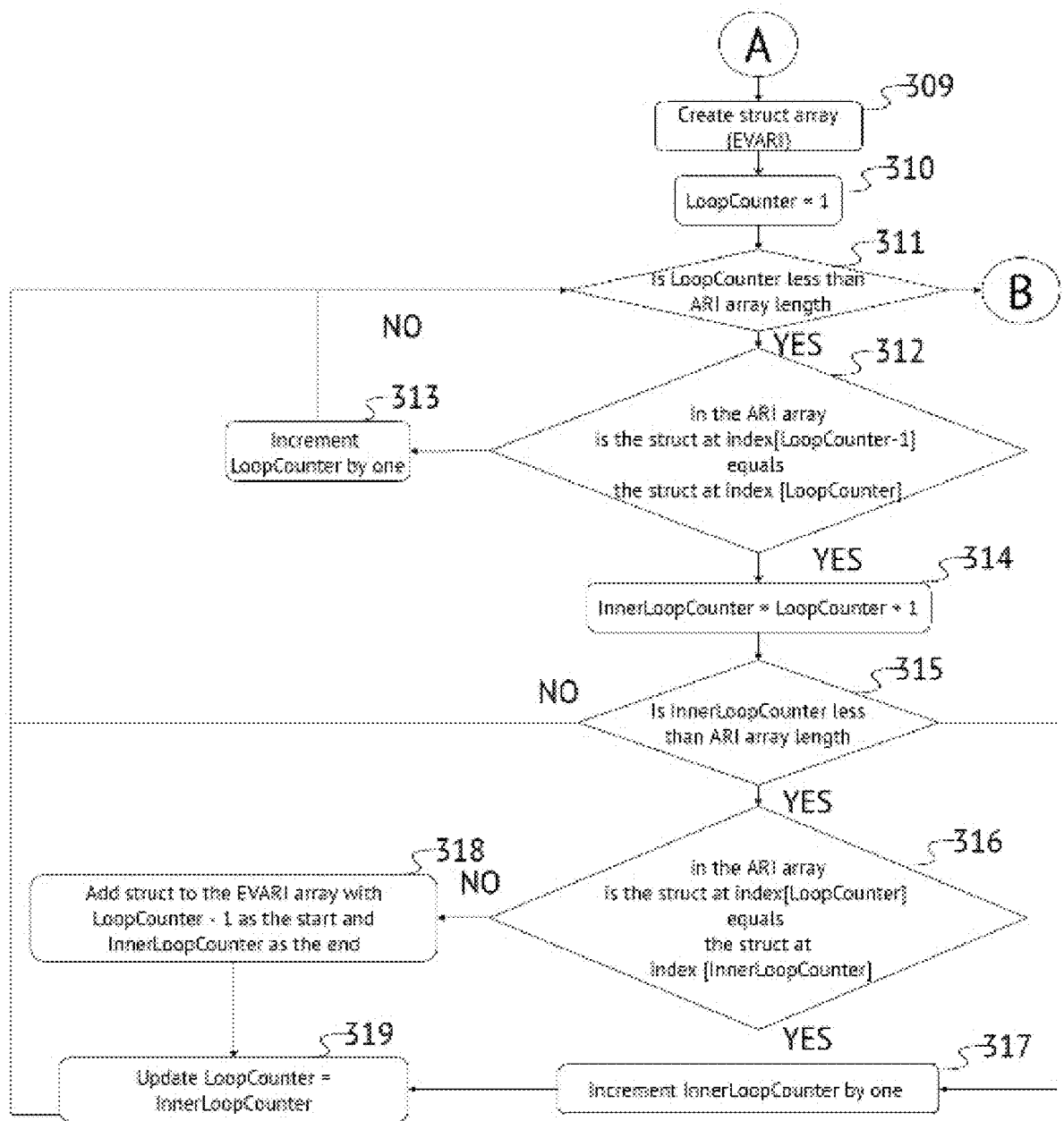
Figure 3C:
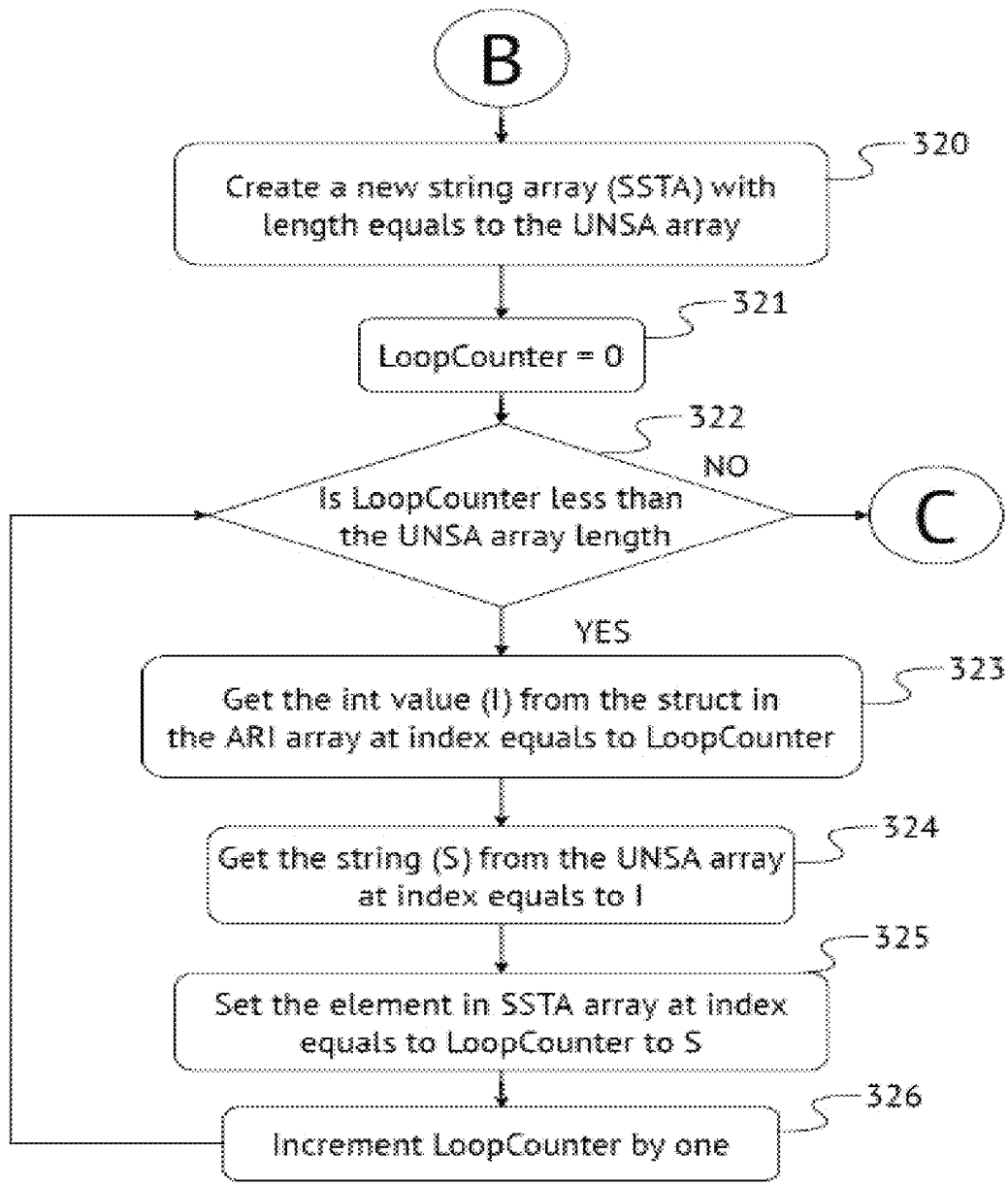
Figure 3D:
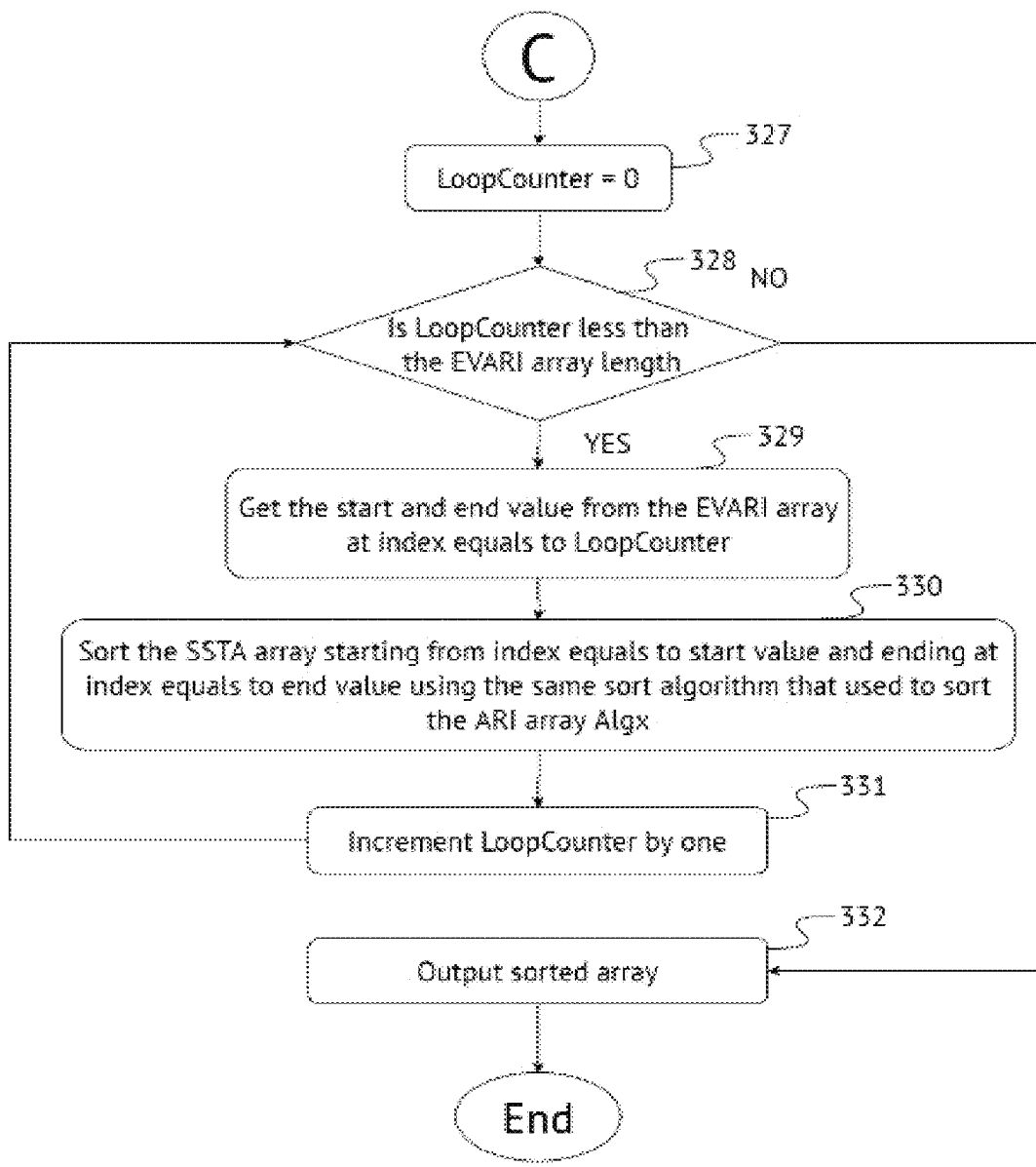

FIGS. 3A, 3B, 3C and 3D: In these figures the flowchart of the first methodology is presented. The graph is made up of four sub-flowcharts each showing a stage or two of the first methodology. Each step in the sub-flowchart is numbered and each numbered step is explained in the following text. Summary of steps from 301 to 331: We want to sort the input string array. The process of sorting is divided into four parts:

FIG. 3A: steps from 301 to 308, FIG. 3B: steps from 309 to 319, FIG. 3C: steps from 320 to 326 and FIG. 3D: steps from 327 to 331.

Summary of FIG. 3A steps from 301 to 308: extract the string prefix (10 to 13 characters) from the input string array and convert the prefix to a numerical value then assign it to unsigned integer (ulong 8 bytes) then record it to an element in the array with records of integers (ARI). After that, sort the ARI using a sort algorithm (SAlg) based on that numerical value (Ulong). The objective here is to sort numerical elements rather than sorting string elements. Strings whose sizes are less than the assigned prefix size are right padded to the prefix size.

a. Step 301: Load the data to be sorted into string array, called here unsorted string array (UNSA).
b. Step 302: Create an array with records of integers (ARI) parallel to the UNSA array and equal in size. Each record in ARI has two integers whose values are 8 bytes unsigned integer (ulong) and 4 bytes integer (Int). The Ulong holds the numerical value of the converted string prefix, using KOT Method, for each string in the UNSA array. The Int32 holds the corresponding index of the string in the UNSA array.
c. Step 303: Create an integer variable with the name LoopCounter and assign Zero as its initial value.

d. Step 304: Start loop to convert each prefix to numeric values: Check if LoopCounter less than or equals to the length of the ARI array. If the checking result is true, proceed to Step 305. If not true, go to Step 308.

e. Step 305: At index equals to LoopCounter, take a prefix from the string in the UNSA array and convert it to numerical value using KOT Method (explained in FIG. 2, FIG. 7C, FIG. 8A, and FIG. 8B).

f. Step 306: Assign the value found in Step 305 to the Ulong of the ARI array at index of LoopCounter and assign the value of the LoopCounter to the Int in the ARI record array.

g. Step 307: Increment the value of the LoopCounter by one, then go to Step 304 (continue the loop).

h. Step 308: Start the sorting process using SAlg on the ARI array based on the value of the ulong that each record holds.

i. Summary of FIG. 3B steps from 309 to 319: The sorted ARI array from 301 to 308 may include a number of equal values Ulong. We try to find the groups of elements of equal value and place their location (beginning and end) in a spared record array (EVARI).

j. Step 309: After sorting ARI array, there might be lists of equal numbers of Ulong values in the sorted ARI. For this case, another record array, called equal values array (EVARI), with two integers to hold the index of start and end of each list of equal Ulong values in the ARI after sorting.

k. Step 310: Reassign the LoopCounter the value one.

l. Step 311: Start outer loop to look for equals elements in the ARI array: Check if LoopCounter less than or equals to the length of ARI. If the result is true, proceed to Step 312. If false, go to Step 320.

m. Step 312: Here, we look for lists of equal value Ulongs. To check if two consecutive ulong values in the record in the ARI are equal as follows: check if the ulong in the record in the ARI at index [LoopCounter-1] equals the ulong in the record in the ARI at index [LoopCounter]. If the result is true, go to step 314. If false, go to step 313.

n. Step 313: Increment the value of the LoopCounter by one.

o. Step 314: Create an integer variable with the name InnerLoopCounter and assign the value of LoopCounter+1 to it.

p. Step 315: Start inner loop find and record the start and end of the equal elements: Check if InnerLoopCounter is less than the ARI array length. If the result is true, go to step 316. If false, go to step 311.

q. Step 316: Check ARI Array if the ulong in the record at index [LoopCounter] equals the ulong in the record at index [InnerLoopCounter]. If the result is true, go to step to 317. If false, go to step 318.

r. Step 317: Increment the value of the InnerLoopCounter by one, then step to 315 (continue the inner loop).

s. Step 318: After finding the equal elements in ARI, the index of the start and end of these equal elements are recorded in current record of equal values array (EVARI). In this case, the start would be LoopCounter−1 as the start and InnerLoopValue as the end.

t. Step 319: Update LoopCounter value to equal InnerLoopCounter value, then step to 311 (continue the outer loop).

u. Summary of FIG. 3C steps from 320 to 326: we copy the strings from the input array UNSA and create an array (SSTA) and copy all the string from the UNSA to SSTA according to the ulongs in the ARI array. Here, we will have a semi-sorted array with groups of strings whose prefix values are sorted, but the string themselves are not sorted. The locations of these unsorted strings are noted in the EVARI array.

v. Step 320: Create a new string array, we call it here sorted string array (SSTA), with size equals to the UNSA array. This array will hold the elements of the UNSA array in sorted manner.

w. Step 321: Reset the value of LoopCounter to zero.

x. Step 322: Start loop to copy the string from UNSA array to the SSTA: Check if LoopCounter is less than the UNSA array length. If the result is true, step to 323. If false, go to step 327.

y. Step 323: Get the Int value from the record in the ARI array at index equals to LoopCounter.

z. Step 324: Get the string from the UNSA array at index equals to the Int value.

aa. Step 325: Set the SSTA array value at index equals to LoopCounter to the string.

bb. Step 326: Increment the value of the LoopCounter by one, then step to 322 (continue the loop).

cc. Summary of FIG. 3D steps from 327 to 331: Start sorting the groups in the SSTA that have been noted in the EVARI array.

dd. Step 327: Reset the value of LoopCounter to zero.

ee. Step 328: Start loop to sort the equals, found in EVARI records, as strings in the SSTA array using SAlg: check if LoopCounter is less than the EVARI array length. If the result is true, step to 329. If false, step to 332.

ff. Step 329: Get the start and end value ARI from the EVARI array at index equals to LoopCounter.

gg. Step 330: Sort the SSTA array starting from index equals to start value and ending at index equals to end value using the same sort algorithm that used to sort the ARI array.

hh. Step 331: Increment the value of the LoopCounter by one, then step to 328 (continue the loop).

ii. Step 332: Output the sorted array

Figure 4A:
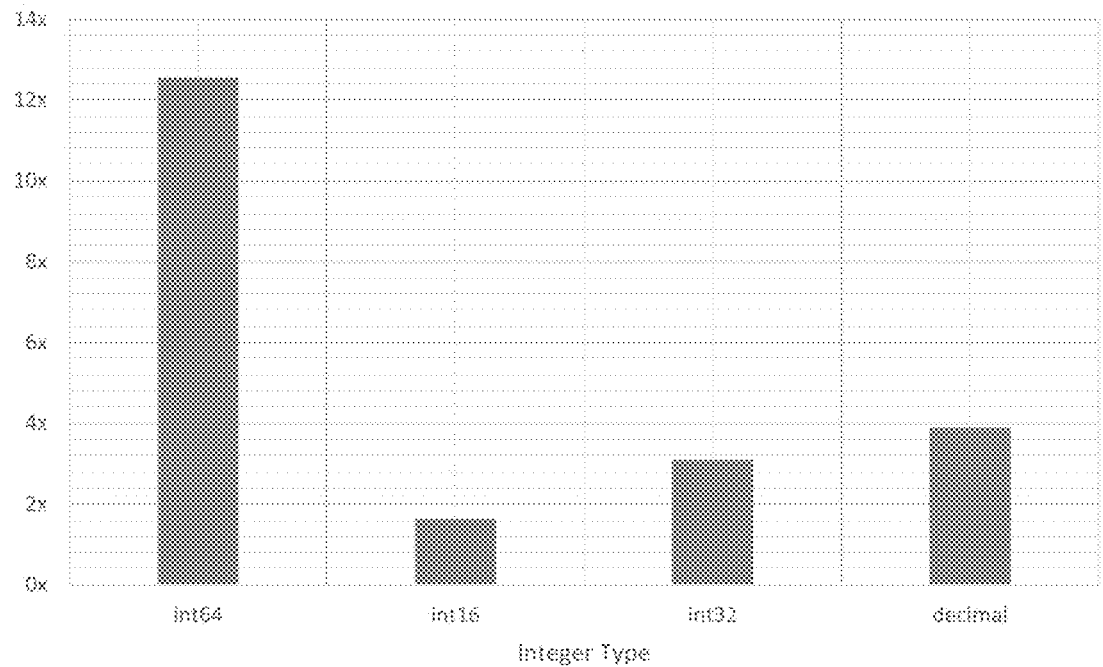
FIGS. 4A and 4B show the graphical comparison of the speed factor for running the first methodology in sequential and parallel modes with different integer sizes (Int16, Int32, Int64, and the integer part of the Decimal) that would hold the converted numerical value of the string prefix. On the other hand.
Figure 4B:
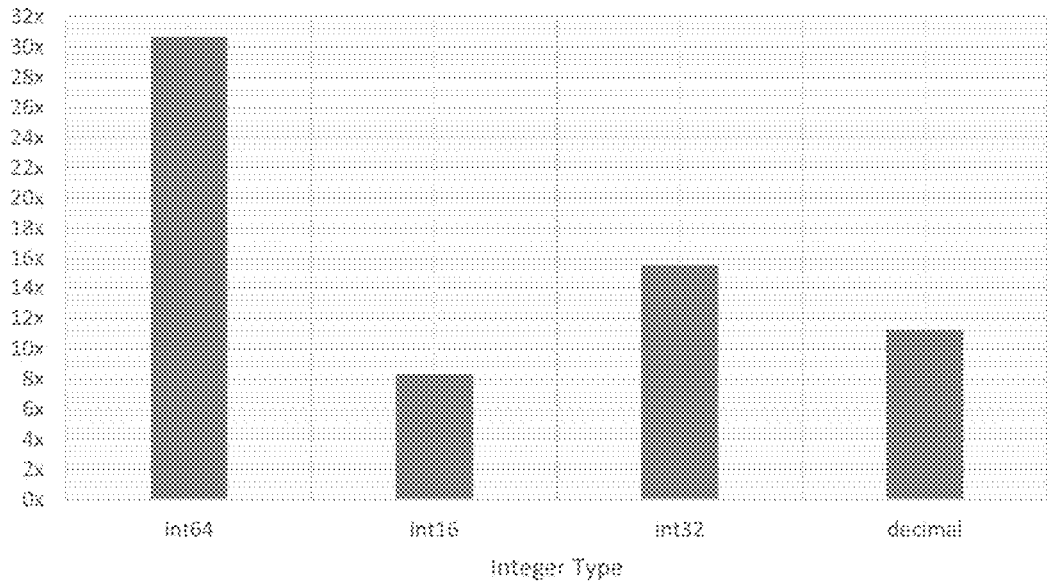

FIGS. 4A and 4B show the graphical comparison of the speed factor for running the first methodology in sequential and parallel modes with different integer sizes (Int16, Int32, Int64, and the integer part of the Decimal) that would hold the converted numerical value of the string prefix. On the other hand, FIGS. 4C and 4D show the table holding the running time in seconds of the methodology for different size integers that hold the numerical value of the prefix.

FIG. 5: First method of table lookup is the linear search, 13 arrays of records are created such that each record holds two elements, the first holds a character (A to Z) the second holds the value for that character. In the first array, the characters values will be 1 to 27 multiplied by $27^{12}$ while in the 13th array the values will be 1 to 27. Each character in the prefix is searched for using linear search to find the value for the character according to its location in the prefix from left to right. The first character from the left is searched for in the first table using linear search and its value is added to the value of the second character from the left after searching for that character in the second table using linear search. Again, these operations are done until we search the 13th character from the left from the 13th table using linear search and its value is added to the sum of the previous 12 characters of the prefix and assigned to an ulong integer. The resulting sum will be considered as the numerical value of the string prefix.

FIG. 6: The second method of table lookup uses hash table. Again, thirteen arrays are built and a hash function is created to map each character to an array element where the numerical value of the character resides. In the first array, the characters values will be 1 to 27 multiplied by $27^{12}$ while in the 13th array the values will be 1 to 27. Each character in the prefix is searched for using hash search to find the value for the character according to its location in the prefix from left to right. The first character from the left is searched for in the first table using hash search and its value is added to the value of the second character from the left after searching for that character in the second table using hash search. Again, these operation are done until we search for the 13th character from the left from the 13th table using hash search, and its value is added to the sum of the previous 12 characters of the prefix and assigned to an ulong integer.

FIGS. 7A, 7B, and 7C: Another elegant method called KOT method of converting the characters in the string prefix to an integer value is described. Create thirteen arrays with size equal to the ASCII table. The 13th table will hold values for each alphabetical character at its ASCII location this will allow us to get these values using the characters binary value as index to these tables. In the 13th table, the characters will have values from 1 to 27. The 12th table will hold the same value from the 13th table, each multiplied by 27. Consequently, the first table will hold the same values in table 13th multiplied by $27^{12}$. Converting the prefix string will be just adding the values from the tables according to the character and their corresponding location in the tables as shown in FIGS. 7A, 7B and 7C. The resulting sum will be the conversion for the string prefix to numerical value which will be assigned to an ulong.

FIG. 8A and FIG. 8B: The tables here show the computation of 13 character Substring (ACKNOWLEDGMEN) of the word (ACKNOWLEDGMENTS) then the computation is as follows: Value=1stCharTable[A]+2nd CharTable[C]+3rd CharTable[K]+4th CharTable[N]+5th CharTable[O]+6th CharTable[W]+7th CharTable[L]+8th CharTable[E]+9th CharTable[D]+10th CharTable[G]+11th CharTable[M]+12th CharTable[E]+13th CharTable[N] =108072162132297052.

FIGS. 9A and 9B show the graphical comparison for the speed factor gained for the sequential and parallel execution of the first methodology for alphabetic strings, using the three-table lookup methods, KOT, linear, and hash table search methods. The .Net Sort is SAlg used here, and one hundred million variable size string data elements. On the other hand, FIGS. 9C and 9D show the tables with the running time in seconds along with the speed factor gained for the sequential and parallel execution of the first methodology for alphabetic strings using the three-table lookup methods and SAlg is .Net Sort (QS).

Figure 10A:
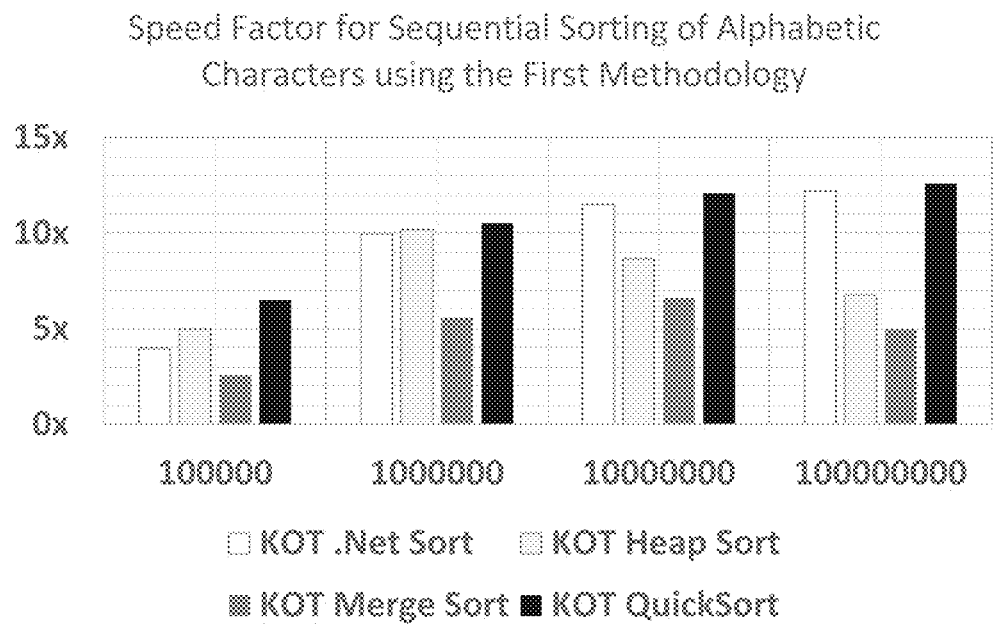
FIGS. 10A and 10B show the speed factor gained for the sequential execution of the first methodology for alphabetic and alphanumeric character strings, where SAlg is: .Net, Merge, Quick and Heap Sort. On the other hand.
Figure 10B:
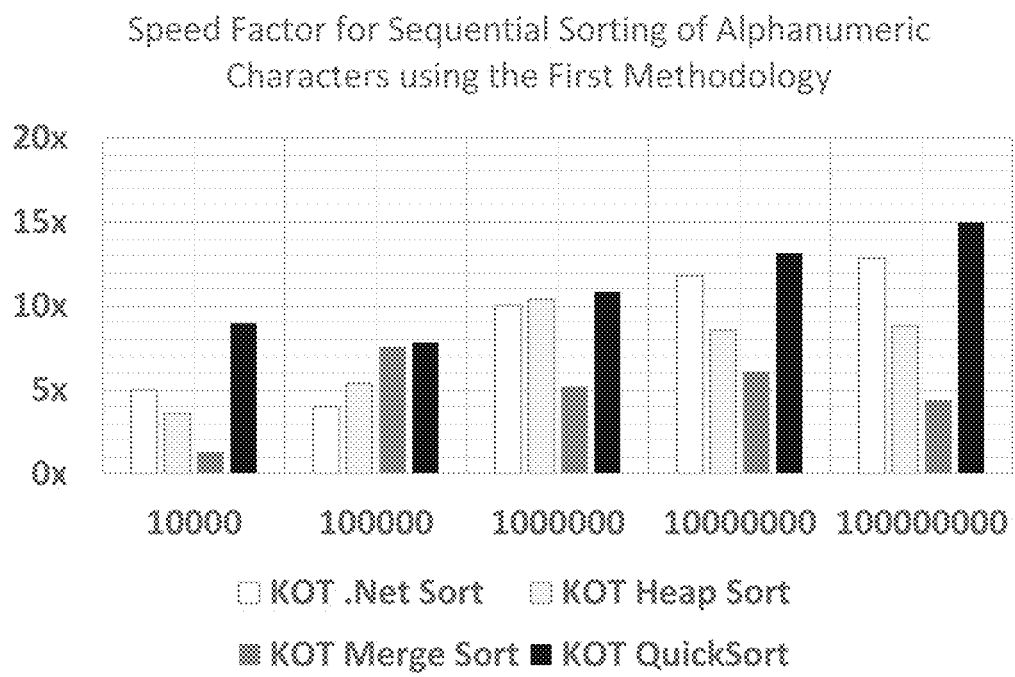

FIGS. 10A and 10B show the speed factor gain by the first methodology in sequential mode for two string types: alphabetic and alphanumeric. Moreover, the test was made on four SAlgs with O(NlogN): quicksort, heapsort, merge sort, and .Net sort. Furthermore, the prefix string conversion was done using the KOT method. Finally, the number of elements were chosen to represent many possible inputs; from ten thousand to one hundred million. FIGS. 10C and 10D show the table with the actual execution times in seconds for all the algorithms shown in the graphs.

Figure 11A:
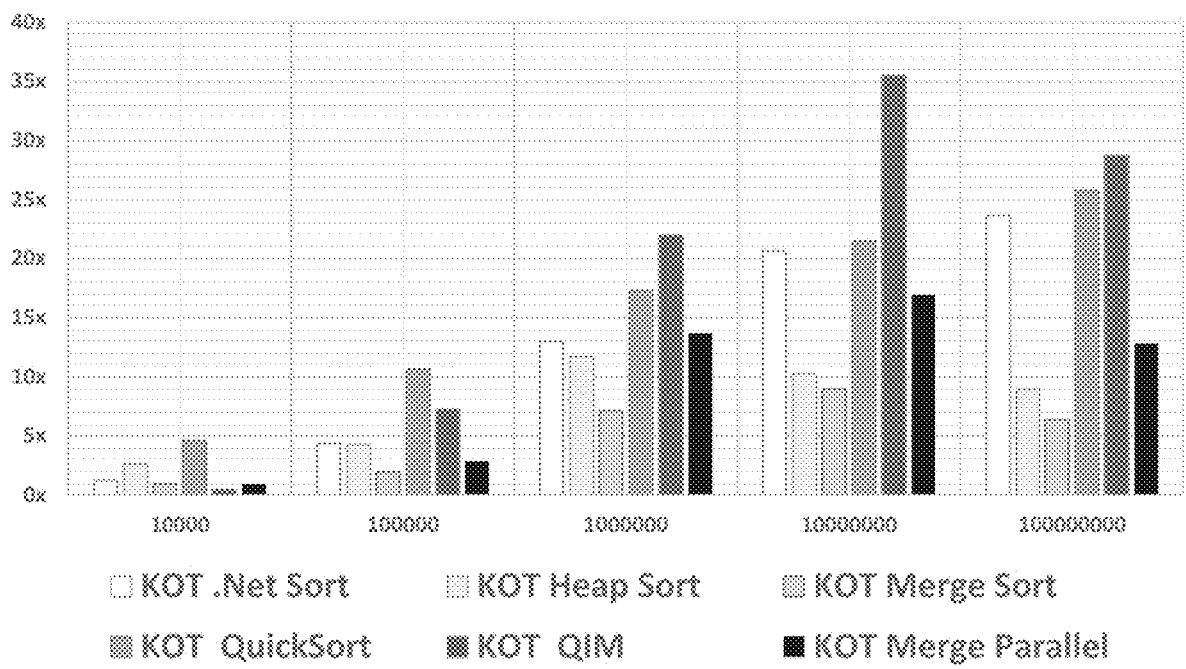
FIGS. 11A and 11B show the speed factor gained for the parallel execution of the first methodology for alphabetic and alphanumeric character strings, where SAlg is .Net, Merge, Quick and Heap Sort. On the other hand.
Figure 11B:
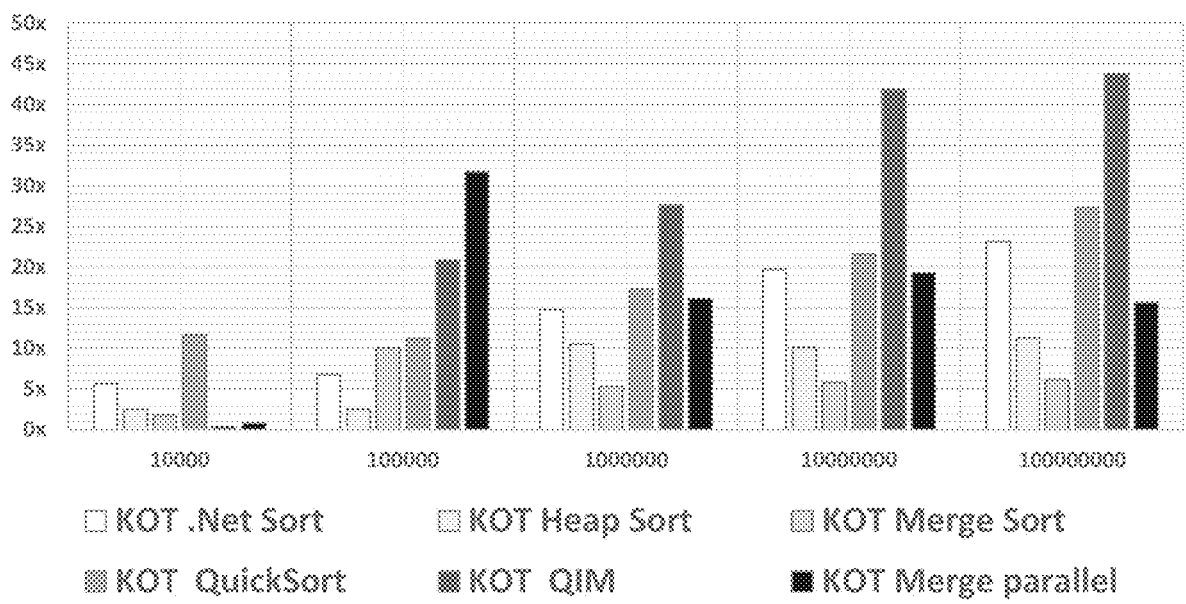

FIGS. 11A and 11B show the speed factor gain by the first methodology in parallel mode for two string types: alphabetic and alphanumeric. Moreover, the test was made on four SAlgs with O(N log N): quicksort, heapsort, merge sort, .Net sort and QIM sort. Furthermore, the prefix string conversion was done using the KOT method. Finally, the number of elements were chosen to represent many possible inputs; from ten thousand to one hundred million. FIGS. 11C and 11D show the table with the actual execution times in seconds for all the algorithms shown in the graphs.

Figure 12A:
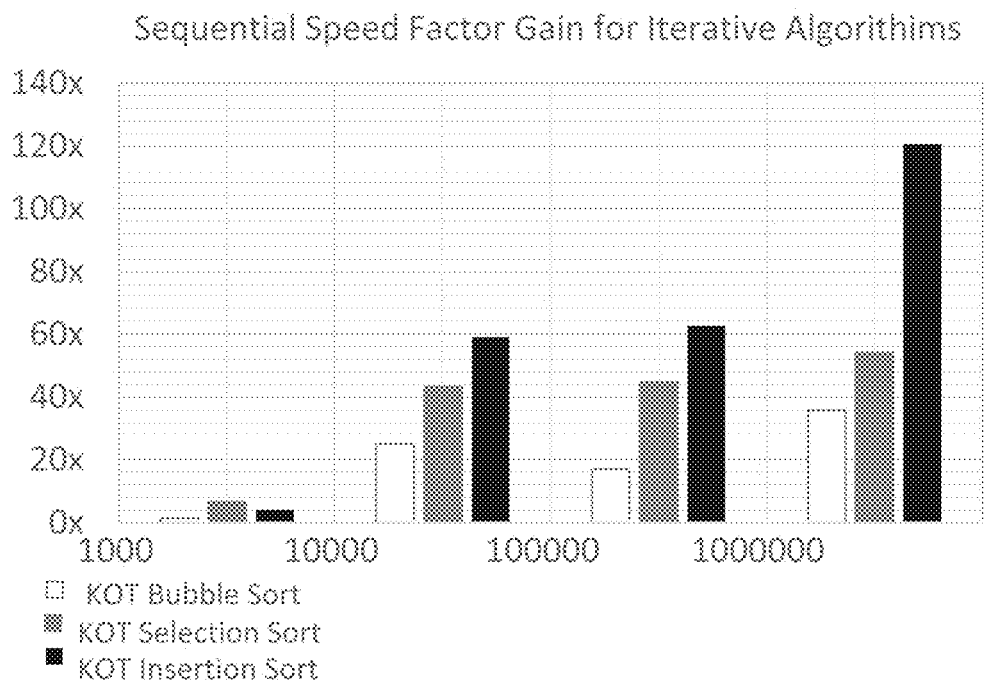
FIGS. 12A and 12B show the speed factor gained for the sequential and parallel execution of the first methodology for alphabetic character strings for iterative algorithms, where SAlg is Bubble, Selection, and Insertion Sort. On the other hand.
Figure 12B:
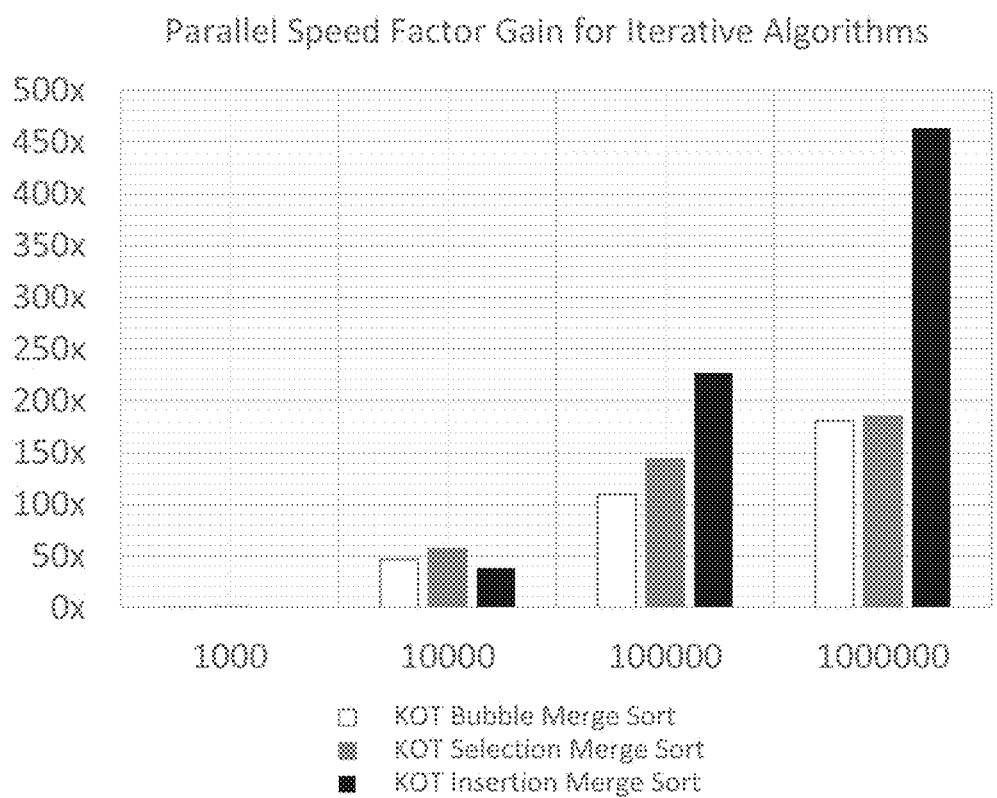

FIGS. 12A and 12B show the speed factor gain by the first methodology on alphabetic string type only, in sequential and parallel modes. Moreover, the test was made on four SAlgs with O ($N^2$): bubble, selection, and insertion sort. Furthermore, the prefix string conversion was done using the KOT method. Finally, the number of elements were chosen to represent many possible inputs; from one thousand to one million. FIGS. 12C and 12D show the table with the actual execution times in seconds for all the algorithms shown in the graphs.

Figure 13:
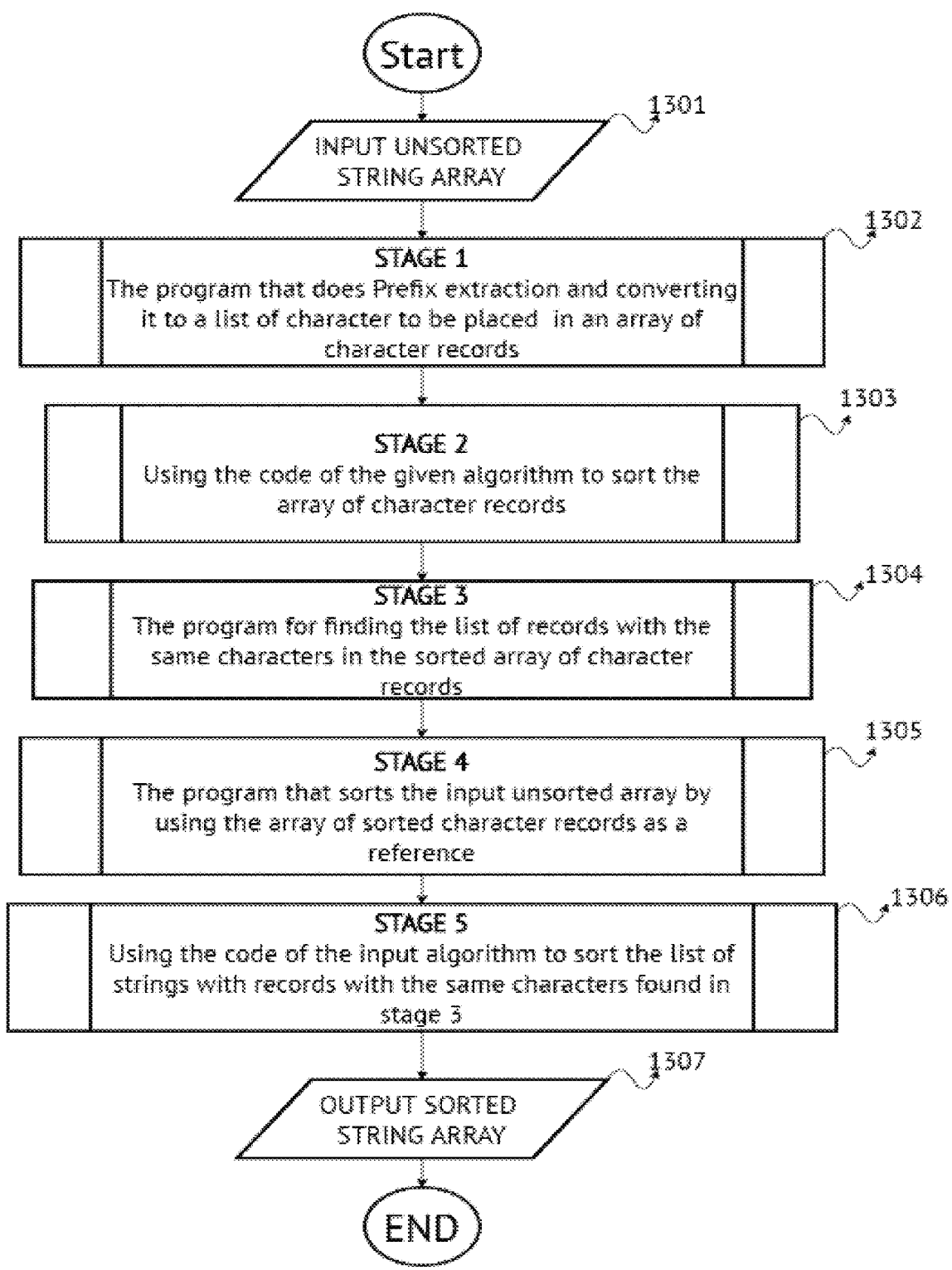
FIG. 13 shows a flowchart for the five stages of the second methodology, the characters prefix-based sorting method.

FIG. 13: In this figure, the flowchart of the second methodology is summarized in seven steps.
 a. Step 1301: The unsorted array is inputted to the second methodology for processing.
 b. Step 1302: Here, the first stage of the second methodology is done. A prefix is extracted from each string of the inputted unsorted array. Each string prefix is converted to a list characters that are placed in an array of character records. The conversion process has been fully discussed in this document.
 c. Step 1303: This represents the second stage where the code of the given algorithm is used to sort the array of character records.
 d. Step 1304: This is the third stage, when the sorting algorithm ends, some character records in the array may have same characters. A program would scan the array of character records and register the first element and last element in every group with the same characters in the records of the array character records. These location values are saved in another array of integer record. Details of these operations are discussed in this document.
 e. Step 1305: This is the fourth stage where the unsorted array is sorted by copying its elements to another array using the sorted array of character records as a reference. The result is a sorted array with some parts having equal prefix values.
 f. Step 1306: Using the input algorithm again to sort the strings with equal prefixes found in stage 3 (step 1304). The array of character records created in step 1304 (stage 3) is used as a reference to sort the elements with equal value prefix in the new sorted array. Details of these operations are discussed in this document.
 g. Step 1307: The sorted array is ready for output.

FIG. 14: This figure shows a simple example of the second methodology. In this example, the characters of the string prefix are taken and placed in a record of characters. The figure shows five tables. Each table represents one of the five stages of the methodology. A three-character prefix was chosen to simplify the operations. The characters chosen for the prefix have been underlined. Extract the string prefix (three characters) from the input string array and place the characters in a record of characters. The table for stage 2 shows the sorted array (ACHR) using a sort algorithm (SAlg) based on the character values in the record of characters. The objective here is to sort character list rather than sorting string elements. After sorting, table 3 shows stage 3 after copying elements in the UNSA to the SSTA based on the sorted results of the ACHR. Stage 4 is shown in table 4 where the list equal elements in SSTA are stored. Table 5 shows SSTA fully sorted as of stage five and after sorting the list of equals.

FIGS. 15A, 15B, 15C, and 15D present the flowcharts for the stages of the second methodology. The graph is made up of four sub-flowcharts each showing a stage or two of the first methodology. Each step in the sub-flowchart is numbered, and each numbered step are explained in the following text.

Summary of steps from 1501 to 1531: We want to sort the input string array. The process of sorting is divided into four sub-flowcharts. The first sub-flowchart represents stages one and two of the second methodology and its elements are numbered 1501 to 1508. The second sub-flowchart represents stage three and its elements are numbered 1509 to 1519. The third sub-flowchart represents stage four and its elements are numbered 1520 to 1526. The fourth sub-flowchart represents stage five and its elements are numbered 1527 to 1532.

Summary of steps from 1501 to 1508: extract the string prefix (1503 to 1513 characters) from the input string array and place the characters of the prefix in a character record of an array of records of characters (ACHR). Then, start the sort process on the characters in ACHR. After sorting the ACHR using a sort algorithm (SAlg) based on characters in record of characters control, go to the next sub-flowchart of third stage of the second methodology. The objective here is to sort character elements rather than sorting string elements. In the following paragraphs, each step of the first sub-flowchart is discussed in details.

a. Step 1501: Load the data to be sorted into string array, called here unsorted string array (UNSA).

b. Step 1502: Create an array of character records (ACHR) parallel to the UNSA array and equal in size. Each record in ACHR has fields for character elements and 4 bytes integer (Int). The fields will hold the characters of the string prefix with each field holding exactly one character. The integer field in the record will hold the corresponding index of the string in the UNSA array.

c. Step 1503: Create an integer variable with the name LoopCounter and assign it Zero as its initial value.

d. Step 1504: Start loop to convert each prefix to list of characters. Check if LoopCounter less than or equals to the length of the ACHR array. If the checking result is true, proceed to step 1505. If not true, go to step 1508.

e. Step 1505: At index equals to LoopCounter, take a prefix from the string in the UNSA array and convert it to its characters elements.

f. Step 1506: Assign the characters extracted in step 1505 to the fields of a record in the array of character records ACHR array at index of LoopCounter and assign the value of the LoopCounter to the integer in the ACHR record array.

g. Step 1507: Increment the value of the LoopCounter by one, then go to step 1504 (continue the loop).

h. Step 1508: Start the sorting process using SAlg on the ACHR array based on the characters that each record holds.

i. Summary of steps from 1509 to 1519: The sorted ACHR array from 1501 to 1508 may include a number of records having the same characters in their fields. We try to find the groups of records that have the same characters and place their location (beginning and end) in an array of integer records (EVCHR)

j. Step 1509: After sorting ACHR array, there might be lists of records with the same characters in the sorted ACHR. For this case, another record array, called equal values array (EVA), with two integers to hold the index of start and end of each list of records with the same characters in the ACHR after sorting.

k. Step 1510: Reassign the LoopCounter the value one.

l. Step 1511: Start outer loop to look for records with same characters in the ACHR array: Check if LoopCounter less than or equals to the length of ACHR. If the result is true, proceed to step 1512. If false, go to step 1520.

m. Step 1512: Here we look for lists of records with the same characters. To check if two consecutive records of characters in in the ACHR have the same characters as follows: check if the characters in the record in the ACHR at index 4[LoopCounter-1] equals the characters in the record in the ACHR at index [LoopCounter]. If the result is true, step to 1514. If false, go to step 1513.

n. Step 1513: Increment the value of the LoopCounter by one.

o. Step 1514: Create an integer variable with the name InnerLoopCounter and assign the value of LoopCounter+1 to it.

p. Step 1515: Start inner loop find and record the start and end of the records with the same characters. Check if InnerLoopCounter is less than the ACHR array length. If the result is true, step to 1516. If false, go to step 1511.

q. Step 1516: Check ACHR array if the characters record in the record at index [LoopCounter] equals the characters in the record at index [InnerLoopCounter]. If the result is true, go to step 1517. If false, go to step 1518.

r. Step 1517: Increment the value of the InnerLoopCounter by one, then step to 1515 (continue the inner loop).

s. Step 1518: After finding the records with the same characters in ACHR, the index of the start and end of these character records are recorded in the current record of equal values array (EVA). In this case, the start would be LoopCounter-1 as the start and InnerLoopValue as the end.

t. Step 1519: Update LoopCounter value to equal InnerLoopCounter value, then step to 1511 (continue the outer loop).

u. Summary of steps from 1520 to 1526: We copy the strings from the input array UNSA, create an array (SSTA) and copy all the string from the UNSA to SSTA according to the integer value in the ACHR array. Here, we will have a semi sorted array with groups of strings whose prefix values are sorted, but the strings themselves are not sorted. The locations of these unsorted strings are noted in the EVA array.

v. Step 1520: Create a new string array. We call it here sorted string array (SSTA) with size equals to the UNSA array. This array will hold the elements of the UNSA array in sorted manner.

w. Step 1521: Reset the value of LoopCounter to zero.

x. Step 1522: Start loop to copy the string from UNSA array to the SSTA: Check if LoopCounter is less than the UNSA array length. If the result is true, step to 1523. If false, go to step 1527.

y. Step 1523: Get the Int value from the record in the ACHR array at index equals to LoopCounter.

z. Step 1524: Get the string from the UNSA array at index equals to the Int value.

aa. Step 1525: Set the SSTA array value at index equals to LoopCounter to the string.

bb. Step 1526: Increment the value of the LoopCounter by one, then step to 1522 (continue the loop).

cc. Summary of steps from 1527 to 1531: Start sorting the groups in the SSTA that have been noted in the EVARI array dd. Step 1527: Reset the value of LoopCounter to zero.
ee. Step 1528: Start loop to sort the equals found in EVARI records as strings in the SSTA array using SAlg. Check if LoopCounter is less than the EVARI array length. If the result is true, step to 1529. If false, step to the End.
ff. Step 1529: Get the start and end value ARI from the EVARI array at index equals to LoopCounter.
gg. Step 1530: Sort the SSTA array starting from index equals to the start value and ending at index equals to the end value using the same sort algorithm that used to sort the ACHR array.
hh. Step 1531: Increment the value of the LoopCounter by one, then step to 1528 (continue the loop).
ii. Step 1532: Return sorted array.

Figure 16A:
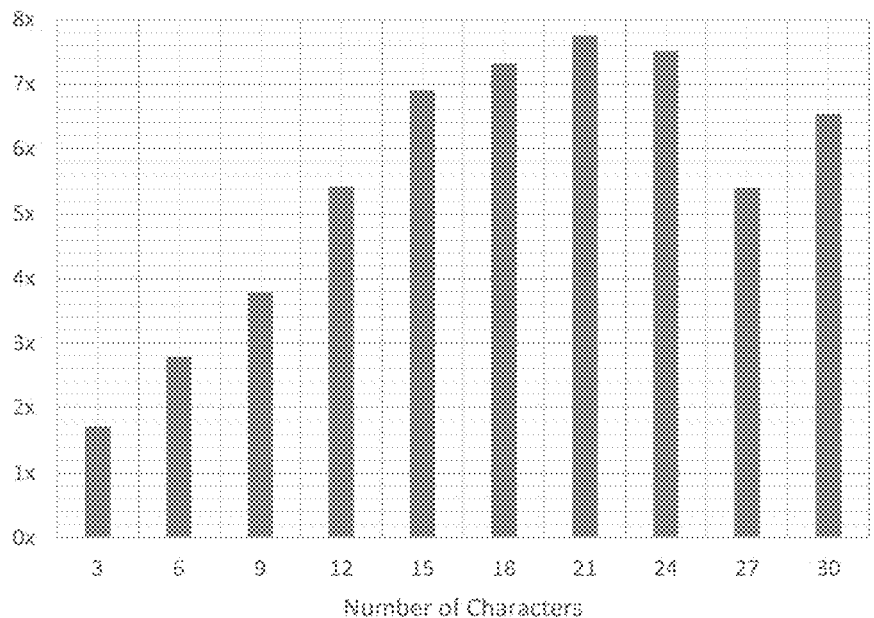
FIGS. 16A and 16B show the speed factor for the second methodology in sequential and parallel execution with character records having three to 30 characters to sort 100 million strings. The SAlg being .Net sort for the sequential execution, and QIM under PDS for the parallel execution. On the other hand.
Figure 16B:
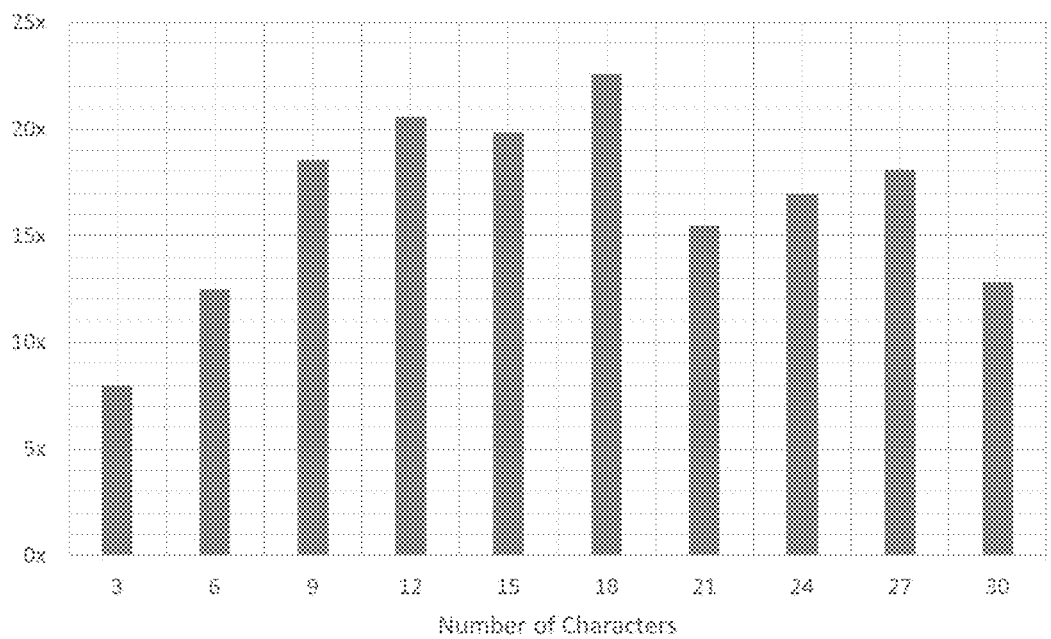

FIGS. 16A and 16B show speed factor for the second methodology in sequential and parallel execution with character records having three to thirty characters to sort 100 million strings. The SAlg being .Net sort for the sequential execution and QIM under PDS for the parallel execution. On the other hand, FIGS. 16C and 16D show the tables with the running time in seconds of .Net algorithm for three or more characters records. Note that the speed factor is a comparison of the running time for .Net sort in sequential mode, which took 363 seconds to sort 100,000,000 elements, to the running time of the same .Net algorithm running within the second methodology.

Figure 17A:
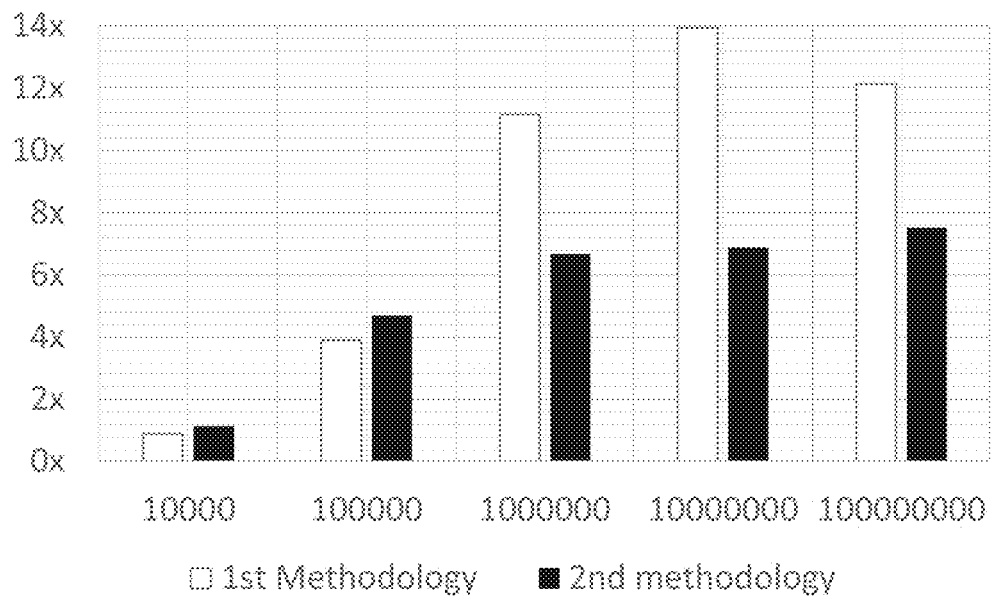
Figure 17B:
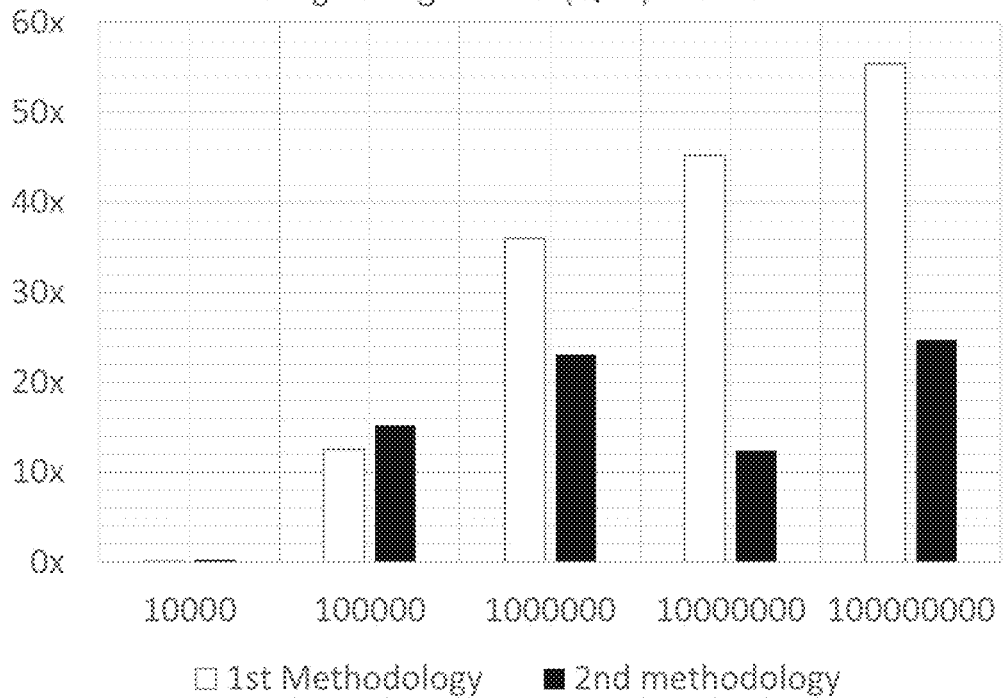

FIGS. 17A and 17B show speed factor for sorting arrays with fixed size strings. For example, the fixed size alphanumeric string of six character used by airlines to represent passenger name record (PNR). PNR is used for flight booking, reservation, and checking in. The graph representing the speed factor for the execution of both the first and the second methodologies. The first methodology using: Int32, KOT, and .Net sort in sequential run and QIM under PDS in parallel run. The second methodology using character records with six characters while .Net sort in sequential run and QIM under PDS in parallel run.

FIGS. 18A and 18B show the speed factor gained for the sequential and parallel execution of the second methodology for alphabetic character strings, where SAlg is .Net, Merge, Quick and Heap Sort. On the other hand, FIGS. 18C 18D show the table with the running time in seconds of each algorithm under different load of elements to be sorted. The speed factor is computed in comparison to the corresponding SAlg running without the methodology. Here, the PDS methodology is used with QIM and Merge algorithm.

FIGS. 19A and 19B show the speed factor gained for the sequential and parallel execution of the second methodology for alphabetic character strings, where SAlg is Bubble, Selection and Insertion Sort. On the other hand, FIGS. 17C and 17D show the tables with the running time in seconds of each algorithm under different load of elements to be sorted. The speed factor is computed in comparison to the corresponding SAlg running without the methodology. Here, the PDS methodology is used with Bubble, Selection, and Insertion algorithms.

FIGS. 20A and 20B show a graphical comparison of the sequential and parallel running time of the five stages for both the first and the second methodologies. On the other hand, FIG. 20C show the tables of the actual running times in seconds.

FIG. 21 shows the flowchart of the Parallel Data Sort, PDS, the methodology that allows many sequential sorting algorithms to run in parallel. The PDS has the following steps:
a. Step 2101: Input the unsorted array L of length (l).
b. Step 2102: Insert the divider (d).
c. Step 2103: Divide (l) by (d) such that (l=d*q+remainder).
d. Step 2104: Check if remainder (r) equal Zero. If yes step to 2106. Else, step to 2105.
e. Step 2105: Remove r elements from array L and place it in sub array (R), sort R using SAlg.
f. Step 2106: Divide the array L into (d) sub arrays with each of size equals (q).
g. Step 2107: Stage 1, sort the (d) sub arrays in parallel using SAlg for each process
h. Step 2108: Stage 2, merge every two sorted sub-array using SAlg.
i. Step 2109: Are all the sub arrays became one array. If yes step to 2110, else to 2108.
j. Step 2110: merge sort (R) with the just sorted array using SAlg.
k. Step 2111: Output the sorted array L.

Figure 22:
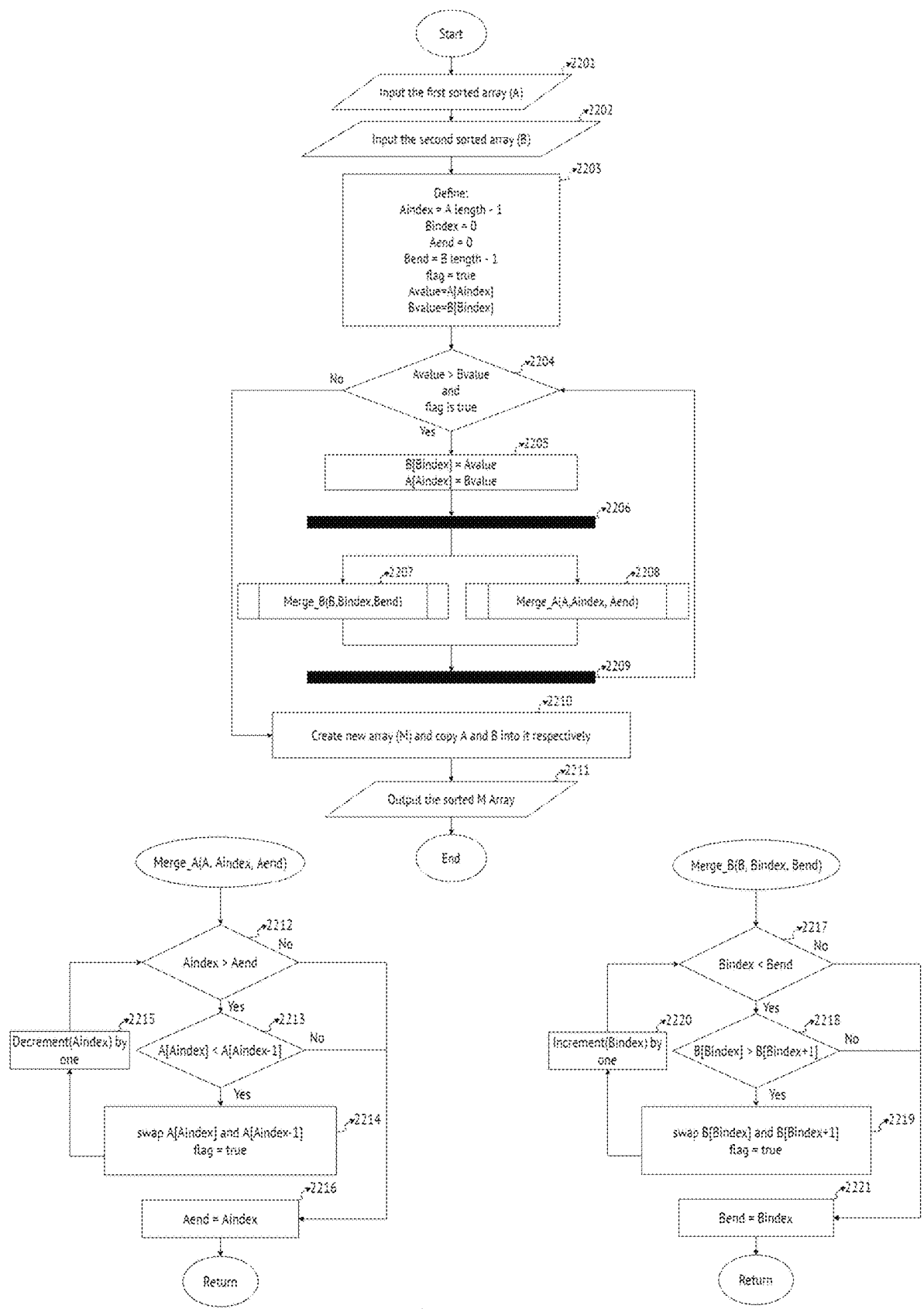
FIG. 22 shows the flowchart for Bubble sort execution in the second stage of PDS.

FIG. 22 shows the flowchart for Parallel Bubble sort merge execution in the second stage of PDS which we called bubble merge and it is made up of the following steps:
a. Step 2201: Input the first sorted array and call it (A).
b. Step 2202: Input the second sorted array and call it (B).
c. Step 2203: Define seven variables: first variable is an integer call it (Aindex) and assign it the value of the length of array A minus one. The second variable is an integer call it (Bindex) and assign it the value Zero. The third (Aend) and assign it the value Zero. The fourth (Bend) and assign it the value of B array length minus one. The fifth variable is a Boolean and call it (flag) and assign it the value 'True'. The sixth variable (Avalue) of the same type of A and B elements and assign it the value of the A array element at index (Aindex). The seventh variable (Bvalue) have the same type of A and B elements and assign it the value of the A array element it index (Aindex).
d. Step 2204: Outer loop start: Check if (Aindex) is greater or equal to Zero and the flag is 'true'. If the checking result is yes, step to 2205. Otherwise, step to 2211.
e. Step 2205: Assign (Mindex) the value of (Aindex). And assign the value 'false' to (flag).
f. Step 2206: Inner loop start: Check if (Mindex) less than the length of array M minus one. If true, step to 2207. Otherwise, step to 2210.
g. Step 2207: Check if the element of the array (M) at index (Mindex) is greater than the element at index (Mindex+1). If the result is true, step to 2208. Otherwise, step to 2210.
h. Step 2208: Swap the element at index (Mindex) with the element at index (Mindex+1). Also, assign the value 'True' to the variable (flag).
i. Step 2209: Increment (Mindex) by one, then step to 2207 (continue inner loop).
j. Step 2210: Decrement (Aindex) by one, then step to 2205 (continue outer loop).
k. Step 2211: Output the sorted M array.

Figure 23:
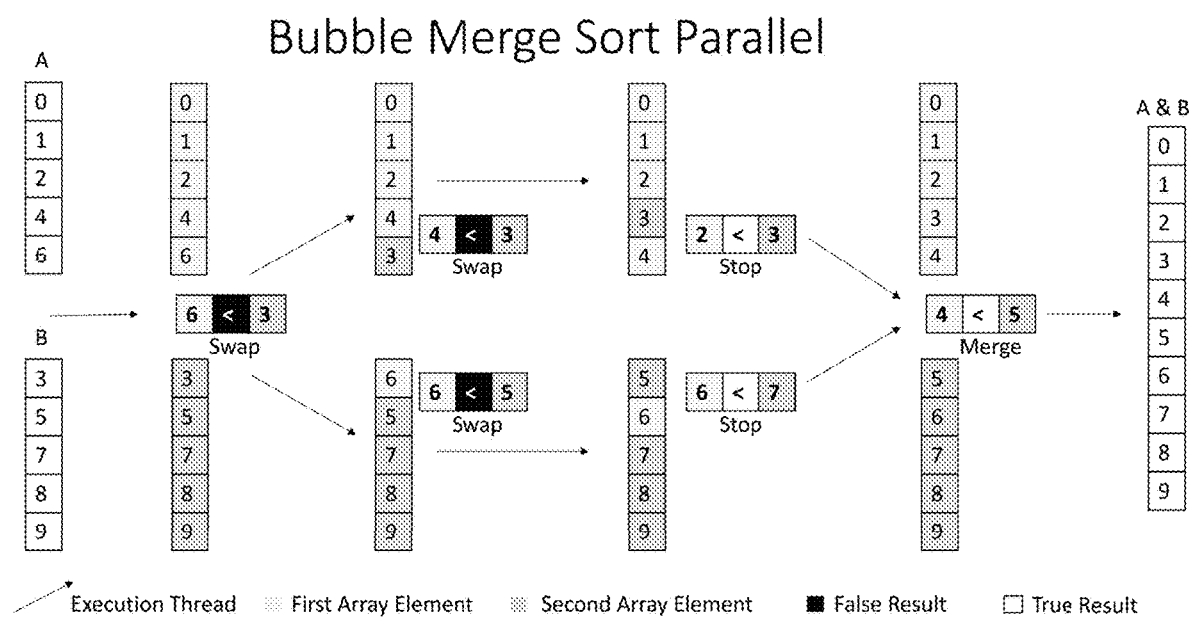
FIG. 23 shows an example for Bubble sort execution in the second stage of PDS.

FIG. 23 shows step by step example of the use of bubble sort algorithm in merging two sorted arrays in parallel into a one sorted array.

Figure 24:
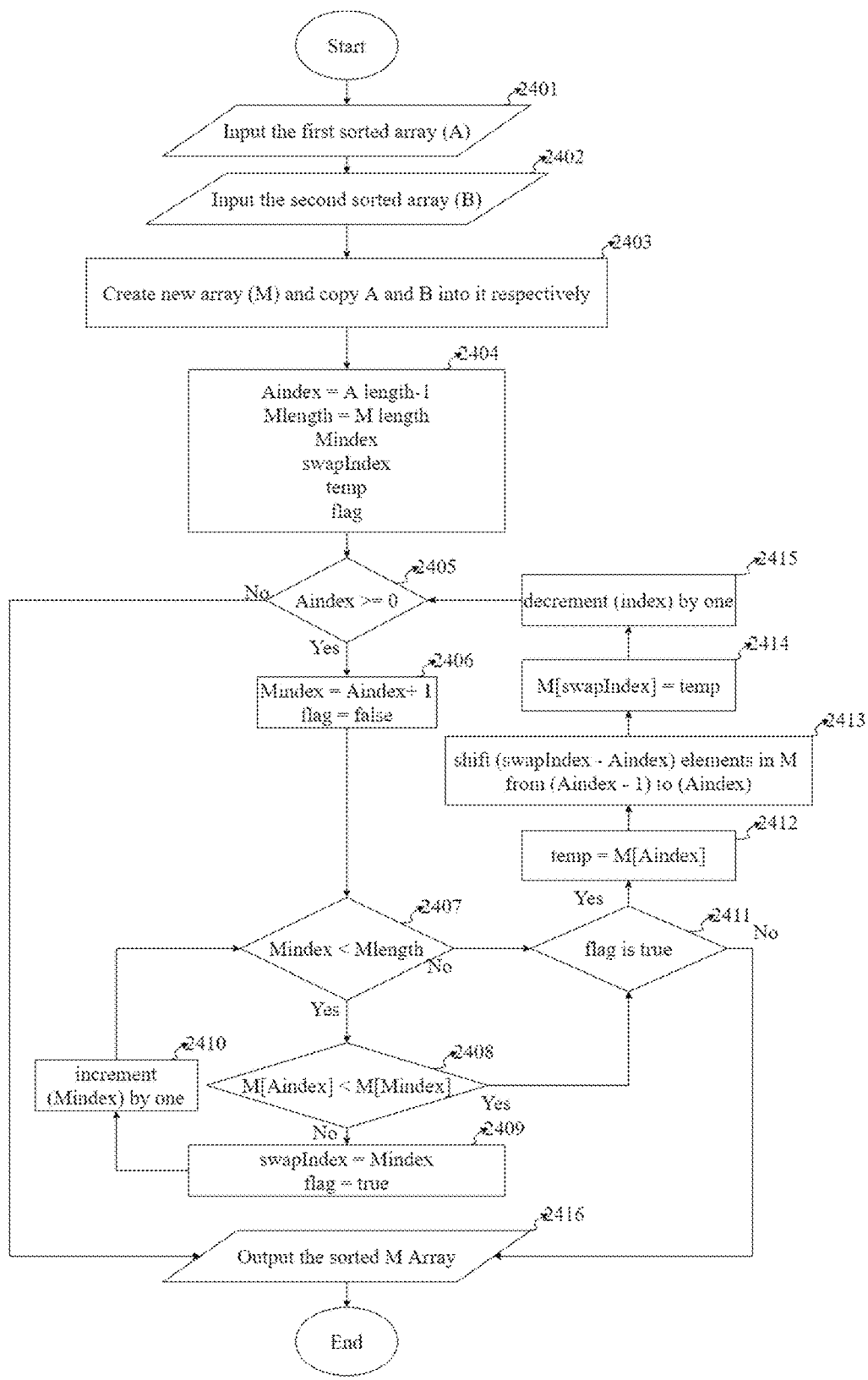
FIG. 24 shows the flowchart for Selection sort execution in the second stage of PDS.

FIG. 24 shows the flowchart for Selection sort execution in the second stage of PDS which we called selection merge and it is made up of the following steps:
a. Step 2401: Input the first sorted array and call it (A).
b. Step 2402: Input the second sorted array and call it (B).
c. Step 2403: Create an array, call it (M) and copy the (A) array first, then the (B) array.

d. Step 2404: Define four integer variables: Aindex, Mlength, Mindex, and swapindex. Assign Aindex the length of array (A) array minus one. Assign Mlength the length of array (M). Moreover, define a variable (temp), and a Boolean variable 'flag'.

e. Step 2405: Outer loop start: Check if (Aindex) is greater or equal to zero. If the checking result is true, step to 2406 Otherwise, step to 2416.

f. Step 2406: Assign (Mindex) the value of (Aindex +1). Second, assign (flag) the value 'False'.

g. Step 2407: Inner loop start: Check if (Mindex) is less than Mlength. If the result is true, step to 2408. Otherwise, step to 2411.

h. Step 2408: Compare if the element of array (M) at index (Aindex) is less than the element at index (Mindex). If the result is true, step to 2411. Otherwise, step to 2409.

i. Step 2409: Assign swapindex the value of (Mindex). Also, assign the value 'True' to the variable (flag).

j. Step 2410: Increment (Mindex) by one, then step to 2407 (continue inner loop).

k. Step 2411: Check if flag value is true. If the result is true, step to 2412. Otherwise, step to 2416.

l. Step 2412: Assign temp the value of the (M) array at index (Aindex).

m. Step 2413: Shift ((swapindex)–(Aindex)) elements in (M) array starting from index equals to ((Aindex)–1) to the index equals to (Aindex).

n. Step 2414: Assign the element in (M) array at index equals to (swapIndex) the value of (temp).

o. Step 2415: Decrement (Aindex) by one, then step to 2405 (continue outer loop).

p. Step 2416: Output the sorted M array.

Figure 25:
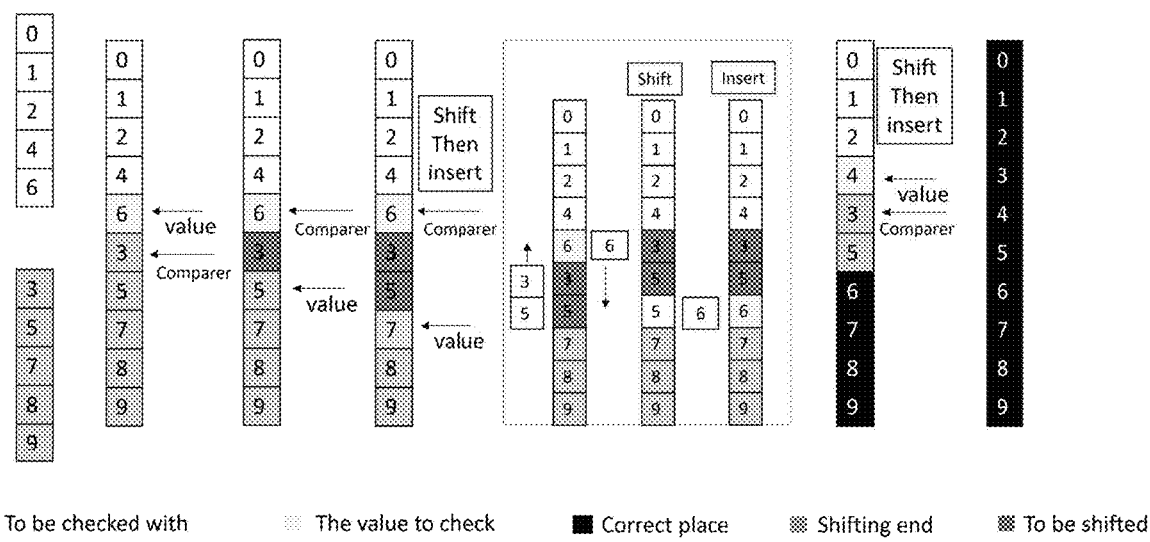
FIG. 25 shows an example for Selection sort execution in the second stage of PDS.

FIG. 25 shows step by step example of the use of selection sort algorithm in merging two sorted arrays into a one sorted array.

Figure 26:
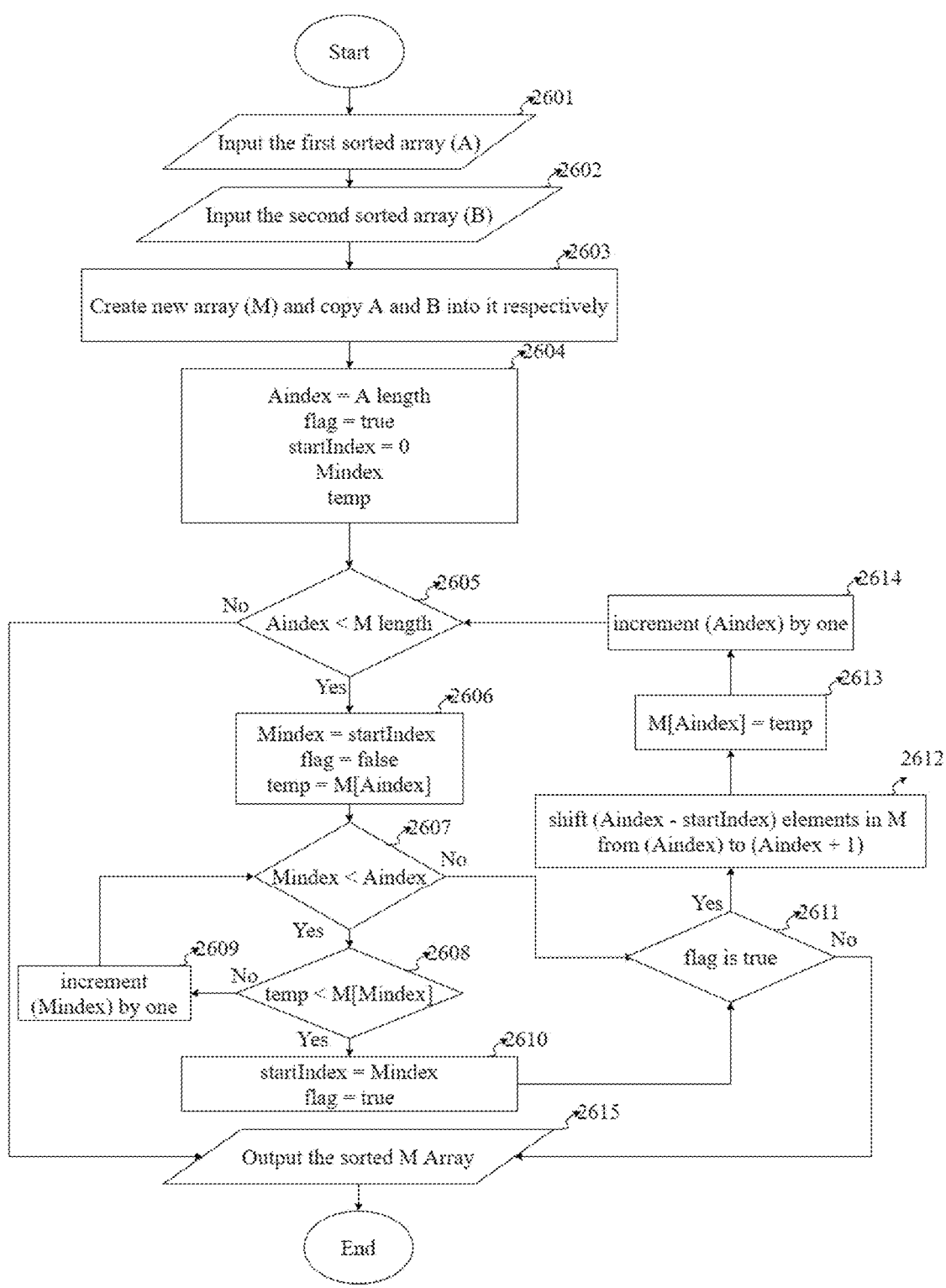
FIG. 26 shows the flowchart for Insertion sort execution in the second stage of PDS.

FIG. 26 shows the flowchart for Insertion sort execution in the second stage of PDS which we called insertion merge and it is made up of the following steps:

a. Step 2601: Input the first sorted array and call it (A).

b. Step 2602: Input the second sorted array and call it (B).

c. Step 2603: Create array call it (M) and copy the (A) array first, then the (B) array.

d. Step 2604: Define five variables: the first call it (Aindex) and assign it the value of (A) array length, the second call it (flag) and assign it the value 'True', the third call it (startIndex) and assign it the value Zero. The fourth call it (Mindex), and the fifth call it (temp).

e. Step 2605: Outer loop start: Check if (Aindex) is less than Zero. If the checking result is true, step to 2606. Otherwise, step to 2615.

f. Step 2606: Assign (Mindex) the value (startIndex) and (temp) the value of M[Aindex] and flag the value 'False'.

g. Step 2607: Inner loop start: Check if (Mindex) less than (Aindex). If the result is true, step to 2608. Otherwise, step to 2611.

h. Step 2608: Check the variable temp if it is less than M[Mindex] array element. If the result is true step to 2610. Otherwise step to 2609.

i. Step 2609: Increment (Mindex) by one, then step to 2607 (continue inner loop). "Get the next element for comparison".

j. Step 2610: Assign the value (Mindex) to the variable (startIndex) and the value 'True' to the variable (flag).

k. Step 2611: Check if flag value is true. If true, step to 2612. Otherwise, step to 2616.

l. Step 2612: Shift a number of elements in array M equal ((Aindex)–(startIndex)). The shift would be starting from location of (Aindex) to location (Aindex+1).

m. Step 2613: Assign element of array M at location (Aindex) the value (temp).

n. Step 2614: Increment (Aindex) by one, then step to 2605 (continue outer loop).

o. Step 2615: Output the sorted M array.

FIG. 27 shows step by step example of the use of insertion sort algorithm in merging two sorted arrays into a one sorted array.

Figure 28:
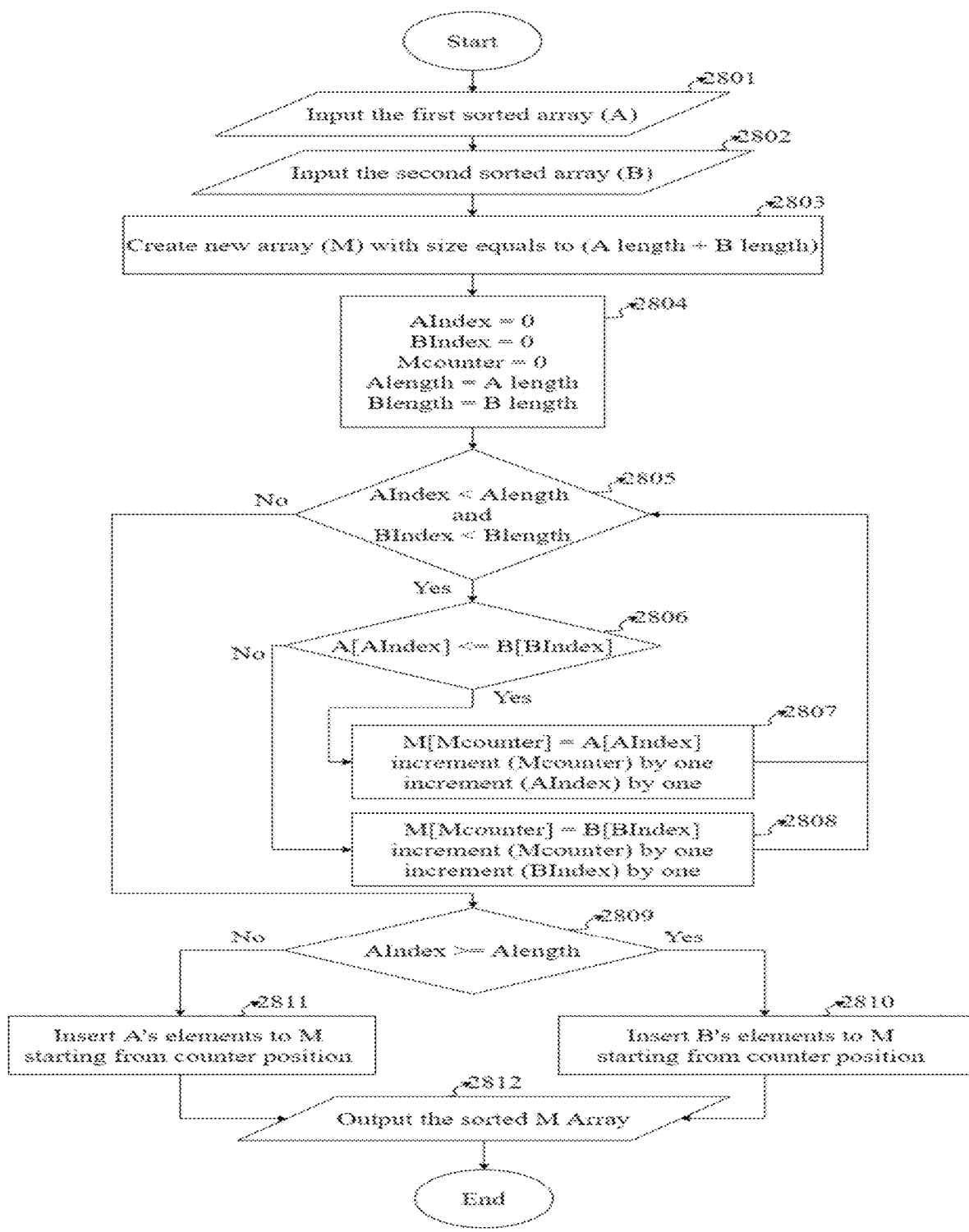
FIG. 28 shows the flowchart for Merge sort execution in the second stage of PDS.

FIG. 28 shows the flowchart for Merge sort execution in the second stage of PDS which we called Merge merge and it is made up of the following steps:

a. Step 2801: Input the first sorted array and call it (A).

b. Step 2802: Input the second sorted array and call it (B).

c. Step 2803: Create array call it (M) with size equal to A length+B length.

d. Step 2804: Define five variables: the first call it (Aindex) and assign it the value Zero, the second call it (Bindex) and assign it the value Zero, and the third call it (Mcounter) and assign it the value Zero. The fourth call it (Alength) and assign it the A array length. The fifth call it (Blength) and assign it the value B array length.

e. Step 2805: Loop start: Check if Aindex value is less than Alength and Bindex value is less than Blength. If the result is true, step to 2806. Otherwise, step to 2809.

f. Step 2806: Check if the A array element at (Aindex) is less or equal to the B array element at (Bindex). If the result is true, step to 2807. Otherwise, step to 2808.

g. Step 2807: Assign the M array element at index (Mcounter) the value of A array element at (Aindex). Increment (Mcounter) and (Aindex) by one. Then, step to 2805.

h. Step 2808: Assign the M array element at index (Mcounter) the value of B array element at index (Bindex). Increment (Mcounter) and (Bindex) by one. Then, step to 2805 (CONTINUE LOOP).

i. Step 2809: check if (Aindex) is greater or equal to Alength. If the result is true, step to 2810. Otherwise, step to 2811.

j. Step 2810: Insert the remaining B array elements starting from Bindex to M array starting from Mcounter position. Then, step to 2812.

k. Step 2811: Insert the remaining A array elements starting from Aindex to M array starting from Mcounter position.

l. Step 2812: Output the sorted M array.

Figure 29:
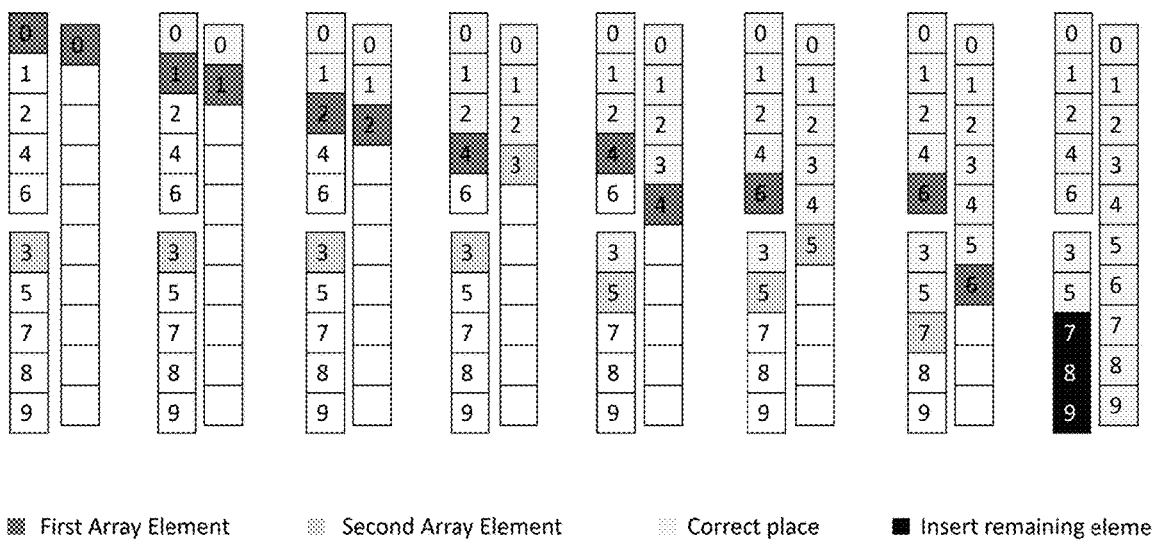
FIG. 29 shows an example for Merge sort execution in the second stage of PDS.

FIG. 29 shows step by step example of the use of merge sort algorithm in merging two sorted arrays into a one sorted array.

Figure 30:
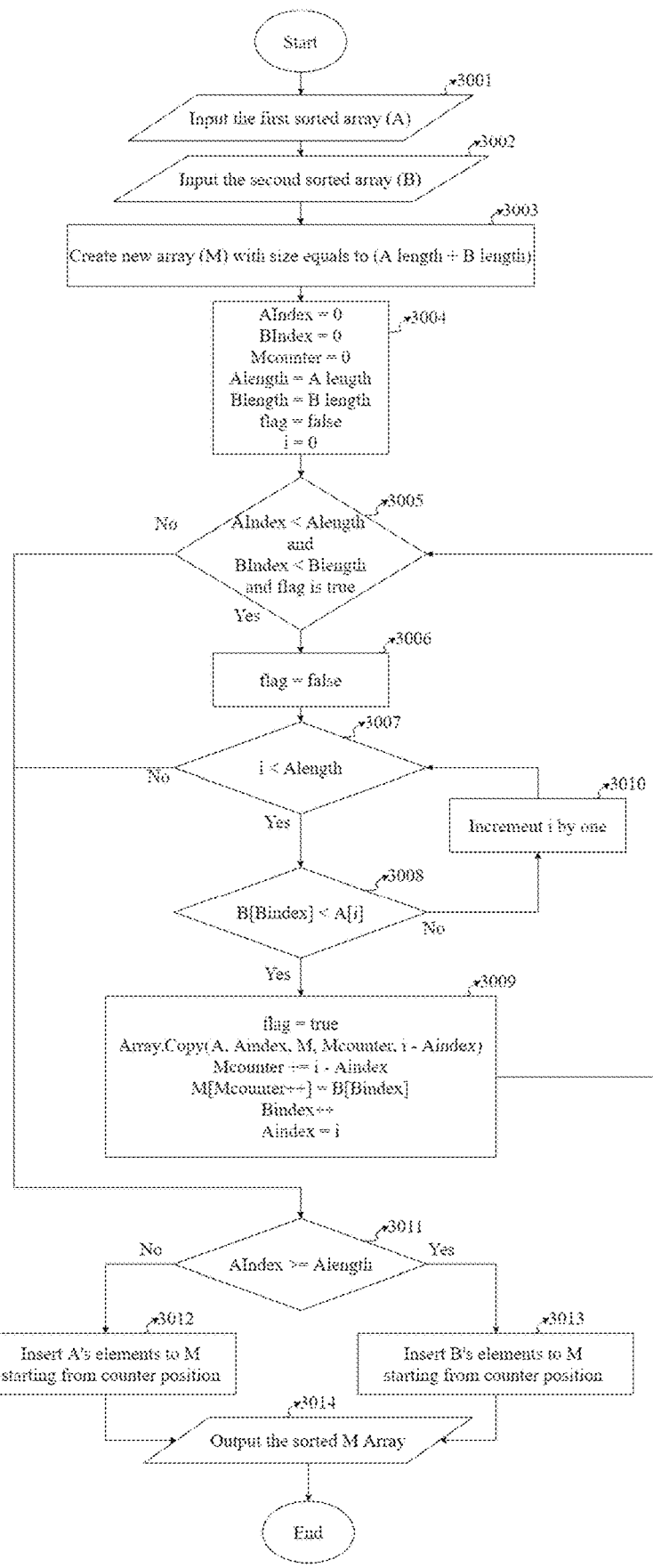
FIG. 30 shows block merge, where merging is done block-wise where a block of elements is moved to array M rather than one string element at a time moved to array M.

FIG. 30 shows block merge, where merging is done block wise where a block of elements are move to array M rather than one string element at a time moved to array M:

a. Step 3001: Input the first sorted array and call it (A).

b. Step 3002: Input the second sorted array and call it (B).

c. Step 3003: Create array call it (M) with size equal to A length+B length.

d. Step 3004: Define seven variables: the first call it (Aindex) and assign it the value Zero, the second call it (Bindex) and assign it the value Zero, and the third call it (Mcounter) and assign it the value Zero. The fourth call it (Alength) and assign it the A array length. The fifth call it (Blength) and assign it the value B array length. The sixth call it (flag) and set it to true. And the last one call it (i) and set it to zero.

e. Step 3005: Loop start: Check if Aindex value is less than Alength and Bindex value is less than Blength and flage is true. If the result is true, step to 3006. Otherwise, step to 3007.
f. Step 3006: set flag to false
g. Step 3007: Loop start: Check if (i) value is less than Alength and. If the result is true, step to 3008. Otherwise, step to 3011.
h. Step 3008: Check if B array element t index (Bindex) less than A element at index (i). If the result is true, step to 3009. Otherwise, step to 3010.
i. Step 3009:
j. Set flag to true.
k. Copy (i-Aindex) elements from A starting from (Aindex) to M array starting from (Mcounter).
l. Add (i-Aindex) to the current value of Mcounter.
m. Set the element in M at index (Mcounter) the value of the element in B array at index (Bindex) then increment Mcounter by one.
n. Incremenet (Bindex) by one.
o. Set (Aindex) the value of (i).
p. Step to 3005.
q. Step 3010: Increment (i) by one.
r. Step 3011: check if (Aindex) is greater or equal to Alength. If the result is true, step to 3013. Otherwise, step to 3012.
s. Step 3012: Insert the remaining A array elements starting from Aindex to M array starting from Mcounter position. Then, step to 3014.
t. Step 3013: Insert the remaining B array elements starting from Bindex to M array starting from Mcounter position.
u. Step 3014: Output the sorted M array.

Figure 31:
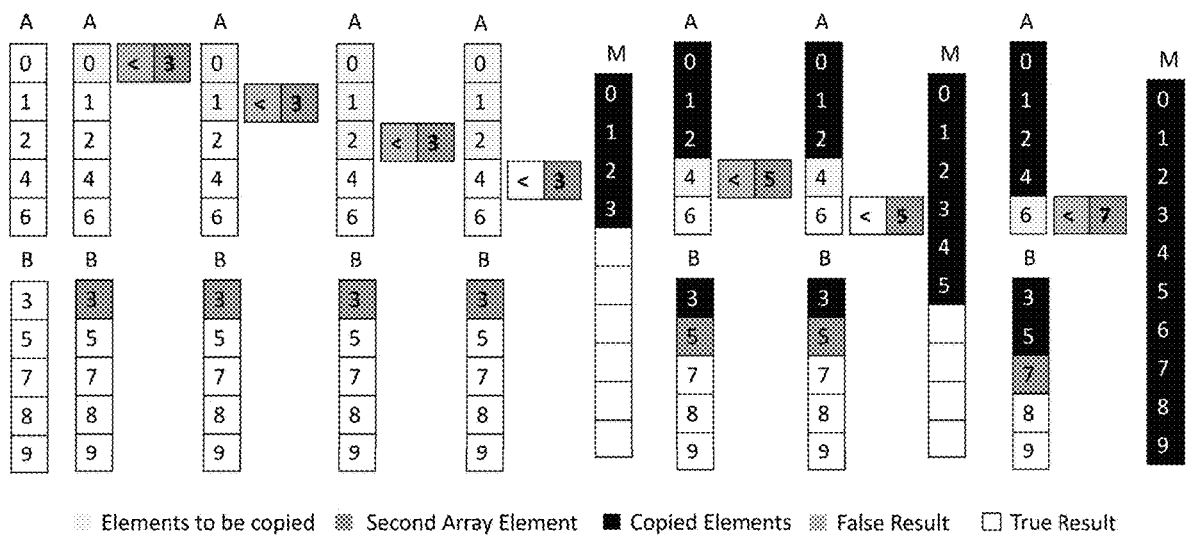
FIG. 31 shows a step by step example of the use of block merge sort algorithm in merging two sorted arrays into a one sorted array.

FIG. 31 shows step by step example of the use of block merge sort algorithm in merging two sorted arrays into a one sorted array.

Figure 32A:
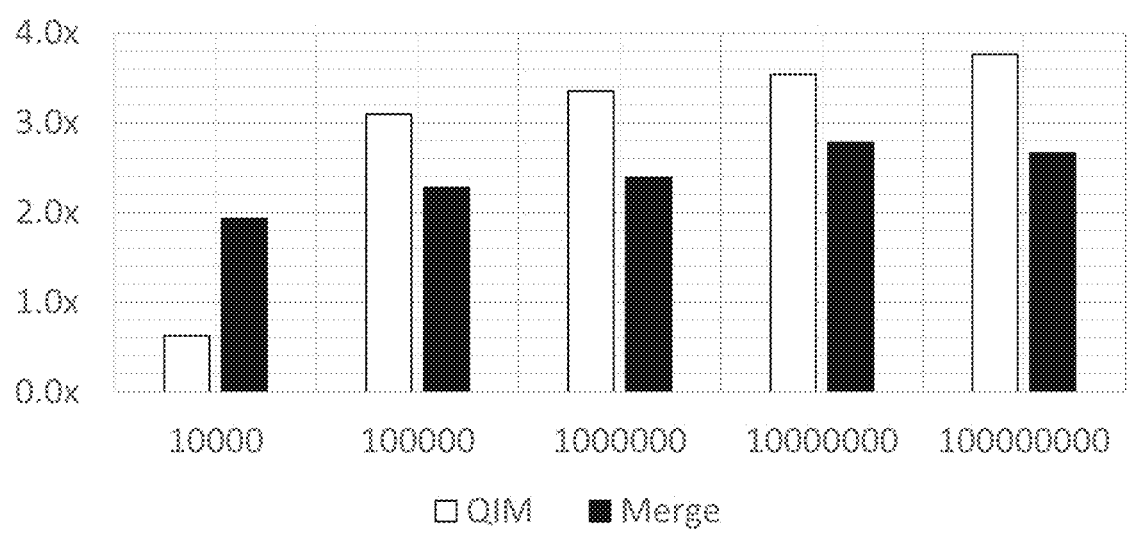

FIG. 32A is a graph showing the speed factor gained between parallel and sequential execution for QIM and merge sort under PDS using a processor with six-core processors and 12 threads. The speed gain for QIM was more than 3 times faster, while merge sort was more than two times faster than the sequential run, respectively. FIG. 32B is a table showing sequential and parallel execution times in seconds for sorting using QIM and merge.

Figure 33A:
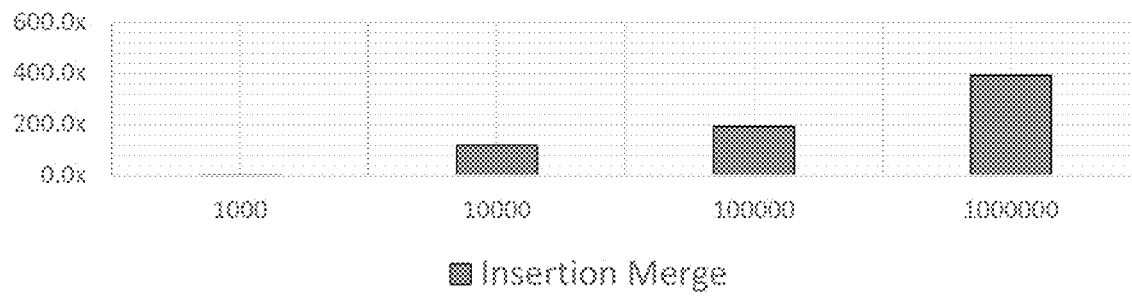
FIGS. 33A, 33B, and 33C show the graph for the speed factor gain using PDS with merge for iterative algorithms O ($N^2$): insertion, bubble, and selection sorts.
Figure 33B:
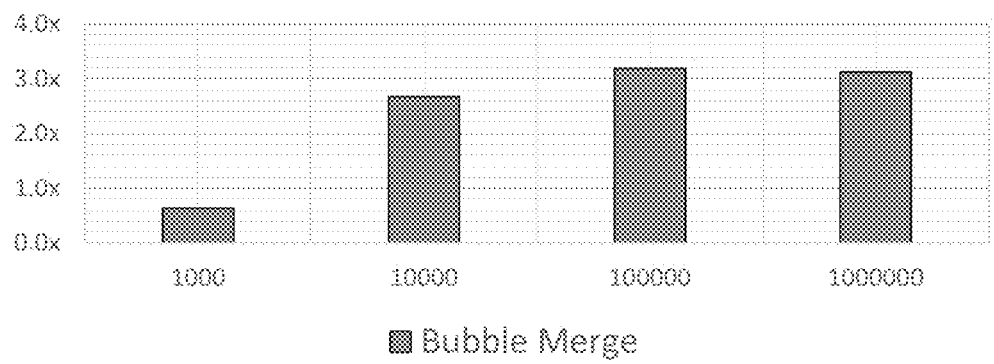
Figure 33C:
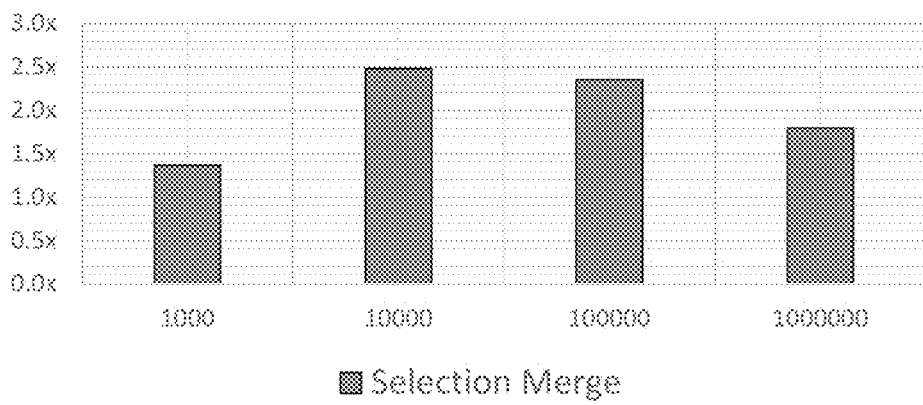

FIGS. 33 A, B, and C show the graph for the speed factor gain by using PDS with merge for $O(N^2)$ algorithms: insertion, bubble and selection sorts.

FIG. 33D shows the table for sequential execution time and PDS time in seconds for sorting using bubble, selection and insertion.

Figure 34A:
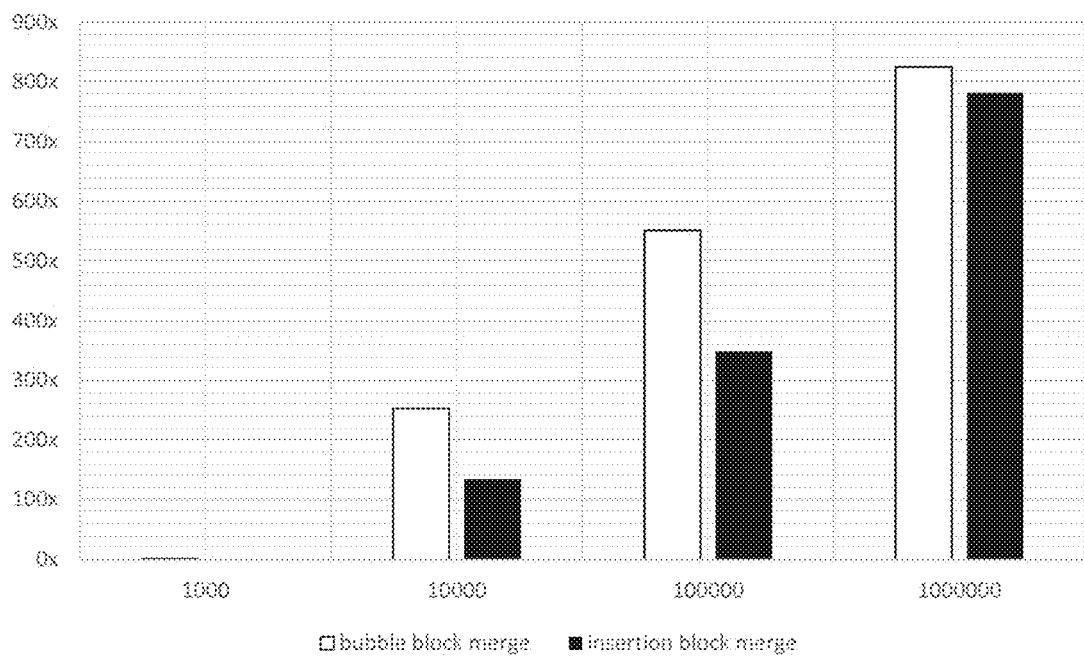
FIG. 34A shows the speed factor gained when using the PDS methodology with block merge on insertion and bubble sorts.

FIG. 34A shows the speed factor gained when using the PDS methodology with block merge on insertion and bubble sorts.

Figure 34B:
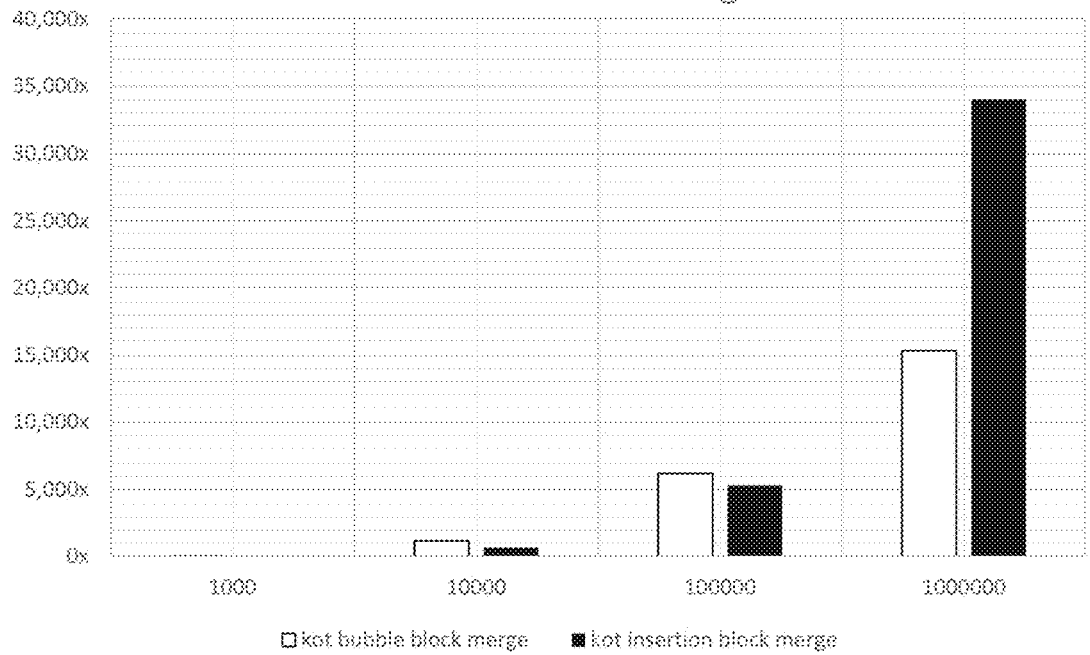
FIG. 34B shows the speed factor gained of the parallel first methodology using the PDS methodology with block merge on bubble and insertion sorts.

FIG. 34B shows the speed factor gained of the parallel first methodology using the PDS methodology with block merge on bubble and insertion sorts.

FIG. 34C Execution time for sequential bubble and insertion sort along with parallel bubble and insertion sort using PDS with block merge methodology.

FIG. 34D Execution time for sequential bubble and insertion sort along with parallel bubble and insertion sort using the first methodology and PDS with block merge.

INDUSTRIAL APPLICATION

Three methodologies were presented in this embodiment for enhancing the speed performance of data sorting algorithms in the sequential and parallel mode. Although all the tested algorithms had a speed gain, the speed gain varied from one algorithm to another. Moreover, numerical prefix conversion gave higher performance values over the character record method. However, the record of character methods would work better for multilingual data set.

An important key to algorithm design is to use sorting as a basic building block because once a set of items is sorted, many issues become easy to resolve. The following applications can be considered:

Commercial computing. Governments, financial institutions, and commercial enterprises (such as airlines) organize much of their information by sorting it. Whether the information are accounts to be sorted by name, transactions to be sorted by time or place, mail addresses to be sorted by cities, files to be sorted by name or date, etc. Processing such data certainly involves the use of a sorting algorithm.

Search for information. Keeping data in a sorted order makes it easy to efficiently search through them using the classic binary search algorithm.

Recognition of repetition. When there is a duplication in the data (for example, people having the same name but different social security numbers), a sorting algorithm will be able to identify such duplication.

Frequency distribution. Given a set of n items, which element occurs the largest number of times in the set? If the items are sorted, we can sweep from left to right and count them since all identical items will be lumped together during sorting.

What is claimed is:

1. A method of sorting data and perform a search on sorted data using a computer, comprising:

gathering data in the form of a unsorted string array from an institution that needs to be converted in the form of the sorted data to perform a search in a processor of the computer;

extracting a string prefix from each of the unsorted string array in a central processing unit or multiple processing units locally or remotely residing in the computer;

converting the string prefix of the unsorted string array to an unsigned long integer value and storing in an array with record of integers (ARI); wherein each record of integers holds two integers, one for storing a prefix value and the other holds the location of the string in the unsorted string array where the string prefix was extracted wherein the unsigned long integers are calculated in bytes;

sorting the ARI, using a SAlg sorting algorithm (SAlg), wherein the sorting is done on the integer of the prefix value;

Sorting the unsorted string array by transferring its string elements to a sorted string array (SSTA), using a location integer in the sorted ARI as a reference; finishing by sorting a list of equals on the SSTA as integers as strings if they exist in the ARI; and improving a speedup factor gain for sorting; wherein converting a string of length N to an integer value, base 10, is done as follows:

Building a L tables, L=13 for alphabetic characters and L=12 for alphanumeric characters, wherein these tables will be searched, looked up, using one of three search methods for table lookup: hash search, linear search or KOT search, wherein the first table will represent the rightmost element of the string, while table $L^{th}$ will hold the values for left most elements in the string;

Searching using a hash search and a linear search, each table has two columns each of length equal to the number of the alphabets in the language, for English language the table length is 27, which is base(B) 27, for alphanumeric B=37 or up to 40;

Wherein the first column in each table holds the alphabet, but the first element is a padding character (@), a second element is A, and a last element in this column is a Z character;

Wherein a second column of each of these tables holds the value of a character (CHV) depending on the character location in the string which or table number and is equal to: $CHV \times B^{L-1}$ or $CHV \times 27^{L-1}$, wherein a character values, are as follows: the extra character is the padding character with value 1, while A will get the value 2 and Z will have the value 27;

Wherein for a KOT search, there will be L tables with one column whose length equal to the ASCII table, wherein all elements in the table are set to zero except those whose index is equal the ASCII value of the alphabet used in the string to be searched; wherein at the location equal to the ASCII value of A in all the tables will be $2 \times 27^{L-1}$, depending on the table number;

Wherein the conversion process starts with a CPU accumulator initialized to zero, removing the right most character from a string of length L and search in the first table using one of the search lookup methods to obtain a value and add the value to the accumulator, removing the next character and continue this process until all the string of length L characters have been searched and their values are added to the accumulator;

and searching the sorted string array using a binary search algorithm for the institution to access their data more efficiently and fast.

2. The method of claim 1, wherein the execution performance depends on the prefix size and corresponding choice of the integer size chosen to hold a converted prefix value.

3. The method of claim 1, wherein the execution performance depends on the choice of a prefix characters conversion process; wherein there are three conversion processes of the prefix characters to integer values: linear search, hash table search, and KOT search.

4. The method of claim 3, wherein the conversion processes uses tables that hold calculated values of each character that might appear in the prefix and depending on its location in the prefix; wherein after finding each character value in the prefix then they are summed together to give the prefix numerical value.

\* \* \* \* \*